United States Patent
Huh et al.

(10) Patent No.: US 12,401,296 B2
(45) Date of Patent: *Aug. 26, 2025

(54) REDUCTION OF COMMON MODE EMISSION OF AN ELECTRICAL POWER CONVERTER

(71) Applicant: General Electric Company, Schenectady, NY (US)

(72) Inventors: Kum Kang Huh, Niskayuna, NY (US); Rajib Datta, Niskayuna, NY (US); Vandana Prabhakar Rallabandi, Niskayuna, NY (US); John Russell Yagielski, Scotia, NY (US); Mohamed Osama, Garching (DE)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,643

(22) Filed: Sep. 1, 2023

(65) Prior Publication Data
US 2023/0412094 A1 Dec. 21, 2023

Related U.S. Application Data

(63) Continuation of application No. 17/507,866, filed on Oct. 22, 2021, now Pat. No. 11,750,114.

(51) Int. Cl.
  *H02M 7/5395* (2006.01)
  *B64D 27/02* (2006.01)
  (Continued)

(52) U.S. Cl.
  CPC .......... *H02M 7/5395* (2013.01); *B64D 27/12* (2013.01); *H02M 1/44* (2013.01); *H02P 25/22* (2013.01);
  (Continued)

(58) Field of Classification Search
  CPC .... H02M 1/123; H02M 1/44; H02M 7/53871; H02M 7/5395; H02P 27/08; H02P 25/22;
  (Continued)

(56) References Cited

U.S. PATENT DOCUMENTS 6,034,460 A * 3/2000 Tajima ................. B60L 15/025
                                                  310/179
6,490,181 B1 12/2002 Liu et al.
(Continued)

FOREIGN PATENT DOCUMENTS

CA   29707376 A1   2/2018
EP   2160828 B1   5/2016
(Continued)

OTHER PUBLICATIONS

Janabi et al., Hybrid SVPWM Scheme to Minimize the Common-mode Voltage Frequency and Amplitude in VSI Drives, IEEE Transactions on Power Electronics, vol. 34, Issue 2, Feb. 2019, pp. 1595-1610. https://doi.org/1109/TPEL.2018.2834409.
(Continued)

*Primary Examiner* — Ryan Johnson
(74) *Attorney, Agent, or Firm* — Dority & Manning, P.A.

(57) ABSTRACT

A power system including a power converter system and an electric machine is provided. In one aspect, the power converter system has first and second switching elements. The electric machine includes a first multiphase winding electrically coupled with the first switching elements and a second multiphase winding electrically coupled with the second switching elements. The first and second multiphase windings are arranged and configured to operate electrically opposite in phase with respect to one another. One or more processors control the first switching elements to generate first pulse width modulated (PWM) signals based on received voltage commands to render a first common mode
(Continued)

signal and also control the second switching elements to generate second PWM signals based on received voltage commands to render a second common mode signal. The rendered first and second common mode signals have the same or similar waveform with opposite polarity with respect to one another.

18 Claims, 27 Drawing Sheets

(51) Int. Cl.
B64D 27/12 (2006.01)
H02M 1/44 (2007.01)
H02P 25/22 (2006.01)
H02P 27/08 (2006.01)

(52) U.S. Cl.
CPC .......... H02P 27/085 (2013.01); *B64D 27/026* (2024.01); *B64D 2221/00* (2013.01)

(58) Field of Classification Search
CPC . H02P 29/50; H02P 27/085; B64D 2027/026; B64D 27/12; B64D 2221/00
See application file for complete search history.

(56) References Cited

U.S. PATENT DOCUMENTS

| | | |
|---|---|---|
| 7,545,656 B2 | 6/2009 | Lanni |
| 7,638,890 B2 | 12/2009 | Lando et al. |
| 7,898,827 B2 | 3/2011 | Ganev et al. |
| 8,222,792 B2 | 7/2012 | Platon et al. |
| 8,492,920 B2 | 7/2013 | Huang et al. |
| 8,575,817 B2 | 11/2013 | Platon et al. |
| 8,670,250 B2 | 3/2014 | Fu et al. |
| 8,729,844 B2 | 5/2014 | Feng et al. |
| 8,745,990 B2 | 6/2014 | Burkholder et al. |
| 8,754,562 B2 | 6/2014 | Platon et al. |
| 9,045,996 B2 | 6/2015 | Anghel et al. |
| 9,096,312 B2 | 8/2015 | Moxon |
| 9,097,134 B2 | 8/2015 | Ferch et al. |
| 9,425,686 B2 | 8/2016 | Zheng et al. |
| 9,621,090 B2 | 4/2017 | Chong et al. |
| 9,982,555 B2 | 5/2018 | Thet et al. |
| 10,090,676 B2 | 10/2018 | Knowles et al. |
| 10,263,550 B2 | 4/2019 | Thet et al. |
| 10,443,504 B2 | 10/2019 | Dalal |
| 10,693,403 B2 | 6/2020 | Zhang et al. |
| 10,759,540 B2 | 9/2020 | Long |
| 11,325,714 B2 | 5/2022 | Datta et al. |
| 11,750,114 B2 * | 9/2023 | Huh .................. H02M 1/44 |
| | | 307/9.1 |
| 2008/0298103 A1 | 12/2008 | Bendre et al. |
| 2010/0007225 A1 | 1/2010 | Platon et al. |
| 2010/0251726 A1 | 10/2010 | Jones et al. |
| 2011/0156629 A1* | 6/2011 | Satou .................. B62D 5/0487 |
| | | 318/453 |
| 2011/0198955 A1 | 8/2011 | Platon et al. |
| 2012/0187893 A1 | 7/2012 | Baba et al. |
| 2012/0262023 A1 | 10/2012 | Platon et al. |
| 2017/0166248 A1 | 6/2017 | Asao et al. |
| 2017/0237377 A1 | 8/2017 | Furukawa et al. |
| 2017/0338756 A1 | 11/2017 | Jung |
| 2018/0112599 A1 | 4/2018 | Dalal |
| 2018/0141674 A1 | 5/2018 | Bailey et al. |
| 2018/0291807 A1 | 10/2018 | Dalal |
| 2019/0149078 A1 | 5/2019 | Sumasu et al. |
| 2019/0173411 A1 | 6/2019 | Jung |
| 2020/0025094 A1 | 1/2020 | Dalal |
| 2021/0207544 A1 | 7/2021 | Muldoon |
| 2021/0371116 A1 | 12/2021 | Cartwright |

FOREIGN PATENT DOCUMENTS

| | | |
|---|---|---|
| EP | 2618472 A3 | 9/2016 |
| FR | 2907761 B1 | 7/2009 |
| GB | 2456336 A | 7/2009 |

OTHER PUBLICATIONS

Zhang et al., Development of Megawatt-Scale Medium Voltage High Efficiency High Power Density Power Converters for Aircraft Hybrid-Electric Propulsion Systems, AIAA Propulsion and Energy Forum, 2018 AIAA/IEEE Electric Aircraft Technologies Symposium, Jul. 9-11, 2018, Cincinnati, OH, 5 Pages.

* cited by examiner

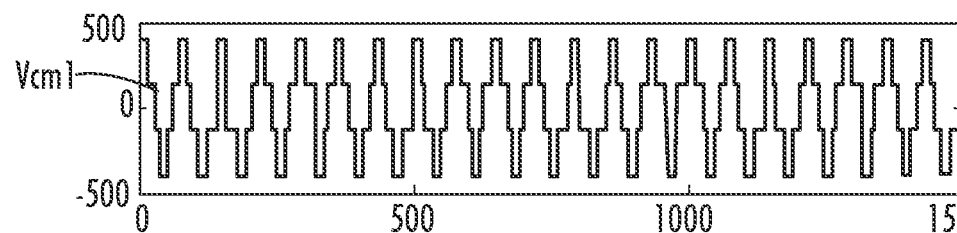
FIG. 24A
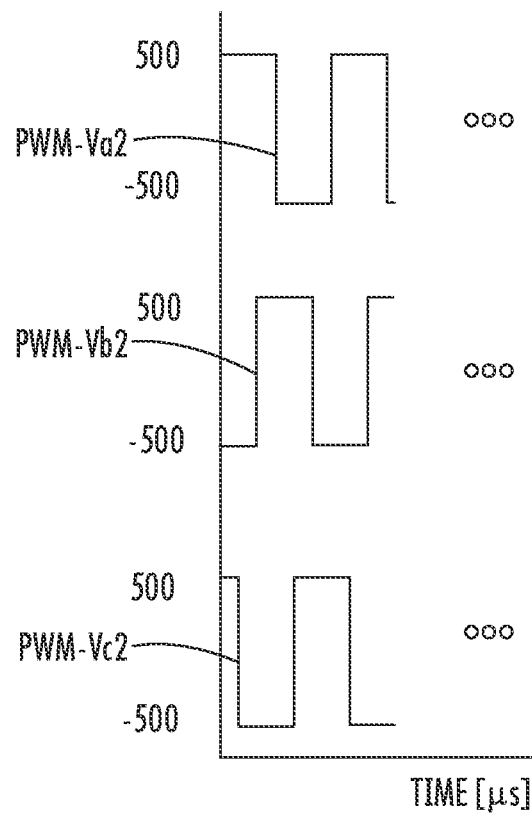
FIG. 24B
FIG. 24C
FIG. 24D
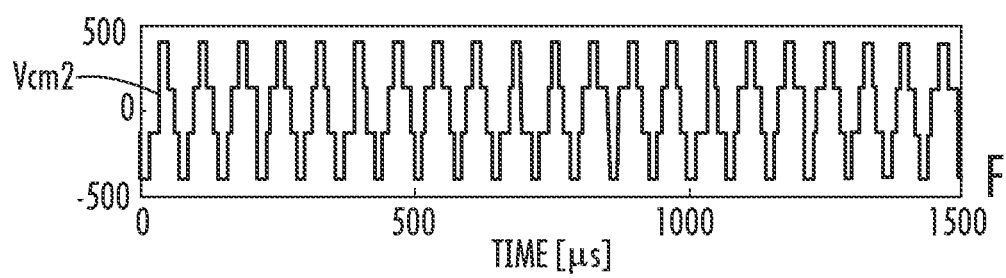
FIG. 24E

FIRST MULTIPHASE WINDING 561

SECOND MULTIPHASE WINDING 562

TIME [μs]

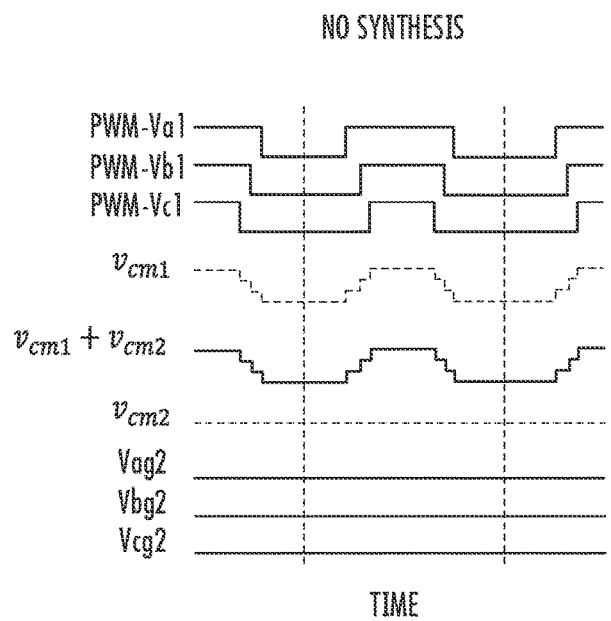
FIG. 26A
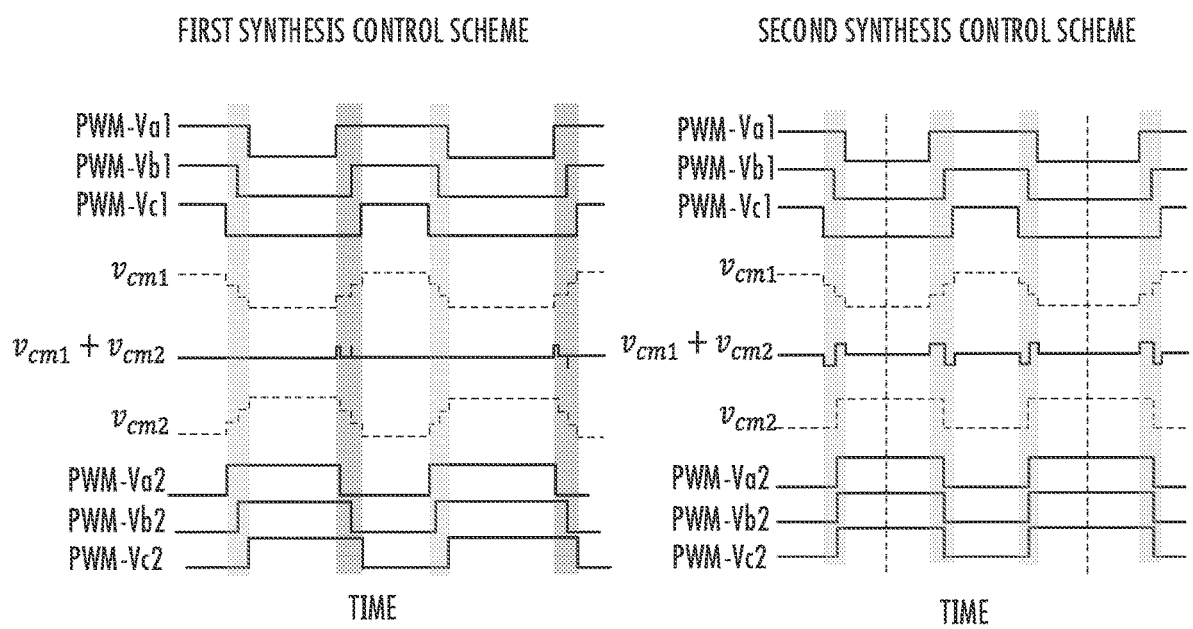
FIG. 26B
FIG. 26C

REDUCTION OF COMMON MODE EMISSION OF AN ELECTRICAL POWER CONVERTER

CROSS-REFERENCE TO RELATED APPLICATIONS

This application is a continuation of U.S. application Ser. No. 17/507,866, filed Oct. 22, 2021, titled "Reduction of Common Mode Emission of an Electrical Power Converter," which is incorporated herein by reference in its entirety for all purposes.

FIELD

The present subject matter relates generally to electrical power systems, such as electrical power systems for aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing separated from the wing and fuselage.

Hybrid-electric propulsion systems are being developed to improve an efficiency of conventional commercial aircraft. Some hybrid electric propulsion systems include one or more electric machines each being mechanically coupled with a rotating component of one of the aircraft engines. The electric machines can each have an associated power converter electrically connected thereto. The inventors of the present disclosure have developed various systems and methods to improve hybrid electric propulsion systems, and more generally, power systems.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 24A through 24E provide various graphs depicting voltage signals as a function of time;

FIGS. 26A, 26B, and 26C each show a graph depicting voltage signals as a function of time;

DETAILED DESCRIPTION

Figure 1:
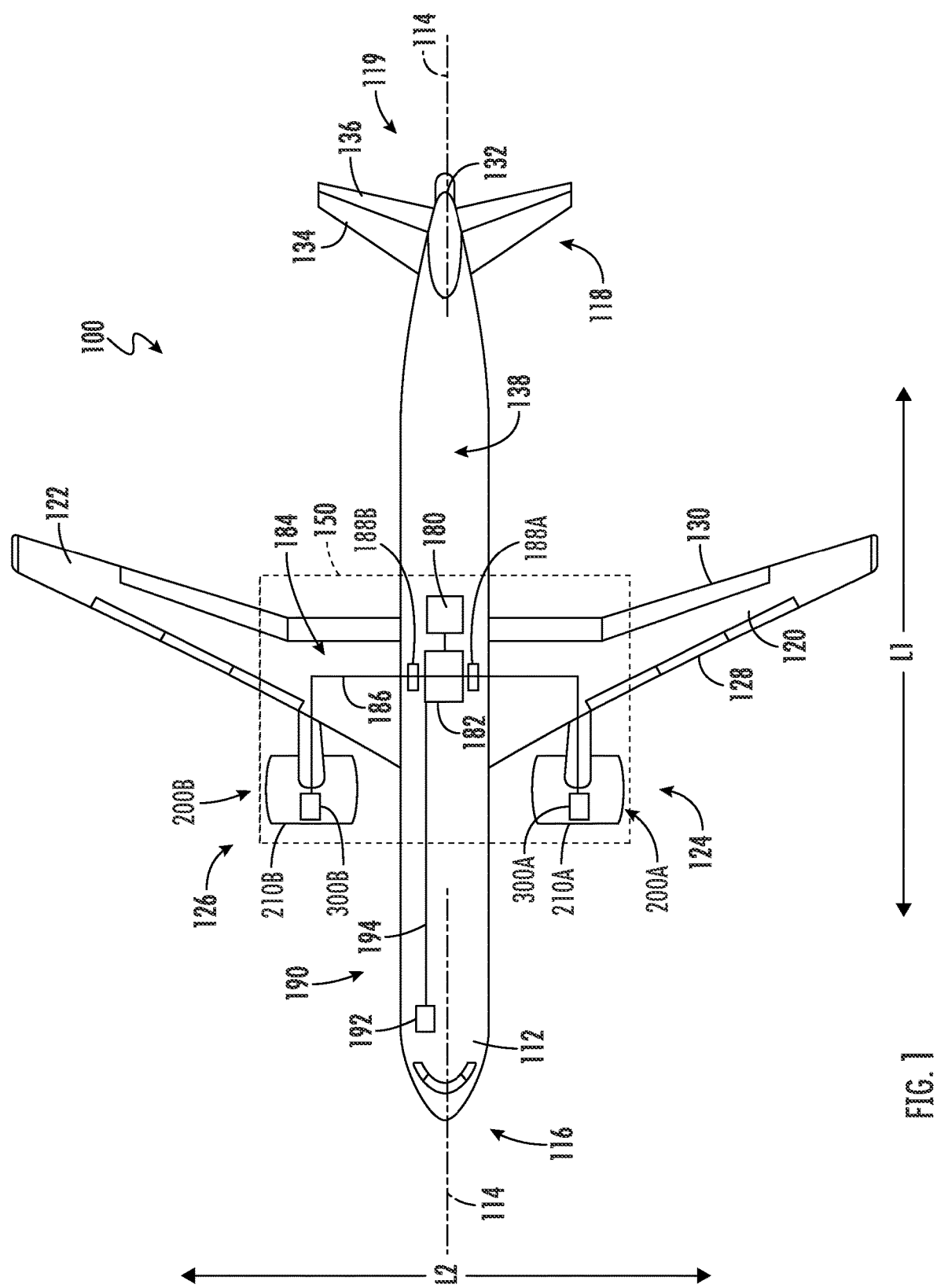
FIG. 1 provides a schematic top view of an aircraft having a hybrid-electric propulsion system according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Electrical power systems, such as those found in aircraft hybrid-electric propulsion systems, can employ an electric machine and a power converter system electrically connected thereto. Due to ever increasing requirements for aviation electrical power systems to increase power distribution voltage, increase power level and consequent emission paths, and use of efficient high-speed power semiconductors, there is an increased need for mitigation of common mode emissions. Common mode emissions may introduce voltage stresses and parasitic current via electromechanical interfaces.

Accordingly, the inventors of the present disclosure have developed architectures and control schemes that may reduce common mode emissions and associated electromagnetic interference in electrical power systems having an electric machine and a power converter system electrically coupled thereto. In one example aspect, polyphase or multiphase windings of an electric machine are arranged to operate under complementary excitation and PWM excitations are synthesized at the power converter system to reduce common mode emissions by cancelation.

Particularly, in one example embodiment, a power system including a power converter system and an electric machine is provided. The power converter system has first switching elements and second switching elements. The electric machine includes a first multiphase winding electrically coupled with the first switching elements and a second multiphase winding electrically coupled with the second switching elements. The first and second multiphase windings are arranged and are configured to operate electrically opposite in phase with respect to one another. That is, the first multiphase winding and the second multiphase winding are electrically out-of-phase with respect to one another by one hundred eighty degrees (180°).

One or more processors of the power system can receive voltage commands associated with the first multiphase winding and voltage commands associated with the second multiphase winding. The one or more processors can control the first switching elements to generate first pulse width modulated (PWM) signals based at least in part on the voltage commands associated with the first multiphase winding. The generated first PWM signals effectively render a first common mode signal. Likewise, the one or more processors can control the second switching elements to generate second PWM signals based at least in part on the voltage commands associated with the second multiphase winding. The generated second PWM signals effectively render a second common mode signal.

Notably, in some instances, the second common mode signal has a same or similar waveform with opposite polarity with respect to the first common mode signal. The first and second common mode signals have the same or similar waveform because the first and second multiphase windings are electrically opposite in phase with respect to one another. The polarity of the common mode signals are made opposite one another due to the one or more processors changing the polarity of the first or second PWM signals in some regard. For instance, the polarity of the second PWM signals can be changed by shifting a carrier signal to which the voltage commands associated with the second multiphase winding are compared by one hundred eighty degrees (180°) with respect to a carrier signal to which the voltage commands associated with the first multiphase winding are compared.

As the first and second common mode signals have the same or similar waveform and opposite polarity, common mode emissions can be canceled or reduced. Advantages and benefits may be realized by cancelation or reduction of common mode emissions. For instance, the need for EMI filters can be eliminated or at least one or more EMI filters can be reduced in size. This may be advantageous for weight sensitive applications, such as aviation applications. Cancelation or reduction of common mode emissions can also reduce shaft voltage and bearing currents, thereby potentially: reducing bearing stress, eliminating the need for a shaft grounding brush, eliminating the need of a bearing insulation sleeve or ceramic bearing, and/or reducing leakage current through shaft loads, such as gears or sensors.

Moreover, the architectures and control schemes disclosed herein may also be utilized advantageously to cancel common mode emissions even for power systems that do not include a wire dedicated to facilitating cancelation of common mode emissions. Some conventional systems include such dedicated wires. In this regard, the inventive aspects disclosed herein may provide common mode emission cancelation for a wide variety of systems, including for example, isolated neutral systems. Other benefits and advantages may be realized as well.

FIG. 1 provides a schematic top view of an exemplary aircraft 100 as may incorporate one or more inventive aspects of the present disclosure. As shown in FIG. 1, for reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1. The aircraft 100 extends between a forward end 116 and an aft end 118, e.g., along the longitudinal direction L1.

As depicted, the aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that in other exemplary embodiments of the present disclosure, the aircraft 100 may additionally or alternatively include any other suitable configuration. For example, in other embodiments, the aircraft 100 may include any other control surface configuration.

The exemplary aircraft 100 of FIG. 1 also includes a hybrid-electric propulsion system 150. For this embodiment, the hybrid-electric propulsion system 150 has a first propulsor 200A and a second propulsor 200B both operable to produce thrust. The first propulsor 200A is mounted to the first wing 120 and the second propulsor 200B is mounted to the second wing 122. Moreover, for the embodiment depicted, the first propulsor 200A and second propulsor 200B are each configured in an underwing-mounted configuration. However, in other example embodiments, one or both of the first and second propulsors 200A, 200B may be mounted at any other suitable location in other exemplary embodiments.

The first propulsor 200A includes a gas turbine engine 210A and one or more electric machines, such as electric machine 300A mechanically coupled with the gas turbine engine 210A. The electric machine 300A can be an electric generator, an electric motor, or a combination generator/motor. For this example embodiment, the electric machine 300A is a combination generator/motor. In this manner, when operating as an electric generator, the electric machine 300A can generate electrical power when driven by the gas turbine engine 210A. When operating as an electric motor, the electric machine 300A can drive or motor the gas turbine engine 210A.

Likewise, the second propulsor 200B includes a gas turbine engine 210B and one or more electric machines, such as electric machine 300B mechanically coupled with the gas turbine engine 210B. The electric machine 300B can be an electric generator, an electric motor, or a combination generator/motor. For this example embodiment, the electric machine 300B is a combination generator/motor. In this manner, when operating as an electric generator, the electric machine 300B can generate electrical power when driven by the gas turbine engine 210B. When operating as an electric motor, the electric machine 300B can drive or motor a spool of the gas turbine engine 210B. Electric machine 300B can be configured and can operate in a similar manner as electric machine 300A described herein.

The hybrid-electric propulsion system 150 further includes an electric energy storage unit 180 electrically connectable to the electric machines 300A, 300B, and in some embodiments, other electrical loads. In some exemplary embodiments, the electric energy storage unit 180 may include one or more batteries. Additionally, or alternatively, the electric energy storage units 180 may include one or more supercapacitor arrays, one or more ultracapacitor arrays, or both. For the hybrid-electric propulsion system 150 described herein, the electric energy storage unit 180 is configured to store a relatively large amount of electrical power. For example, in certain exemplary embodiments, the electric energy storage unit 180 may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

The hybrid-electric propulsion system 150 also includes a power management system having a controller 182 and a power bus 184. The electric machines 300A, 300B, the electric energy storage unit 180, and the controller 182 are each electrically connectable to one another through one or more electric lines 186 of the power bus 184. For instance, the power bus 184 may include various switches or other power electronics movable to selectively electrically connect the various components of the hybrid-electric propulsion system 150. Particularly, as shown in FIG. 1, a first power converter 188A of the power bus 184 is electrically coupled or connectable with the electric machine 300A via one or more electric lines 186 and a second power converter 188B of the power bus 184 is electrically coupled or connectable with the electric machine 300B via one or more electric lines 186. The power bus 184 may include other power electronics, such as inverters, converters, rectifiers, etc., for conditioning or converting electrical power within the hybrid-electric propulsion system 150.

The controller 182 is configured to control the power electronics to distribute electrical power between the various components of the hybrid-electric propulsion system 150. For example, the controller 182 may control the power electronics of the power bus 184 to provide electrical power to, or draw electrical power from, the various components, such as the electric machines 300A, 300B, to operate the hybrid-electric propulsion system 150 between various operating modes and perform various functions. Such is depicted schematically as the electric lines 186 of the power bus 184 extend through the controller 182.

The controller 182 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes controller 182 as well as other computing devices, such as computing device 192. The computing system 190 can include other computing devices as well, such as engine controllers (not shown). The computing devices of the computing system 190 can be communicatively coupled with one another via a communication network. For instance, computing device 192 is located in the cockpit of the aircraft 100 and is communicatively coupled with the controller 182 of the hybrid-electric propulsion system 150 via a communication link 194 of the communication network. The communication link 194 can include one or more wired or wireless communication links.

For this embodiment, the computing device 192 is configured to receive and process inputs, e.g., from a pilot or other crew members, and/or other information. In this manner, as one example, the one or more processors of the computing device 192 can receive an input indicating a command to change a thrust output of the first and/or second propulsors 200A, 200B and can cause, in response to the input, the controller 182 to control the electrical power drawn from or delivered to one or both of the electric machines 300A, 300B to ultimately change the thrust output of one or both of the propulsors 200A, 200B.

The controller 182 and other computing devices of the computing system 190 of the aircraft 100 may be configured in substantially the same manner as the exemplary computing devices of the computing system 950 described below with reference to FIG. 30.

Figure 2:
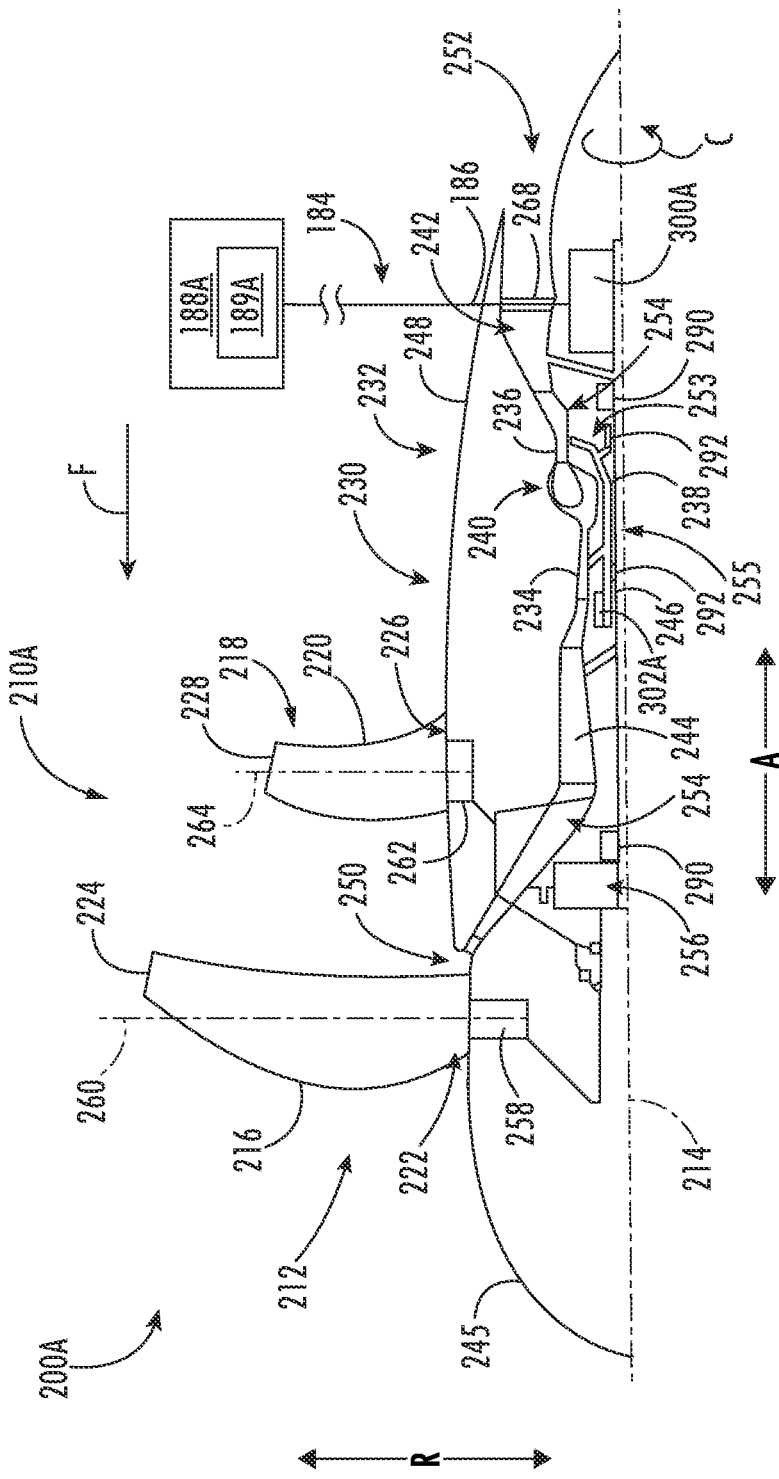
FIG. 2 provides a schematic cross-sectional view of one of the hybrid-electric propulsors of the aircraft of FIG. 1.

FIG. 2 provides a schematic view of the first propulsor 200A of the hybrid-electric propulsion system 150 of the aircraft 100 of FIG. 1. Although the first propulsor 200A is shown, it will be appreciated that the second propulsor 200B can be configured in the same or similar manner as the first propulsor 200A depicted in FIG. 2. The exemplary gas turbine engine of FIG. 2 is configured as a single unducted rotor engine 210A defining an axial direction A, a radial direction R, and a circumferential direction C. The engine 210A also defines a central longitudinal axis 214.

As shown in FIG. 2, the engine 210A takes the form of an open rotor propulsion system and has a rotor assembly 212 that includes an array of airfoils arranged around the central longitudinal axis 214 of engine 210A. More particularly, the rotor assembly 212 includes an array of rotor blades 216 arranged around the central longitudinal axis 214 of the engine 210A. Moreover, as will be explained in more detail below, the engine 210A also includes a non-rotating vane assembly 218 positioned aft of the rotor assembly 212 (i.e., non-rotating with respect to the central axis 214). The non-rotating vane assembly 218 includes an array of airfoils also disposed around central axis 214. More specifically, the vane assembly 218 includes an array of vanes 220 disposed around central longitudinal axis 214.

The rotor blades 216 are arranged in typically equally-spaced relation around the central longitudinal axis 214, and each blade has a root 222 and a tip 224 and a span defined therebetween. Similarly, the vanes 220 are also arranged in typically equally-spaced relation around the central longitudinal axis 214, and each has a root 226 and a tip 228 and a span defined therebetween. The rotor assembly 212 further includes a hub 245 located forward of the plurality of rotor blades 216.

Additionally, the engine 210A includes a turbomachine 230 having a core 232 (or high pressure/high speed system) and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The core 232 generally includes a high speed compressor 234, a high speed turbine 236, and a high speed shaft 238 extending therebetween and connecting the high speed compressor 234 and high speed turbine 236. The high speed compressor 234, the high speed turbine 236, and the high speed shaft 238 may collectively be referred to as a high speed spool 253 of the engine. Further, a combustion section 240 is located between the high speed compressor 234 and high speed turbine 236. The combustion section 240 may include one or more configurations for receiving a mixture of fuel and air, and providing a flow of combustion gasses through the high speed turbine 236 for driving the high speed spool 253.

The low speed system includes a low speed turbine 242, a low speed compressor 244 or booster, and a low speed shaft 246 extending between and connecting the low speed compressor 244 and low speed turbine 242. The low speed compressor 244, the low speed turbine 242, and the low speed shaft 246 may collectively be referred to as a low speed spool 255 of the engine.

Although the engine 210A is depicted with the low speed compressor 244 positioned forward of the high speed compressor 234, in certain embodiments the compressors 234, 244 may be in an interdigitated arrangement. Additionally, or alternatively, although the engine 210A is depicted with the high speed turbine 236 positioned forward of the low speed turbine 242, in certain embodiments the turbines 236, 242 may similarly be in an interdigitated arrangement.

In order to support the rotating components of the engine 210A, the engine 210A includes a plurality of bearings coupling the rotating components to various structural components. Specifically, as depicted in FIG. 2, bearings 290 support and facilitate rotation of the low speed shaft 246. Further, bearings 292 support and facilitate rotation of the high speed shaft 238. Although the bearings 290, 292 are illustrated as being located generally at forward and aft ends of their associated shafts 246, 238, the bearings 290, 292 may be located at any desired location along their associated shafts. Moreover, in some embodiments, one or more additional bearings other than the bearings 290 shown in FIG. 2 can be used to support the low speed shaft 246. For instance, in some embodiments, an additional bearing can be positioned at a central or mid-span region of the low speed shaft 246 provides support thereto. Similarly, one or more additional bearings other than the bearings 290 shown in FIG. 2 can be used to support the high-speed shaft 238. The bearings 290, 290 can be any suitable type of bearings, such as air bearings, oil-lubricated bearings, etc.

Referring still to FIG. 2, the turbomachine 230 is generally encased in a cowl 248. Moreover, it will be appreciated that the cowl 248 defines at least in part an inlet 250 and an exhaust 252, and includes a turbomachinery flowpath 254 extending between the inlet 250 and the exhaust 252. The inlet 250 is, for the embodiment shown, an annular or axisymmetric 360 degree inlet 250 located between the rotor assembly 212 and the fixed or stationary vane assembly 218 along the axial direction A, and provides a path for incoming atmospheric air to enter the turbomachinery flowpath 254 (and compressors 244, 234, combustion section 240, and turbines 236, 242) inwardly of the guide vanes 220 along the radial direction R. Such a location may be advantageous for a variety of reasons, including management of icing performance as well as protecting the inlet 250 from various objects and materials as may be encountered in operation. In other embodiments, however, the inlet 250 may be positioned at any other suitable location, e.g., aft of the vane assembly 218, arranged in a non-axisymmetric manner, etc.

As depicted, the rotor assembly 212 is driven by the turbomachine 230, and more specifically, the low speed spool 255 of the turbomachine 230. More specifically, for this embodiment, the engine 210A includes a power gearbox 256. The rotor assembly 212 is driven by the low speed spool 255 of the turbomachine 230 across the power gearbox 256. In such a manner, the rotating rotor blades 216 of the rotor assembly 212 may rotate around the central longitudinal axis 214 and generate thrust to propel engine 210A, and hence, the aircraft 100 (FIG. 1) to which it is associated, in a forward direction F. The power gearbox 256 can include a gearset for decreasing a rotational speed of the low speed spool 255 relative to the low speed turbine 242 such that the rotor assembly 212 may rotate at a slower rotational speed than the low speed spool 255.

As briefly noted above, the engine 210A includes vane assembly 218. The vane assembly 218 extends from the cowl 248 and is positioned aft of the rotor assembly 212. The vanes 220 of the vane assembly 218 may be mounted to a stationary frame or other mounting structure and do not rotate relative to the central longitudinal axis 214. For reference purposes, FIG. 2 depicts the forward direction with arrow F, which in turn defines the forward and aft portions of the engine 210A. As shown in FIG. 2, the rotor assembly 212 is located forward of the turbomachine 230 in a "puller" configuration and the exhaust 252 is located aft of the guide vanes 220. The vanes 220 of the vane assembly 218 are aerodynamically contoured to straighten out an airflow (e.g., reducing a swirl in the airflow) from the rotor assembly 212 to increase an efficiency of the engine 210A. For example, the vanes 220 may be sized, shaped, and configured to impart a counteracting swirl to the airflow from the rotor blades 216 so that in a downstream direction aft of both rows of airfoils (e.g., blades 216, vanes 220) the airflow has a greatly reduced degree of swirl, which may translate to an increased level of induced efficiency.

In some embodiments, it may be desirable that the rotor blades 216, the vanes 220, or both, incorporate a pitch change mechanism such that the airfoils (e.g., blades 216, vanes 220, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 216, or to provide a thrust reversing feature which may be useful in certain operating conditions, such as upon landing an aircraft, or to desirably adjust acoustic noise produced at least in part by the rotor blades 216, the vanes 220, or aerodynamic interactions from the rotor blades 216 relative to the vanes 220. More specifically, for the embodiment of FIG. 2, the rotor assembly 212 is depicted with a pitch change mechanism 258 for rotating the rotor blades 216 about their respective pitch axes 260, and the vane assembly 218 is depicted with a pitch change mechanism 262 for rotating the vanes 220 about their respective pitch axes 264.

The exemplary single rotor unducted engine 210A depicted in FIG. 2 is provided by way of example only. Accordingly, it will be appreciated that the engine 210A may have other suitable configurations. For example, in other example embodiments, the engine 210A can have other suitable numbers of shafts or spools, turbines, compressors, etc.; fixed-pitch blades or vanes 216, 220, or both; a direct-drive configuration (i.e., may not include the gearbox 256); etc. For example, in other exemplary embodiments, the engine 210A may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally or alternatively, in other exemplary embodiments, any other suitable gas turbine engine may be provided. For example, in other exemplary embodiments, the gas turbine engine may be a turboshaft engine, a turboprop engine, turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Figure 3:
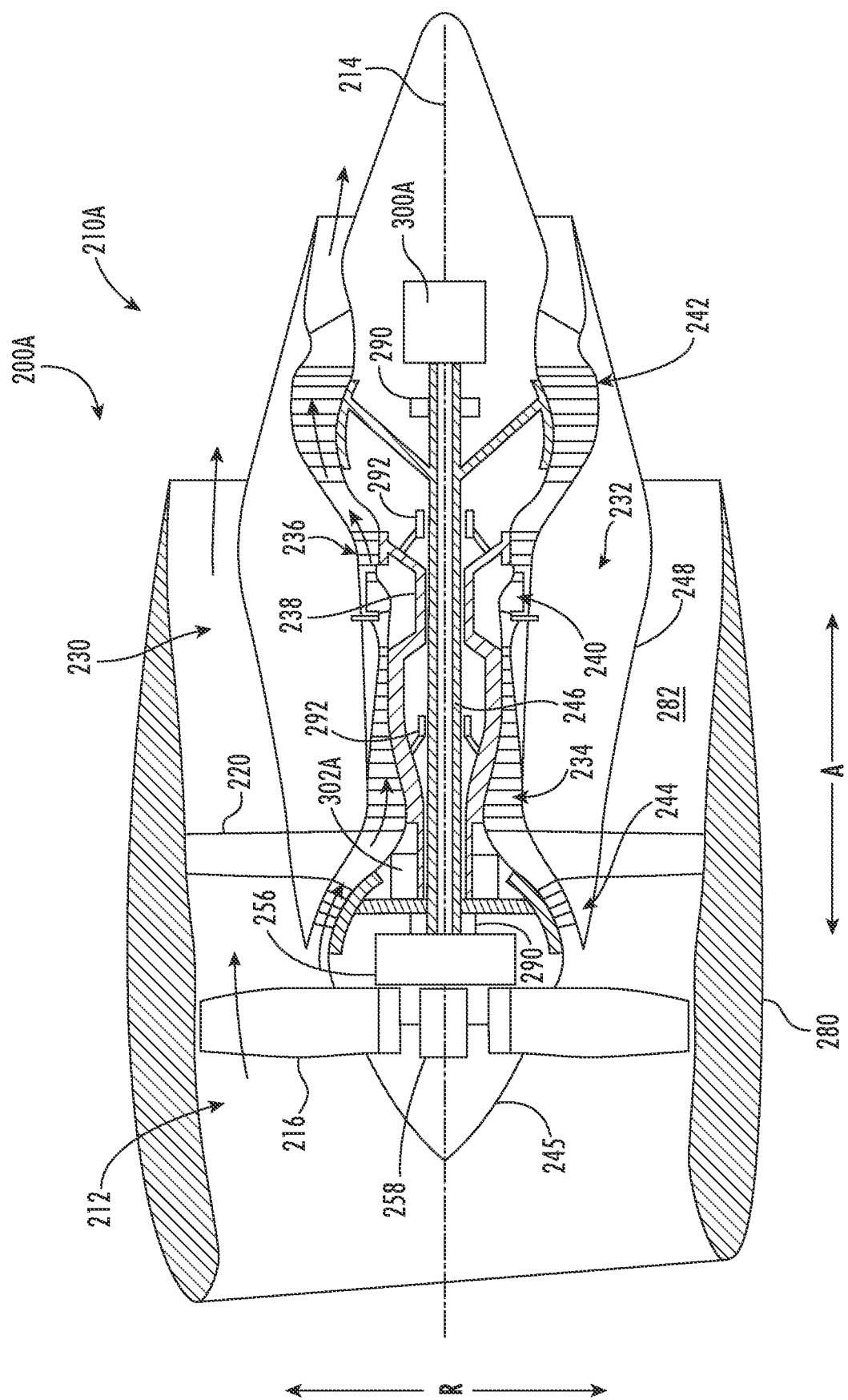
FIG. 3 provides a schematic cross-sectional view of a hybrid-electric propulsor that may be implemented with the aircraft of FIG. 1.

Further, in other exemplary embodiments, the engine 210A may be configured as a ducted turbofan engine. For example, referring briefly to FIG. 3, an engine 210A in accordance with another exemplary embodiment of the present disclosure is depicted. The exemplary embodiment of FIG. 3 may be configured in substantially the same manner as the exemplary engine 210A described above with respect to FIG. 2 except as noted below. The same or similar reference numerals may refer to the same or similar parts. As shown, the engine 210A of FIG. 3 includes a nacelle 280 circumferentially surrounding at least in part the rotor assembly 212 and turbomachine 230, defining a bypass passage 282 therebetween. The vanes 220 of the vane assembly 218 extend between and connect the nacelle 280 with the cowl 248.

Referring again to FIG. 2, as noted, the first propulsor 200A includes electric machine 300A operably coupled with a rotating component thereof. In this regard, the first propulsor 200A is an aeronautical hybrid-electric propulsion machine. Particularly, as shown in FIG. 2, the electric machine 300A is mechanically coupled with the low speed spool 255 of the gas turbine engine 210A, and more particularly, the low speed shaft 246 of the low speed spool 255. As depicted, the electric machine 300A is embedded within the core of the gas turbine engine 210A. Specifically, the electric machine 300A is positioned inward of the turbomachinery flowpath 254 along the radial direction R. Moreover, for this embodiment, the electric machine 300A is positioned generally at the aft end of the gas turbine engine 210A and is at least partially overlapping with or aft of the low pressure turbine 242 along the axial direction A. However, in other exemplary embodiments, the electric machine 300A may be positioned at other suitable locations within the gas turbine engine 210A. For instance, in some embodiments, the electric machine 300A can be coupled with the low speed spool 255 in other suitable locations. For instance, in some embodiments, the electric machine 300A can be positioned forward of the low pressure compressor 244 along the axial direction A and inward of the turbomachinery flowpath 254 along the radial direction R. Further, as shown in FIG. 2, the electric machine 300A mechanically coupled with the low speed shaft 246 is electrically coupled with the power bus 184 and is electrically connected to its associated power converter supply 188A.

In addition or alternatively to the gas turbine engine 210A having electric machine 300A coupled to the low speed spool 255, in some embodiments, the gas turbine engine 210A can include an electric machine 302A mechanically coupled with the high speed spool 253 of the gas turbine engine 210A, and more particularly, the high speed shaft 238 of the high speed spool 253. As depicted in FIG. 2, the electric machine 302A is embedded within the core of the gas turbine engine 210A and is mechanically coupled with the high speed shaft 238. The electric machine 302A is positioned inward of the turbomachinery flowpath 254 along the radial direction R and is positioned forward of the combustion section 140 along the axial direction A. However, in other exemplary embodiments, the electric machine 302A may be positioned at other suitable locations within the gas turbine engine 210A. Although not shown, the electric machine 302A mechanically coupled with the high speed shaft 238 can be electrically coupled with the power bus 184 and can be electrically connected to its own power converter supply.

Like the electric machine 300A mechanically coupled with the low speed spool 255, the electric machine 302A mechanically coupled with the high speed spool 253 can be an electric motor operable to drive or motor the high speed shaft 238, e.g., during an engine burst. In other embodiments, the electric machine 302A can be an electric generator operable to convert mechanical energy into electrical energy. In this way, electrical power generated by the electric machine 302A can be directed to various engine and/or aircraft systems. In some embodiments, the electric machine 302A can be a motor/generator with dual functionality.

Figure 4:
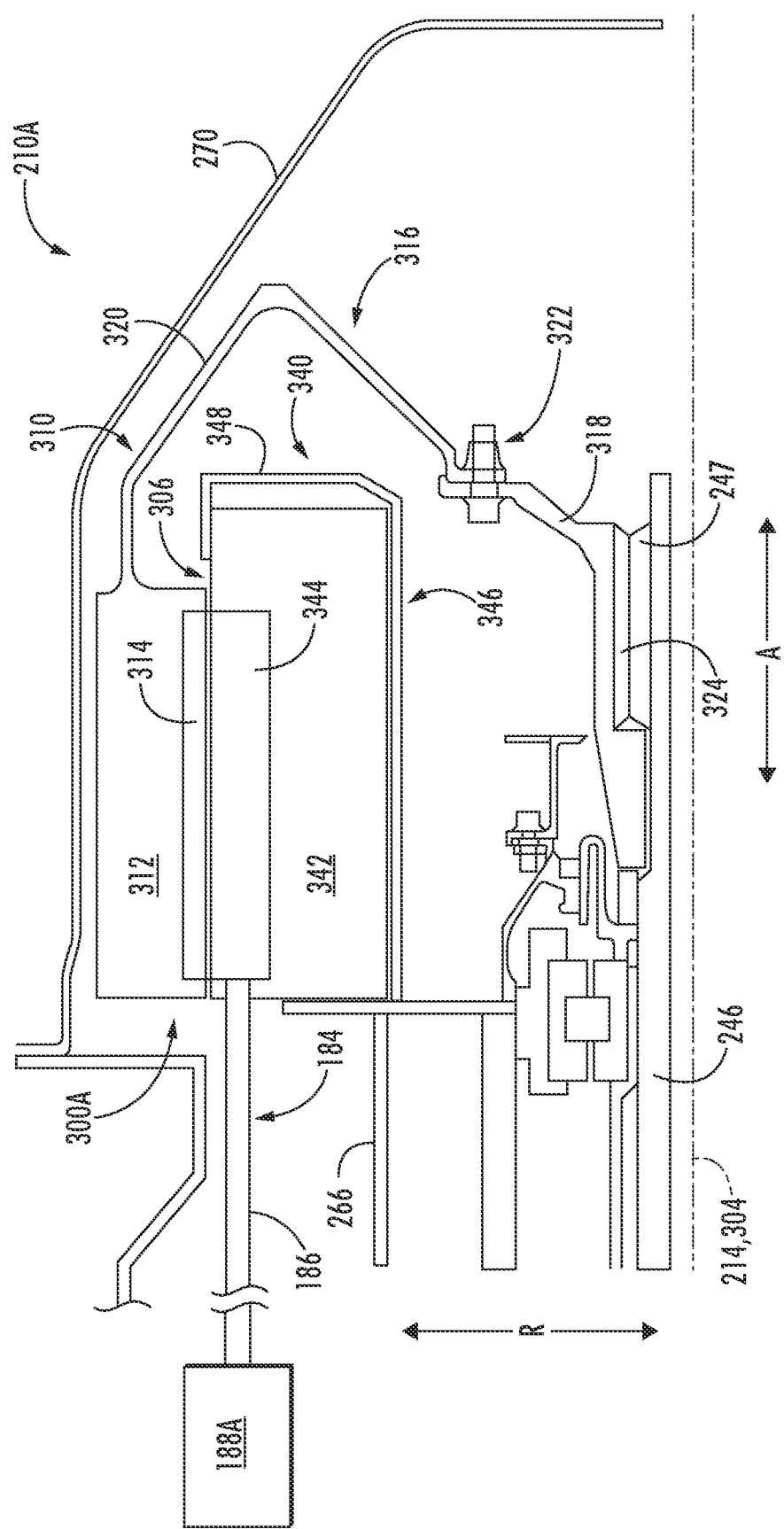
FIG. 4 provides a schematic cross-sectional view of an electric machine embedded in a gas turbine engine of the hybrid-electric propulsor of FIG. 2.

FIG. 4 provides a close-up, schematic view of the electric machine 300A embedded within the gas turbine engine 210A. As depicted, the electric machine 300A defines a centerline 304, which is aligned with or coaxial with the central longitudinal axis 214 of the gas turbine engine 210A in this example embodiment. The electric machine 300A includes a rotor assembly 310 and a stator assembly 340. The rotor assembly 310 includes a rotor 312 and the stator assembly 340 includes a stator 342. The rotor 312 of the rotor assembly 310 and the stator 342 of the stator assembly 340 together define an air gap 306 therebetween. Moreover, for this embodiment, the rotor 312 includes a plurality of magnets 314, such as a plurality of permanent magnets, and the stator 342 includes a plurality of windings or coils 344. As such, the electric machine 300A may be referred to as a permanent magnet electric machine. However, in other exemplary embodiments, the electric machine 300A may be configured in any suitable manner. For example, the electric machine 300A may be configured as an electromagnetic electric machine, including a plurality of electromagnets and active circuitry, as an induction type electric machine, a switched reluctance type electric machine, a synchronous AC electric machine, an asynchronous electric machine, or as any other suitable type of electric machine.

The rotor assembly 310 also includes a rotor connection assembly 316. Generally, the rotor connection assembly 316 operatively couples the rotor 312 with the low speed shaft 246. As the rotor assembly 310 of the electric machine 300A is coupled with or attached to the low speed shaft 246, the rotor assembly 310 is rotatable with the low speed shaft 246. As shown, the rotor connection assembly 316 has a rotor hub 318 and a rotor connection member 320. The rotor hub 318 is connected to the low speed shaft 246 and the rotor connection member 320 is connected to the rotor 312. The rotor hub 318 and the rotor connection member 320 are mechanically coupled or connected with one another at a joint 322.

For this embodiment, the rotor hub 318 of the rotor connection assembly 316 is connected to the low speed shaft 246 through a splined connection. More particularly, the rotor hub 318 includes a connection portion having a plurality of teeth 324. Similarly, the low speed shaft 246 includes a connection portion having a plurality of teeth 247. The plurality of teeth 324 of the rotor hub 318 are configured to engage with the plurality of teeth 247 of the low speed shaft 246, fixing the two components to one another. In alternative embodiments, the rotor hub 318 may be coupled to the low speed shaft 246 in any other suitable manner.

The stator assembly 340 also includes a stator connection assembly 346. The stator connection assembly 346 includes a stator connection member 348 that supports the stator 342. The stator connection member 348 is connected to a structural support member 266 of the turbine section of the gas turbine engine 210A. The structural support member 266 can be configured as part of an aft frame assembly of the gas turbine engine 210A. The aft frame assembly can include an aft strut 268 (FIG. 2) extending through the turbomachinery flowpath 254 along the radial direction R. The aft frame strut 268 provides structural support for the aft end of the cowl 248.

The gas turbine engine 210A further includes a cavity wall 270 surrounding at least a portion of the electric machine 300A. More specifically, the cavity wall 270 substantially completely surrounds the electric machine 300A, extending from a location proximate a forward end of the electric machine 300A to a location aft of the electric machine 300A along the axial direction A. The cavity wall 270 may function as, e.g., a cooling air cavity wall, a sump for cooling fluid, a protective cover for the electric machine 300A, etc. In some embodiments, the gas turbine engine 210A may further include a second cavity wall (not shown) to form a buffer cavity surrounding the electric machine 300A. The buffer cavity formed by the second cavity wall may thermally protect the electric machine 300A.

During certain operations of the gas turbine engine 210A, the low speed shaft 246 rotates the rotor assembly 310 of the electric machine 300A, allowing the electric machine 300A to generate electrical power. Thus, the electric machine 300A is operable in a generator mode. In some embodiments, in addition or alternatively to being operable in a generator mode, the electric machine 300A is operable in a drive mode during certain operations of the gas turbine engine 210A. In a drive mode, the rotor assembly 310 of the electric machine 300A drives the low speed shaft 246. The power converter 188A (FIG. 2) can be controlled to provide electrical power to the electric machine 300A via the electric lines 186, e.g., when the electric machine 300A is operating in a drive mode, and electrical power generated by the electric machine 300A can be carried or transmitted to the power converter 188A (FIG. 2) and ultimately to various electrical loads via the electric lines 186, e.g., when the electric machine 300A is operating in a generator mode. As shown best in FIG. 2, the electric lines 186 of the power bus 184 may extend through the turbomachinery flowpath 254

(e.g., through the aft frame strut 268) and electrically connect the electric machine 300A to the power converter 188A and ultimately to one or more electrical loads (accessory systems, electric/hybrid-electric propulsion devices, etc., electrical sources (other electric machines, electric energy storage units, etc., or both.

Figure 5:
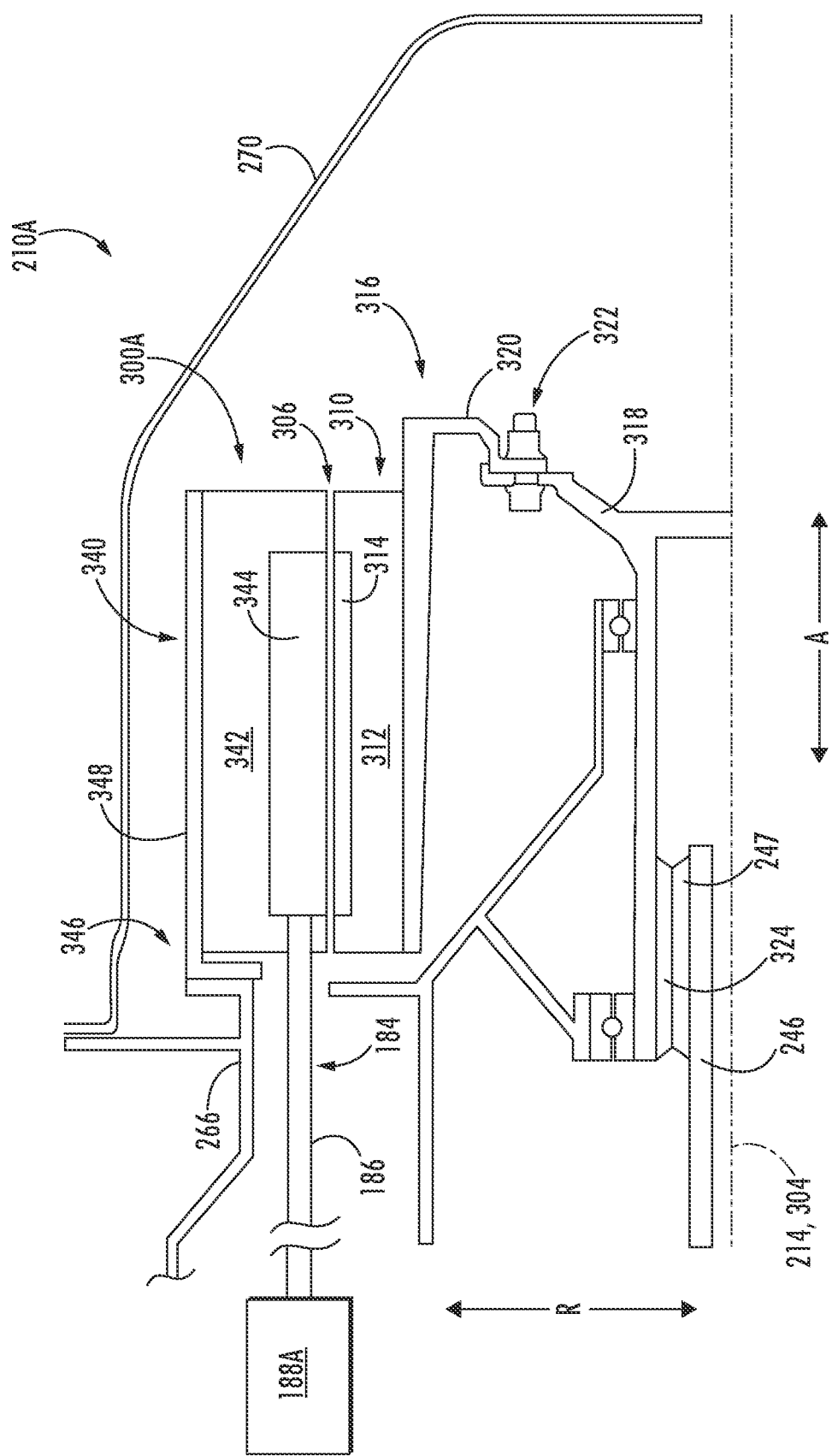
FIG. 5 provides a schematic cross-sectional view of an electric machine having an inner-rotor configuration and being embedded in a gas turbine engine according to various exemplary embodiments of the present disclosure.

Although the electric machine 300A has been described and illustrated in FIG. 4 as having a particular configuration, it will be appreciated that the inventive aspects of the present disclosure may apply to electric machines having alternative configurations. For instance, the stator assembly 340 and/or rotor assembly 310 may have different configurations or may be arranged in a different manner than illustrated in FIG. 4. As one example, the electric machine 300A may have an inner-rotor configuration as shown in FIG. 5 rather than the outer-rotor configuration shown in FIG. 4. In an inner-rotor configuration, as depicted in FIG. 5, the rotor 312 is positioned inward of the stator 342 along the radial direction R. In an outer-rotor configuration, as shown in FIG. 4, the rotor 312 is positioned outward of the stator 342 along the radial direction R. As another example, in some embodiments, the electric machine 300A may have a tapered configuration in which the rotor 312 and the stator 342 may extend lengthwise along the axial direction A at an angle with respect to the central longitudinal axis 214, e.g., so that they are not oriented parallel with the central longitudinal axis 214.

As noted previously, the inventors of the present subject matter have developed architectures and control schemes that may reduce common mode emissions and associated electromagnetic interference in electrical power systems having an electric machine and a power converter system electrically coupled thereto. For instance, in one example aspect, polyphase or multiphase windings of an electric machine are arranged to operate under complementary excitation and PWM excitations are synthesized at the power converter system to reduce common mode emissions by cancelation. Various embodiments of such electrical power systems are provided herein.

Figure 6:
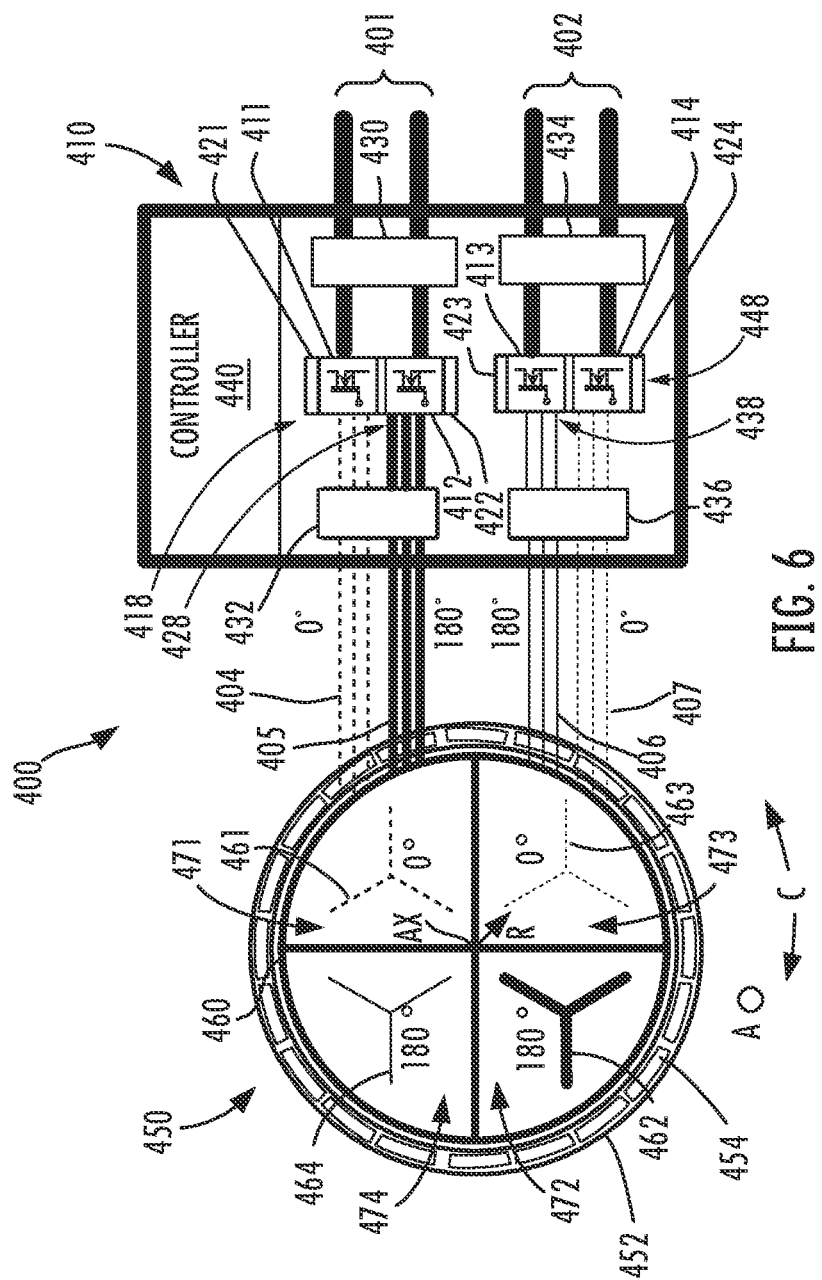
FIG. 6 provides a schematic view of an electrical power system according to one example embodiment of the present disclosure.
Figure 7:
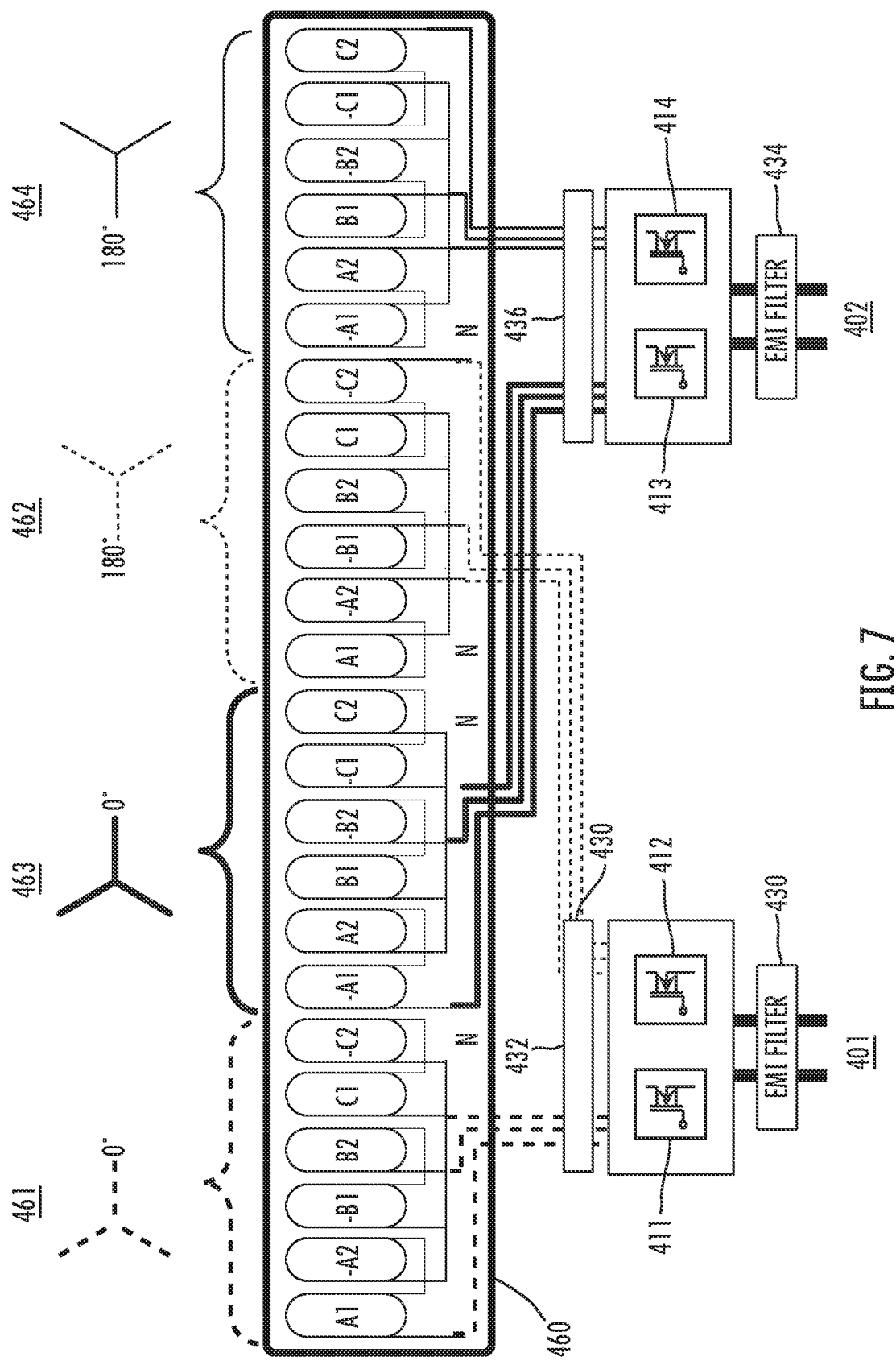
FIG. 7 provides a schematic view of the multiphase windings of the electric machine of FIG. 6.
Figure 8:
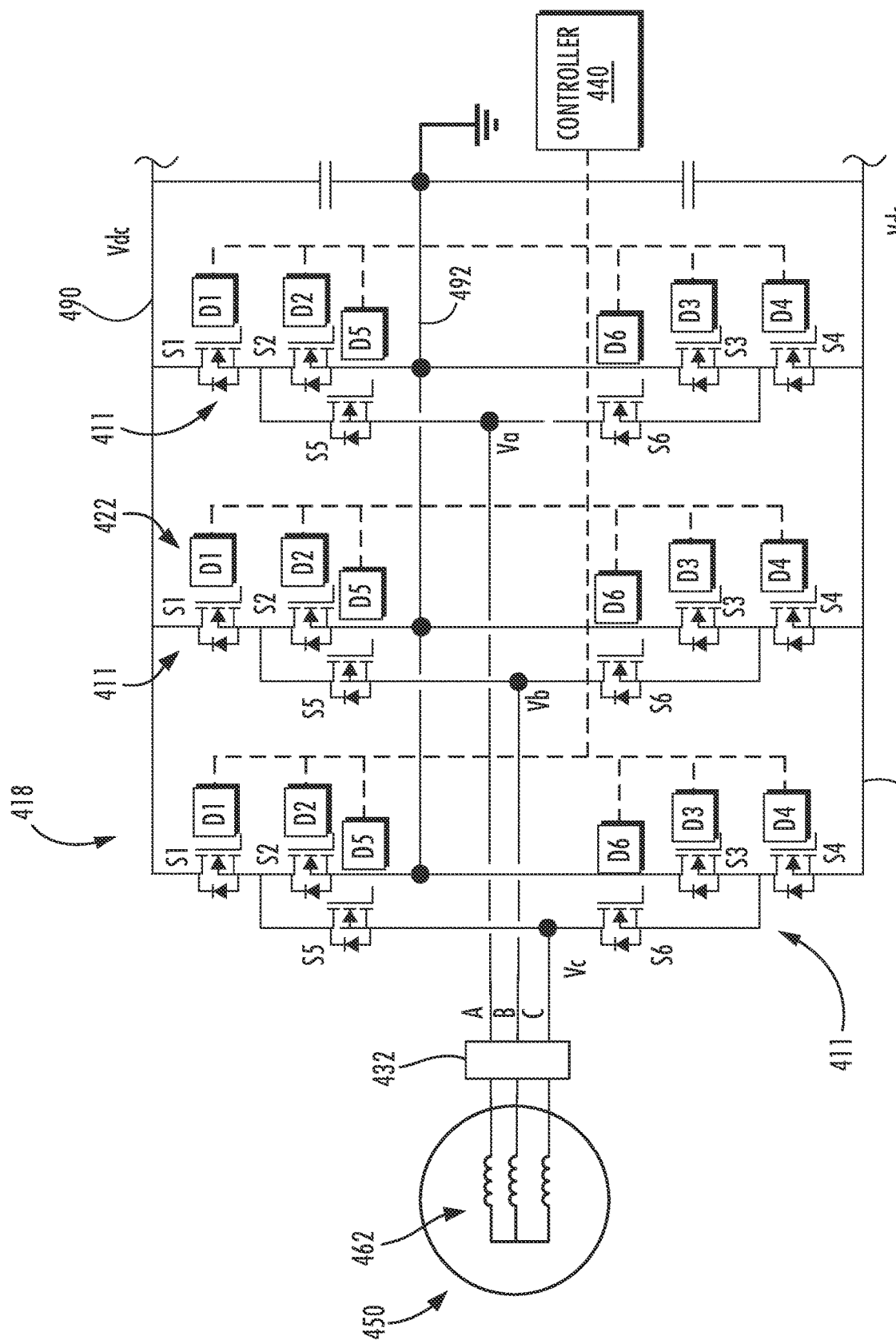
FIG. 8 provides a schematic view of first switching elements of a power converter system electrically coupled with a first multiphase winding of the power system of FIG. 6.

With reference now to FIGS. 6, 7, and 8, FIG. 6 provides a schematic view of a power system 400 that includes an electric machine 450 according to one example embodiment of the present disclosure. FIG. 7 provides a schematic view of the multiphase windings of the electric machine 450. FIG. 8 provides a schematic view of a first power converter unit 418 of a power converter system 410 (FIG. 6) of the power system 400. Generally, the power system 400 includes power converter system 410, electric machine 450, and a plurality of electrical cables 404, 405, 406, 407 electrically coupling the power converter system 410 and the electric machine 450. The electric cables 404, 405, 406, 407 can be shielded cables, for example.

For this embodiment, the power converter system 410 is an AC/DC power converter system. For the depicted embodiment, the power converter system 410 has a first power converter unit 418, a second power converter unit 428, a third power converter unit 438, and a fourth power converter unit 448. The power converter units 418, 428, 438, 448 can be separate or independent units, or alternatively, can be units of a single power converter. In FIG. 6, the first power converter 418 and the second power converter 428 form a single power converter by connecting the DC output in series or parallel. Similarly, in FIG. 6, the third power converter 438 and the fourth power converter 448 form a single power converter by connecting the DC output in series or parallel. The first and second power converter units 418, 428 are associated with a first channel 401 and the third and fourth power converter units 438, 448 are associated with a second channel 402. In FIG. 6, the first channel 401 is a dual DC output channel, and likewise, the second channel 402 is a dual DC output channel. In some alternative embodiments, the first power converter unit 418 can be associated with a first channel, the second power converter unit 428 can be associated with a second channel, the third power converter unit 438 can be associated with a third channel, and the fourth power converter unit 448 can be associated with a fourth channel. In such embodiments, the first, second, third, and fourth channels can be single DC output channels.

The first power converter unit 418 includes first switching elements 411, the second power converter unit 428 includes second switching elements 412, the third power converter unit 438 includes third switching elements 413, and the fourth power converter unit 448 includes fourth switching elements 414. The first switching elements 411 correspond to all switching elements of the first power converter unit 418, the second switching elements 412 correspond to all switching elements of the second power converter unit 428, the third switching elements 413 correspond to all switching elements of the third power converter unit 438, and the fourth switching elements 414 correspond to all switching elements of the fourth power converter unit 448. The first, second, third, and fourth switching elements 411, 412, 413, 414 can be any suitable type of switching elements, such as insulated gate bipolar transistors, power MOSFETs, etc.

The first, second, third, and fourth switching elements 411, 412, 413, 414 can each include switching elements for each phase of power of the power system 400. By way of example, with reference to FIG. 8, the first switching elements 411 include a plurality of switching devices or elements associated with each phase. Particularly, for this embodiment, the first switching elements 411 include a first switching element S1, a second switching element S2, a third switching element S3, a fourth switching element S4, a fifth switching element S5, and a sixth switching element S6 associated with an A phase. The first switching elements 411 also include a first switching element S1, a second switching element S2, a third switching element S3, a fourth switching element S4, a fifth switching element S5, and a sixth switching element S6 associated with a B phase. Further, the first switching elements 411 include a first switching element S1, a second switching element S2, a third switching element S3, a fourth switching element S4, a fifth switching element S5, and a sixth switching element S6 associated with a C phase. The second, third, and fourth switching elements 412, 413, 414 of the second power converter unit 428, the third power converter unit 438, and the fourth power converter unit 448 illustrated schematically in FIG. 6 can be arranged in a similar manner as the first switching elements 411 of the first power converter unit 418 depicted in FIG. 8.

By turning on or off the switching devices or elements of the first switching elements 411, the AC phase terminal can be connected to one of the multiple DC bus rails. For the depicted embodiment of FIG. 8, there exists three DC bus rails, including a positive-DC bus rail 490, a mid-DC bus rail 492, and a negative-DC bus rail 494, constituting a three-level converter unit. Switching elements of a phase leg of the first power converter unit 418 can be connected to more than three DC bus rails in alternative embodiments. In yet other embodiments, a two-level converter unit can also be implemented in which switching elements of a phase leg can be connected to only two DC bus rails, such as a positive-DC bus rail and a negative-DC bus rail. As will be appreciated, turning on or off the switching devices or elements of the second, third, and fourth switching elements 412, 413, 414 can connect the AC phase terminal of a given power converter unit 428, 438, 448 to one of its multiple DC bus rails in a similar manner as described above with respect to the switching action of the first switching elements 411.

Moreover, the power system 400 can be grounded by connecting one of the DC bus rails 490, 492, 494 to a ground reference, which is typically a conductive frame of the power system 400. The ground reference can be disconnected or connected to one of the DC bus rails 490, 492, 494 through one or more high impedance devices, such as one or more resistors and/or capacitors. There may be parasitic capacitance between a DC rail and the frame inside and outside of the converter, which may provide a path for common mode emissions.

The first, second, third, and fourth switching elements 411, 412, 413, 414 can be controlled by one or more controllable devices. For instance, the switching elements 411, 412, 413, 414 can be controlled by one or more associated gate drivers. For the embodiment depicted in FIG. 6, one or more first gate drivers 421 are associated with the first switching elements 411, one or more second gate drivers 422 are associated with the second switching elements 412, one or more third gate drivers 423 are associated with the third switching elements 413, and one or more fourth gate drivers 424 are associated with the fourth switching elements 414. The one or more gate drivers 421, 422, 423, 424 can be controlled to drive or modulate their respective switching elements 411, 412, 413, 414, e.g., to control the electrical power provided to or drawn from the electric machine 450.

The first, second, third, and fourth gate drivers 421, 422, 423, 424 can each include one or more gate drivers. For instance, as depicted in FIG. 8, for the A phase, the first gate drivers 421 include a first driver D1 for driving the first switching element S1, a second driver D2 for driving the second switching element S2, a third driver D3 for driving the third switching element S3, a fourth driver D4 for driving the fourth switching element S4, a fifth driver D5 for driving the fifth switching element S5, and a second driver D6 for driving the sixth switching element S6. Likewise, for the B phase, the first gate drivers 421 include a first driver D1 for driving the first switching element S1, a second driver D2 for driving the second switching element S2, a third driver D3 for driving the third switching element S3, a fourth driver D4 for driving the fourth switching element S4, a fifth driver D5 for driving the fifth switching element S5, and a second driver D6 for driving the sixth switching element S6. Similarly, for the C phase, the first gate drivers 421 include a first driver D1 for driving the first switching element S1, a second driver D2 for driving the second switching element S2, a third driver D3 for driving the third switching element S3, a fourth driver D4 for driving the fourth switching element S4, a fifth driver D5 for driving the fifth switching element S5, and a second driver D6 for driving the sixth switching element S6. It will be appreciated that, in other example embodiments, more or less than the number of drivers depicted in FIG. 8 are possible. For instance, in some embodiments, one driver can drive multiple switching elements.

The power converter system 410 can also include one or more processors and one or more memory devices. The one or more processors and one or more memory devices can be embodied in one or more controllers or computing devices. For instance, for this embodiment, the one or more processors and one or more memory devices are embodied in a controller 440. The controller 440 can be communicatively coupled with various devices, such as the gate drivers 421, 422, 423, 424, one or more sensors, as well as other computing devices. The controller 440 can be communicatively coupled with such devices via a suitable wired and/or wireless connection. Generally, the controller 440 can be configured in the manner illustrated in FIG. 30 and described in the accompanying text.

In alternative embodiments, the one or more processors and one or more memory devices can be embodied in a plurality of controllers. For instance, in some embodiments, each power converter unit 418, 428, 438, 448 can have an associated controller for controlling the switching action of their respective switching elements 411, 412, 413, 414. In yet other embodiments, the first and second power converter units 418, 428 associated with the first channel 401 can have a dedicated controller for controlling the switching action of the first and second switching elements 411, 412. Likewise, the third and fourth power converter units 438, 448 associated with the second channel 402 can have a dedicated controller for controlling the switching action of the third and fourth switching elements 413, 414.

Furthermore, the power converter system 410 can include one or more electromagnetic interference filters, or EMI filters. For this embodiment, the power converter system 410 includes a first DC-side EMI filter 430 and a first AC-side EMI filter 432 associated with the first channel 401. The power converter system 410 also includes a second DC-side EMI filter 434 and a second AC-side EMI filter 436 associated with the second channel 402. Generally, the EMI filters 430, 432, 434, 436 can suppress electromagnetic noise transmitted along their respective channels 401, 402. In alternative embodiments, the first channel 401 of the power converter system 410 can include an EMI filter only on the AC side, only on the DC side, or need not include an EMI filter on either the AC or DC side. Additionally or alternatively, the second channel 402 of the power converter system 410 can include an EMI filter only on the AC side, only on the DC side, or need not include an EMI filter on either the AC or DC side.

The electric machine 450 defines an axial direction A (a direction into and out of the page in FIG. 6), a radial direction R, and a circumferential direction C. The electric machine 450 also defines an axis of rotation AX extending along the axial direction A. Further, as shown, the electric machine 450 has a rotor 452 and a stator 460. The rotor 452 can be mechanically coupled with a rotating component, such as a rotating component of a gas turbine engine. The rotor 452 is rotatable about the axis of rotation AX. The rotor 452 is depicted outward of the stator 460 along the radial direction R, and thus, the electric machine 450 is configured in an outer-rotor configuration. However, the inventive aspects of the present disclosure also apply to electric machines having an inner-rotor configuration.

The rotor 452 includes a plurality of magnets 454. The stator 460 includes a plurality of multiphase windings or coils wound therein, e.g., within slots defined between teeth of the stator 460. For the embodiment depicted, the stator 460 includes a first multiphase winding 461, a second multiphase winding 462, a third multiphase winding 463, and a fourth multiphase winding 464.

Each multiphase winding 461, 462, 463, 464 can include windings or coils for various power phases. For instance, as shown best in FIG. 7, the first multiphase winding 461 includes windings for the first phase A, the second phase B, and the third phase C. For the first phase A of the first multiphase winding 461, a go-side winding A1 of the first multiphase winding 461 goes through one of the slots of the stator 460, turns, and a return-side −A2 of the first multiphase winding 461 returns through one of the slots of the stator 460. For the second phase B of the first multiphase winding 461, a go-side winding B2 of the first multiphase winding 461 goes through one of the slots of the stator 460, turns, and a return-side −B1 of the first multiphase winding 461 returns through one of the slots of the stator 460. For the third phase C of the first multiphase winding 461, a go-side winding C1 of the first multiphase winding 461 goes through one of the slots of the stator 460, turns, and a return-side −C2 of the first multiphase winding 461 returns through one of the slots of the stator 460.

The second multiphase winding 462 also includes windings for the first phase A, the second phase B, and the third phase C. For the first phase A of the second multiphase winding 462, a go-side winding −A2 of the second multiphase winding 462 goes through one of the slots of the stator 460, turns, and a return-side A1 of the second multiphase winding 462 returns through one of the slots of the stator 460. For the second phase B of the second multiphase winding 462, a go-side winding −B1 of the second multiphase winding 462 goes through one of the slots of the stator 460, turns, and a return-side B2 of the second multiphase winding 462 returns through one of the slots of the stator 460. For the third phase C of the second multiphase winding 462, a go-side winding −C2 of the second multiphase winding 462 goes through one of the slots of the stator 460, turns, and a return-side C1 of the second multiphase winding 462 returns through one of the slots of the stator 460.

The third multiphase winding 463 also includes windings for the first phase A, the second phase B, and the third phase C. For the first phase A of the third multiphase winding 463, a go-side winding −A1 of the third multiphase winding 463 goes through one of the slots of the stator 460, turns, and a return-side A2 of the third multiphase winding 463 returns through one of the slots of the stator 460. For the second phase B of the third multiphase winding 463, a go-side winding −B2 of the third multiphase winding 463 goes through one of the slots of the stator 460, turns, and a return-side B1 of the third multiphase winding 463 returns through one of the slots of the stator 460. For the third phase C of the third multiphase winding 463, a go-side winding −C1 of the third multiphase winding 463 goes through one of the slots of the stator 460, turns, and a return-side C2 of the third multiphase winding 463 returns through one of the slots of the stator 460.

The fourth multiphase winding 464 also includes windings for the first phase A, the second phase B, and the third phase C. For the first phase A of the fourth multiphase winding 464, a go-side winding A2 of the fourth multiphase winding 464 goes through one of the slots of the stator 460, turns, and a return-side −A1 of the fourth multiphase winding 464 returns through one of the slots of the stator 460. For the second phase B of the fourth multiphase winding 464, a go-side winding B1 of the fourth multiphase winding 464 goes through one of the slots of the stator 460, turns, and a return-side −B2 of the fourth multiphase winding 464 returns through one of the slots of the stator 460. For the third phase C of the fourth multiphase winding 464, a go-side winding C2 of the fourth multiphase winding 464 goes through one of the slots of the stator 460, turns, and a return-side −C1 of the fourth multiphase winding 464 returns through one of the slots of the stator 460.

As depicted in FIGS. 6 and 8, the first multiphase winding 461 is electrically coupled with the first switching elements 411 of the power converter system 410, the second multiphase winding 462 is electrically coupled with the second switching elements 412, the third multiphase winding 463 is electrically coupled with the third switching elements 413, and the fourth multiphase winding 464 is electrically coupled with the fourth switching elements 414. For instance, FIG. 8 depicts the first switching elements 411 being electrically coupled with the A, B, and C phase windings of the first multiphase winding 461. It will be appreciated that the second, third, and fourth switching elements 412, 413, 414 illustrated schematically in FIG. 6 can be electrically coupled with their respective multiphase windings 462, 463, 464 in a similar manner as the first switching elements 411 are electrically coupled with the first multiphase winding 461 as depicted in FIG. 8.

Notably, the first multiphase winding 461 and the second multiphase winding 462 are electrically opposite in phase with respect to one another. That is, the angle of the AC voltage of the second multiphase winding 462 is electrically out of phase with respect to the angle of the AC voltage of the first multiphase winding 461 by one hundred eighty degrees (180°). For instance, for this embodiment, the first multiphase winding 461 has an AC voltage angle of zero degrees (0°) while the second multiphase winding 462 has an AC voltage angle of one hundred eighty degrees (180°). Thus, the first multiphase winding 461 and the second multiphase winding 462 are electrically opposite in phase with respect to one another.

In addition, for this embodiment, the third multiphase winding 463 and the fourth multiphase winding 464 are electrically opposite in phase with respect to one another. Stated another way, the angle of the AC voltage of the fourth multiphase winding 464 is electrically out of phase with respect to the angle of the AC voltage of the third multiphase winding 463 by one hundred eighty degrees (180°). For instance, for this embodiment, the third multiphase winding 463 has an AC voltage angle of zero degrees (0°) while the fourth multiphase winding 464 has an AC voltage angle of one hundred eighty degrees (180°). Accordingly, the third multiphase winding 463 and the fourth multiphase winding 464 are electrically opposite in phase with respect to one another.

As will be explained in greater detail herein, the first and second multiphase windings 461, 462 associated with the first channel 401 are arranged and configured to operate in opposite angle of AC voltage with respect to one another so that common mode voltage can be canceled or reduced via the PWM control scheme disclosed herein. Particularly, such an arrangement of the first and second multiphase windings 461, 462 ensures that their common mode voltage waveforms or waveform shapes are the same or nearly the same. Similarly, the third and fourth multiphase windings 463, 464 associated with the second channel 402 are arranged and configured to operate in opposite angle of AC voltage with respect to one another so that common mode voltage can be canceled or reduced via the PWM control scheme disclosed herein. Particularly, such an arrangement of the third and fourth multiphase windings 463, 464 ensures that their common mode voltage waveforms or waveform shapes are the same or nearly the same.

As best shown in FIG. 7, the multiphase windings 461, 462, 463, 464 can be strategically arranged in a two contraphase winding pair arrangement. Such an arrangement may facilitate balance of radial forces during operation of the electric machine 450, among other benefits. As shown, the first multiphase winding 461 is arranged opposite the second multiphase winding 462 along the radial direction R and the third multiphase winding 463 is arranged opposite the fourth multiphase winding 464 along the radial direction R. In this regard, the first multiphase winding 461 and the second multiphase winding 462 balance out the radial forces therebetween, and the third multiphase winding 463 and the fourth multiphase winding 464 balance out the radial forces therebetween. This allows the multiphase windings 461, 462 associated with the first channel 401 to be balanced and the multiphase windings 463, 464 associated with the second channel 402 to be balanced. Further, such a balanced arrangement of the multiphase windings 461, 462, 463, 464 allows for one of the channels to continue operating at its full power even in the event of non-use or failure of the channel.

Moreover, the stator 460 of the electric machine 450 defines a plurality of sectors or sections. Particularly, for this embodiment, the stator 460 defines four sectors, including a first sector 471, a second sector 472, a third sector 473, and a fourth sector 474. The sectors 471, 472, 473, 474 are or about of equal size. As shown, the first, second, third, and fourth multiphase windings 461, 462, 463, 464 are wound within a respective one of the sectors of the stator 460. More specifically, the first multiphase winding 461 is wound within the first sector 471, the second multiphase winding 462 is wound within the second sector 472, the third multiphase winding 463 is wound within the third sector 473, and the fourth multiphase winding 464 is wound within the fourth sector 474.

Figure 9:
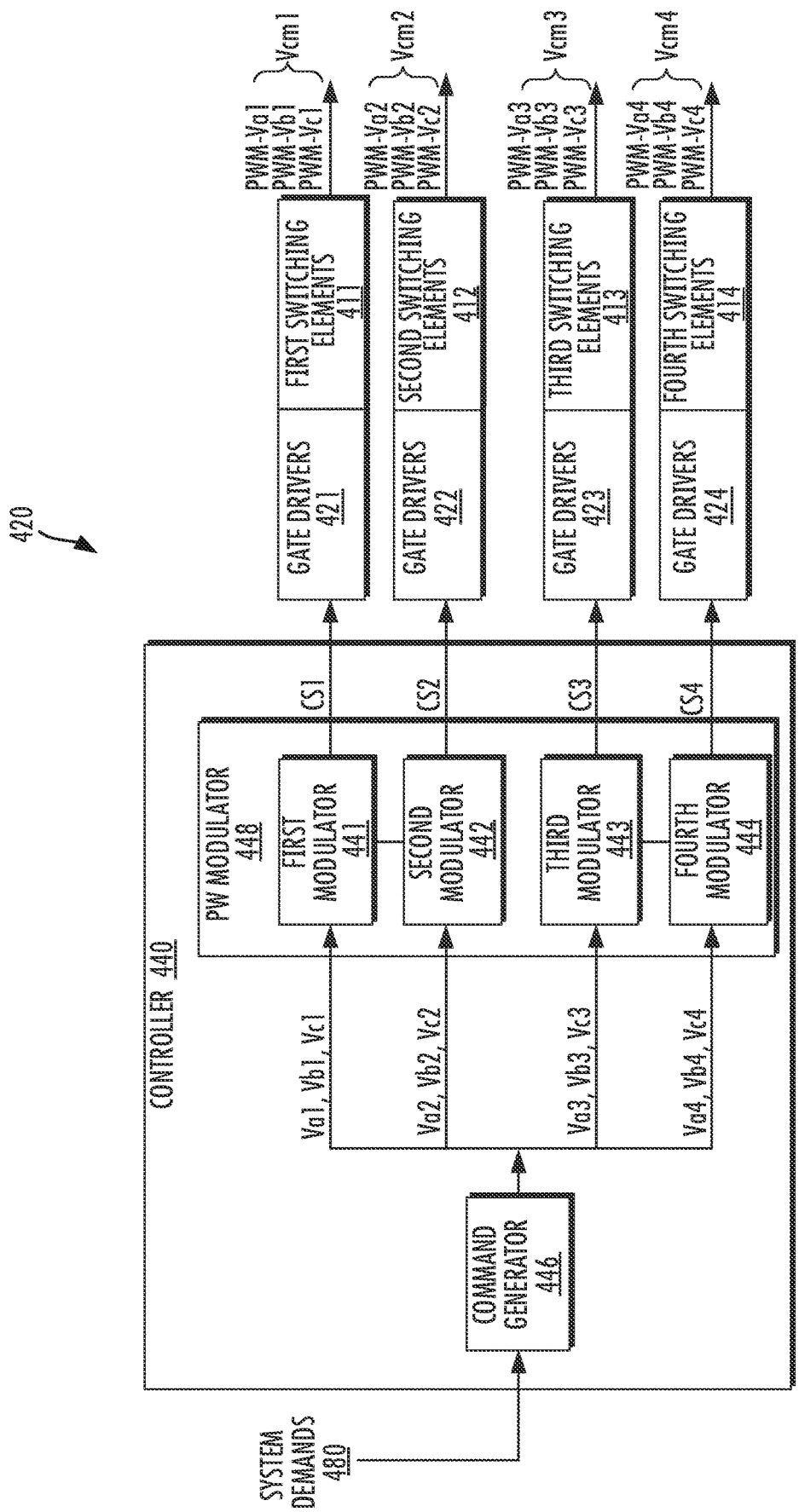
FIG. 9 provides a topology of a control system of the power system of FIG. 6.

With reference now to FIG. 9 in addition to FIGS. 6, 7, and 8, an example control scheme in which common mode emissions associated with the power system 400 can be canceled or reduced will now be provided. FIG. 9 provides a topology of a control system 420 of the power system 400 according to one example embodiment of the present disclosure. As shown, the controller 440, or more specifically one or more processors thereof, receive one or more system demands 480. The system demands 480 can be received from a system-level controller or computing device, such as controller 182 (FIG. 1). The system demands 480 can indicate what is required of the power system 400, such as a demanded electrical power output or thrust output of the propulsor to which the electric machine 450 is mechanically coupled.

A command generator 446, which can be a set of computer-executable instructions or logic, can be executed by the one or more processors of the controller 440 to generate one or more commands based at least in part on the system demands 480. The one or more processors of the controller 440 can execute the command generator 446 to generate voltage, electric current, torque, and/or other demands based at least in part on the system demands 480. Particularly, as shown in FIG. 9, the one or more processors of the controller 440 can execute the command generator 446 to generate voltage commands for each multiphase winding 461, 462, 463, 464. For instance, voltage commands Va1, Vb1, Vc1 can be generated for the first, second, and third phases A, B, C of the first multiphase winding 461. Similarly, voltage commands Va2, Vb2, Vc2 can be generated for the first, second, and third phases A, B, C of the second multiphase winding 462. Likewise, voltage commands Va3, Vb3, Vc3 can be generated for the first, second, and third phases A, B, C of the third multiphase winding 463. Moreover, voltage commands Va4, Vb4, Vc4 can be generated for the first, second, and third phases A, B, C of the fourth multiphase winding 464.

As further shown in FIG. 9, the voltage commands generated for each of the multiphase windings 461, 462, 463, 464 can be received by the one or more processors of the controller 440 and can be input into a pulse width modulator 448. The pulse width modulator 448, which can be a set of computer-executable instructions or logic, can be executed by the one or more processors of the controller 440 to generate one or more control signals. The one or more processors of the controller 440 can control the switching elements 411, 412, 413, 414 of the power converter system 410 to generate PWM signals based at least in part on the one or more control signals.

Particularly, as shown, the pulse width modulator 448 can include a first modulator 441 for generating first control signals CS1 associated with the first multiphase winding 461, a second modulator 442 for generating second control signals CS2 associated with the second multiphase winding 462, a third modulator 443 for generating third control signals CS3 associated with the third multiphase winding 463, and a fourth modulator 444 for generating fourth control signals CS4 associated with the fourth multiphase winding 464. The generated control signals CS1 and CS2 can be routed to their respective gate drivers 421, 422 as shown in FIG. 9. Based on the received control signals CS1, the gate drivers 421 can drive the first switching elements 411 to generate first PWM signals so as to render a first common mode signal Vcm1. Based on the received control signals CS2, the gate drivers 422 can drive the second switching elements 412 to generate second PWM signals so as to render a second common mode signal Vcm2. Based on the received control signals CS3, the gate drivers 423 can drive the third switching elements 413 to generate third PWM signals so as to render a third common mode signal Vcm3. Based on the received control signals CS4, the gate drivers 424 can drive the fourth switching elements 414 to generate fourth PWM signals so as to render a fourth common mode signal Vcm4.

Figure 10A:
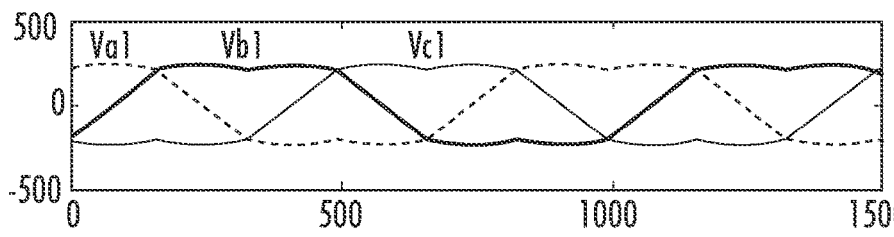
FIGS. 10A through 10D provide various graphs depicting voltage signals as a function of time.
Figure 10B:
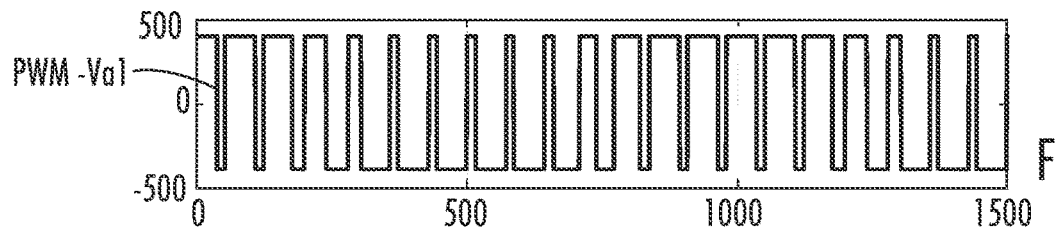

The control signals can be generated based at least in part on their associated voltage commands. By way of example, the graph of FIG. 10A depicts the voltage commands Va1, Vb1, Vc1 associated with the first, second, and third phases A, B, C of the first multiphase winding 461. In the graph of FIG. 10A, the amplitude of the voltage commands Va1, Vb1, Vc1 are shown as a function of time. Upon executing the first modulator 441 of the pulse width modulator 448, the one or more processors of the controller 440 can generate first control signals CS1. For instance, a first control signal CS1 associated with an A phase of the power system 400 can be generated based at least in part on the voltage command Va1. The first switching elements 411 can be controlled based on the first control signal CS1 associated with the A phase to generate a first PWM signal associated with the A phase of the power system 400, denoted as PWM-Va1 in the graph of FIG. 10B.

Likewise, upon executing the first modulator 441 of the pulse width modulator 448, the one or more processors of the controller 440 can generate a first control signal CS1 associated with a B phase of the power system 400 based at least in part on the voltage command Vb1. Although not depicted in FIGS. 10A through 10D (see FIG. 9), a first PWM signal PWM-vb1 associated with the B phase of the power system 400 can be generated based at least in part on the first control signal CS1 associated with the B phase. Similarly, upon executing the first modulator 441 of the pulse width modulator 448, the one or more processors of the controller 440 can generate a first control signal CS1 associated with a C phase of the power system 400 based at least in part on the voltage command Vc1. Although not depicted in FIGS. 10A through 10D (see FIG. 9), a first PWM signal PWM-vc1 associated with the C phase of the power system 400 can be generated based at least in part on the first control signal CS1 associated with the C phase. Accordingly, first PWM signals PWM-Va1, PWM-Vb1, PWM-Vc1 can be generated based at least in part on their respective voltage commands Va1, Vb1, Vc1. The graph of FIG. 11A depicts the voltage commands Va1, Vb1, Vc1 associated with the first, second, and third phases A, B, C of the first multiphase winding 461 (as does the graph of FIG. 10A). In the graph of FIG. 11A, the amplitude of the voltage commands Va1, Vb1, Vc1 are shown as a function of time.

Figure 11A:
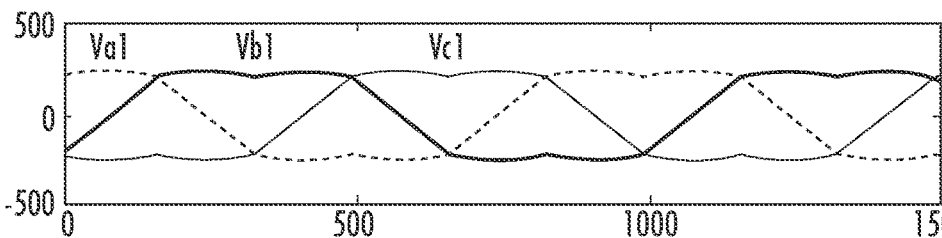
FIGS. 11A and 11B provide graphs depicting an example manner in which a pulse width modulated signal associated with a first multiphase winding of the electric machine of FIG. 6 can be generated.
Figure 11B:
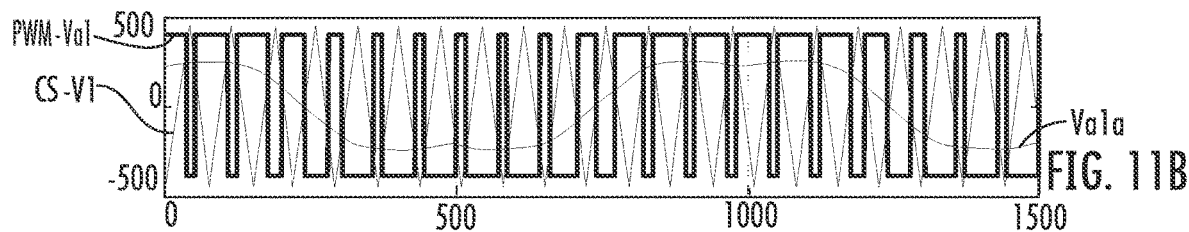

The first control signals/PWM signals can be generated using any suitable technique. As one example technique, the voltage command signals can be compared against or to a carrier signal. For instance, as shown in the graph of FIG. 11B, the voltage command Va1 can be compared against or to a carrier signal CS-V1. For this embodiment, the carrier signal CS-V1 has a triangular-shaped pattern, however, the carrier signal CS-V1 may have other suitable patterns or waveforms in other embodiments. In comparing the voltage command signal Va1 to the carrier signal CS-V1, in instances in which the voltage command Va1 is above the carrier signal CS-V1, the first switching elements 411 are controlled so that the generated first PWM signal PWM-Va1 has a maximum amplitude at that instance. In contrast, in instances in which the voltage command Va1 is below the first carrier signal CS-V1, the first switching elements 411 are controlled so that the generated first PWM signal PWM-Va1 has a minimum amplitude at that instance. In this manner, the first PWM signal Va1 can be generated based at least in part on its associated voltage command Va1. The first PWM signal PWM-Vb1 associated with voltage command Vb1 and the first PWM signal PWM-Vc1 associated with the voltage command Vc1 can be generated using the carrier-signal CS-V1 in the same manner. As a result, the first PWM signals can be generated based on their respective voltage commands using the comparison technique.

Generation of the first PWM signals PWM-Va1, PWM-Vb1, PWM-Vc1 renders a first common mode voltage signal Vcm1. The rendered first common mode voltage signal Vcm1 is shown depicted in the graph of FIG. 10C. The pattern or waveform of the first common mode voltage signal Vcm1 takes into account the first PWM signal PWM-Va1 generated based on voltage command Va1, the first PWM signal PWM-Vb1 generated based on voltage command Vb1, and the first PWM signal PWM-Vc1 generated based on voltage command Vc1. Particularly, for a given instance in time, the amplitude of the first common mode voltage signal Vcm1 can be an average amplitude of the three generated first PWM signals PWM-Va1, PWM-Vb1, PWM-Vc1 associated with the first multiphase winding 461. Stated another way, the first common mode voltage signal Vcm1 can be determined according to the following equation:

$$V_{cm1} = \frac{1}{3}(PWM-Va1 + PWM-Vb1 + PWM-Vc1) \quad \text{(Equation 1)}$$

wherein $V_{cm1}$ is the amplitude of the first common mode voltage signal, PWM-Va1 is the pulse width modulation signal generated based on voltage command Va1, PWM-Vb1 is the pulse width modulation signal generated based on voltage command Vb1, and PWM-Vc1 is the pulse width modulation signal generated based on voltage command Vc1.

Generation of second PWM signals PWM-Va2, PWM-Vb2, PWM-Vc2 renders the second common mode voltage signal Vcm2. The rendered second common mode voltage signal Vcm2 associated with the second multiphase winding 462 is depicted in the graph of FIG. 10D. The second common mode voltage signal Vcm2 can be rendered in a similar manner as the first common mode voltage signal Vcm1, except as provided below.

Figure 12A:
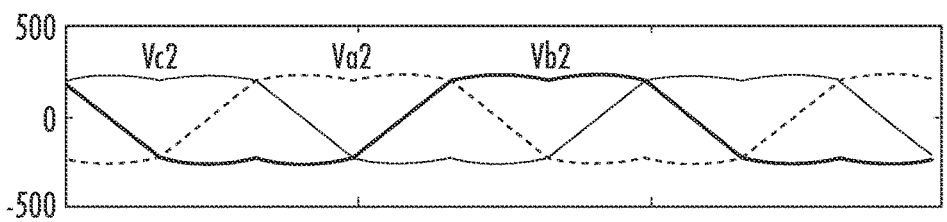
FIGS. 12A and 12B provide graphs depicting an example manner in which a pulse width modulated signal associated with a second multiphase winding of the electric machine of FIG. 6 can be generated.

The graph of FIG. 12A depicts the voltage commands Va2, Vb2, Vc2 associated with the first, second, and third phases A, B, C of the second multiphase winding 462. In the graph of FIG. 12A, the amplitude of the voltage commands Va2, Vb2, Vc2 are shown as a function of time. Notably, as the second multiphase winding 462 is arranged and wound to operate electrically opposite in phase with respect to the first multiphase winding 461, voltage commands Va2, Vb2, Vc2 are shown having opposite waveforms with respect to voltage commands Va1, Vb1, Vc1 (see the graph of FIG. 11B).

Upon executing the second modulator 442 of the pulse width modulator 448, the one or more processors of the controller 440 can generate second control signals CS2. For instance, a second control signal CS2 associated with the A phase of the power system 400 can be generated based at least in part on the voltage command Va2. The second switching elements 412 can be controlled based on the second control signal CS2 associated with the A phase to generate a second PWM signal PWM-Va2 associated with the A phase of the power system 400. A second control signal CS2 associated with the B phase of the power system 400 can be generated based at least in part on the voltage command Vb2. The second switching elements 412 can be controlled based on the second control signal CS2 associated with the B phase to generate a second PWM signal PWM-Vb2 associated with the B phase of the power system 400. Further, a second control signal CS2 associated with the C phase of the power system 400 can be generated based at least in part on the voltage command Vc2. The second switching elements 412 can be controlled based on the second control signal CS2 associated with the C phase to generate a second PWM signal PWM-Vc2 associated with the C phase of the power system 400.

Figure 12B:
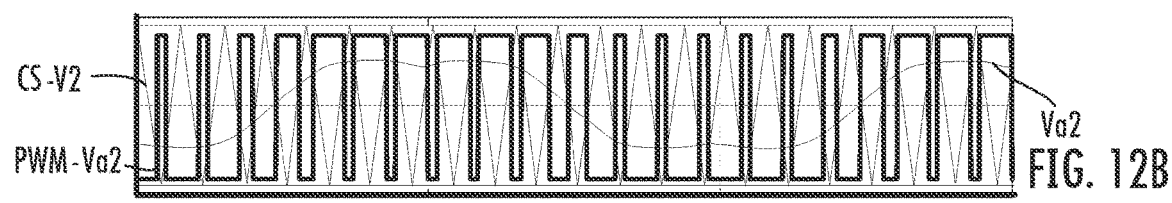

The second control signals/PWM signals can be generated using any suitable technique. As noted above, in some example embodiments a voltage command signal can be compared against or to a carrier signal. For instance, as shown in the graph of FIG. 12B, the voltage command signal Va2 can be compared against or to a second carrier signal CS-V2. For this embodiment, the second carrier signal CS-V2 has a triangular-shaped pattern, however, the second carrier signal CS-V2 may have other suitable patterns or waveforms in other embodiments. Notably, the one or more processors of the controller 440 have shifted the second carrier signal CS-V2 by one hundred eighty degrees (180°) with respect to the first carrier signal CS-V1 (see the graph of FIG. 11B). In this regard, the second carrier signal CS-V2 is an inverse of the first carrier signal CS-V1.

Referring to the graph of FIG. 12B, in comparing the voltage command Va2 to the second carrier signal CS-V2, in instances in which the voltage command Va2 is above the second carrier signal CS-V2, the second switching elements 412 are controlled so that the generated second PWM signal PWM-Va2 has a maximum amplitude at that instance. In contrast, in instances in which the voltage command Va2 is below the second carrier signal CS-V2, the second switching elements 412 are controlled so that the generated second PWM signal PWM-Va2 has a minimum amplitude at that instance. In this manner, the second PWM signal PWM-Va2 can be generated based at least in part on its associated voltage command Va2. The second PWM signals PWM-Vb2, PWM-Vc2 can be generated using the second carrier signal CS-V2 and their respective voltage commands Vb2, Vc2 in the same manner.

The pattern or waveform of the rendered second common mode voltage signal Vcm2 takes into account the second PWM signal PWM-Va2 generated based on voltage command Va2, the second PWM signal PWM-Vb2 generated based on voltage command Vb2, and the second PWM signal PWM-Vc2 generated based on voltage command Vc2. Particularly, for a given instance in time, the amplitude of the second common mode voltage signal Vcm2 can be an average amplitude of the three generated second PWM signals PWM-Va2, PWM-Vb2, PWM-Vc2 associated with the second multiphase winding 462. Stated differently, the second common mode voltage signal Vcm2 can be determined according to the following equation:

$$V_{cm2} = \frac{1}{3}(PWM-Va2 + PWM-Vb2 + PWM-Vc2) \quad \text{(Equation 2)}$$

wherein $V_{cm2}$ is the amplitude of the second common mode voltage signal, PWM-Va2 is the pulse width modulation signal generated based on voltage command Va2, PWM-Vb2 is the pulse width modulation signal generated based on voltage command Vb2, and PWM-Vc2 is the pulse width modulation signal generated based on voltage command Vc2.

Figure 10C:
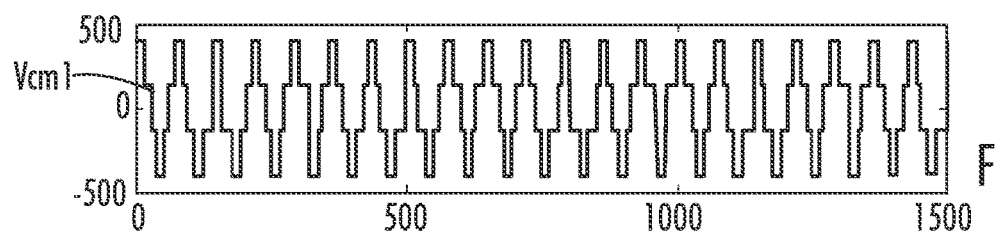
Figure 10D:
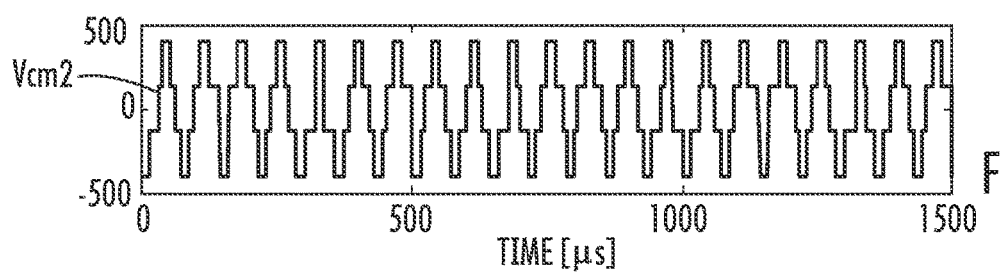

As will be appreciated by comparing the rendered first common mode signal Vcm1 depicted in the graph of FIG. 10C with the rendered second common mode signal Vcm2 depicted in the graph of FIG. 10D, the second common mode signal Vcm2 has the same or nearly the same waveform as the first common mode signal Vcm1 since the first multiphase winding 461 and the second multiphase winding 462 are arranged and configured to operate electrically opposite in phase with respect to one another. Moreover, shifting the second carrier signal CS-V2 by one hundred eighty degrees (180°) with respect to the first carrier signal CS-V1 effectively shifts the polarity of the second common mode signal Vcm2 with respect to the first common mode signal Vcm1.

Accordingly, when the first switching elements 411 are modulated by their associated gate drivers 421 based at least in part on the first control signals CS1, the first PWM signals PWM-Va1, PWM-Vb1, PWM-Vc1 are generated so as to render the first common mode signal Vcm1. Likewise, when the second switching elements 412 are modulated by their associated gate drivers 422 based at least in part on the second control signals CS2, the second PWM signals PWM-Va2, PWM-Vb2, PWM-Vc2 are generated so as to render the second common mode signal Vcm2. As the second common mode signal Vcm2 has the same or nearly the same waveform as the first common mode signal Vcm1 but with opposite polarity, common mode emissions associated with the first channel 401 can be canceled or reduced. Thus, a number of benefits may be realized. For instance, the need for EMI filters can be eliminated or at least one or more of the EMI filters can be reduced in size. Moreover, cancelation or reduction of the common mode emissions can reduce shaft voltage and bearing currents, thereby potentially: reducing bearing stress, eliminating the need for a shaft grounding brush, eliminating the need of a bearing insulation sleeve or ceramic bearing, and/or reducing leakage current through shaft loads, such as gears or sensors. Other benefits and advantages may be realized as well. Notably, cancellation of common mode emissions can be achieved in embodiments in which the first power converter unit 418 and the second power converter unit 428 are connected in series, parallel, or are independent units.

Figure 13:
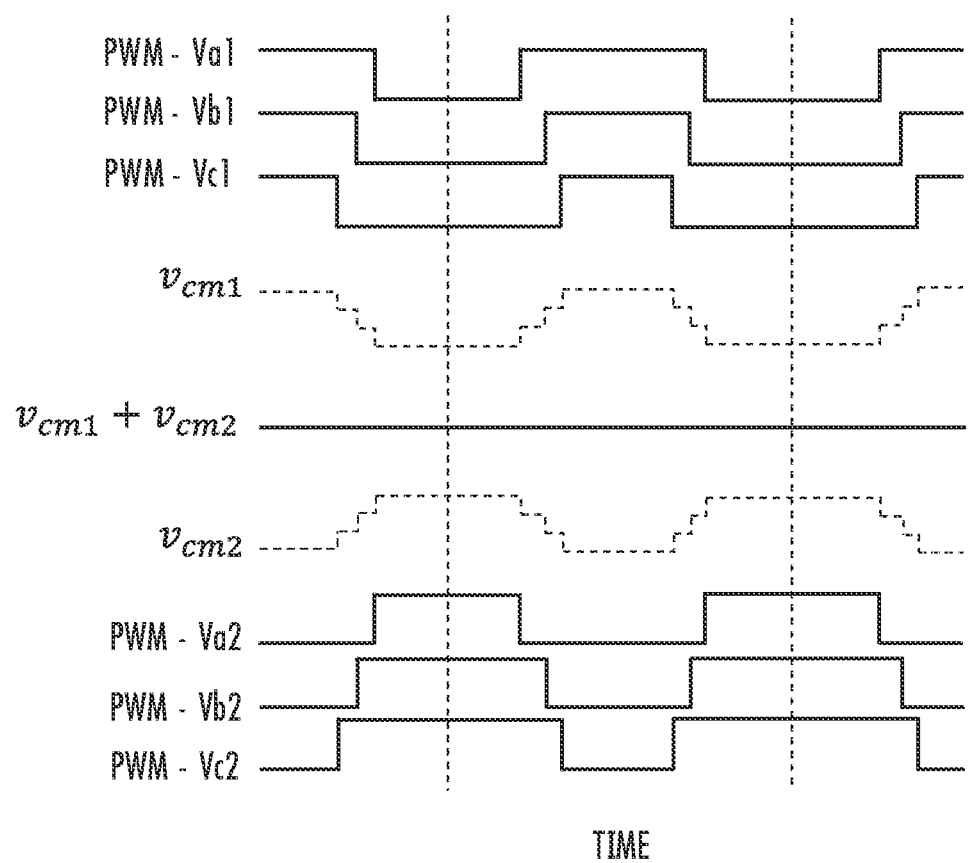
FIG. 13 depicts a simplified graph depicting various signals as a function of time.

FIG. 13 depicts a simplified graph depicting various signals as a function of time. Specifically, FIG. 13 shows the generated first PWM signals PWM-Va1, PWM-Vb1, PWM-Vc1 and the rendered first common mode signal Vcm1 as well as the generated second PWM signals PWM-Va2, PWM-Vb2, PWM-Vc2 and the rendered second common mode signal Vcm2. As shown, the first common mode signal Vcm1 "mirrors" the second common mode signal Vcm2. Consequently, the sum of the first common mode signal Vcm1 and the second common mode signal Vcm2 is essentially a flat constant line, which is representative of ideal common mode cancelation.

As will be appreciated, common mode emissions associated with the second channel 402 can be reduced or eliminated in the same or similar manner as described above with respect to the first channel 401. Generally, a third common mode voltage signal Vcm3 can be rendered in the same or similar as described above with respect to the first common mode signal Vcm1. Particularly, upon executing the third modulator 443 of the pulse width modulator 448, the one or more processors of the controller 440 can generate third control signals CS3. For instance, a third control signal CS3 associated with the A phase of the power system 400 can be generated based at least in part on voltage command Va3, a third control signal CS3 associated with the B phase of the power system 400 can be generated based at least in part on voltage command Vb3, and a third control signal CS3 associated with the C phase of the power system 400 can be generated based at least in part on voltage command Vc3. The third switching elements 413 can be controlled based on the third control signals CS3 to generate third PWM signals PWM-Va3, PWM-Vb3, PWM-Vc3 so as to render third common mode voltage signal Vcm3.

Moreover, generally, a fourth common mode voltage signal Vcm4 can be rendered in the same or similar as described above with respect to the second common mode signal Vcm2. Particularly, upon executing the fourth modulator 444 of the pulse width modulator 448, the one or more processors of the controller 440 can generate fourth control signals CS4. For instance, a fourth control signal CS4 associated with the A phase of the power system 400 can be generated based at least in part on voltage command Va4, a fourth control signal CS4 associated with the B phase of the power system 400 can be generated based at least in part on voltage command Vb4, and a fourth control signal CS4 associated with the C phase of the power system 400 can be generated based at least in part on voltage command Vc4. The fourth switching elements 414 can be controlled based on the fourth control signals CS4 to generate fourth PWM signals PWM-Va4, PWM-Vb4, PWM-Vc4 so as to render fourth common mode voltage signal Vcm4.

Notably, in rendering the third and fourth common mode voltage signals Vcm3, Vcm4, the fourth common mode voltage Vcm4 has the same or nearly the same waveform as the third common mode voltage Vcm3 since the third multiphase winding 463 and the fourth multiphase winding 464 are arranged and configured to operate electrically opposite in phase with respect to one another. Moreover, shifting the carrier signal associated with the fourth multiphase winding 464 by one hundred eighty degrees (180°)

with respect to the carrier signal associated with the third multiphase winding 463 shifts the polarity of the fourth common mode voltage signal Vcm4 with respect to the third common mode voltage signal Vcm3. Thus, the third common mode signal Vcm3 and the fourth common mode signal Vcm4 have the same or nearly the same waveform with opposite polarity. As the fourth common mode signal Vcm4 has the same or nearly the same waveform as the third common mode signal Vcm3 but with opposite polarity, common mode emissions associated with the second channel 402 can be canceled or reduced. In this way, the benefits noted above may be realized.

It will be appreciated that the topology of the control system 420 is a non-limiting example. For instance, in some embodiments, the control system 420 can include a plurality of controllers instead of a single controller. In such embodiments, each controller can include its own command generator or set of computer-executable instructions or logic and PW modulator. For instance, in some example embodiments, a first controller associated with the first channel 401 can include a command generator that, when executed by the one or more processors of the first controller, cause the one or more processors of the first controller to generate one or more commands associated with the first and second multiphase windings 461, 462 based at least in part on the system demands 480. The first controller can further include first modulator 441 and second modulator 442 for generating first control signals CS1 associated with the first multiphase winding 461 and for generating second control signals CS2 associated with the second multiphase winding 462, respectively. Further, a second controller associated with the second channel 402 can include a command generator that, when executed by the one or more processors of the second controller, cause the one or more processors of the second controller to generate one or more commands associated with the third and fourth multiphase windings 463, 464 based at least in part on the system demands 480. The second controller can further include third modulator 443 and fourth modulator 444 for generating third control signals CS3 associated with the third multiphase winding 463 and for generating fourth control signals CS4 associated with the fourth multiphase winding 464, respectively. Other topologies are possible. For instance, the control system 420 can include at least one controller dedicated to controlling each power converter unit.

The inventive aspects of the present disclosure may apply to other multichannel power systems as well. Particularly, in some embodiments, common mode emissions can be canceled or reduced between two power channels instead of within a single power channel as disclosed above with respect to the multichannel embodiment of FIG. 6.

Figure 14:
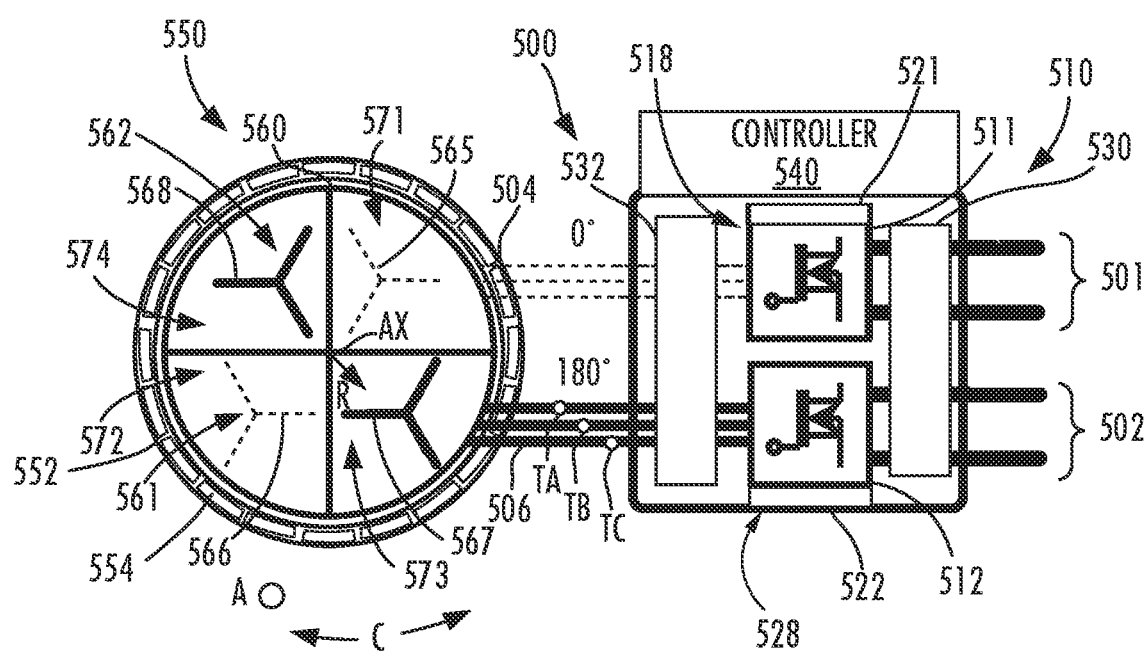
FIG. 14 provides a schematic view of an electrical power system according to one example embodiment of the present disclosure.

By way of example, FIG. 14 provides a schematic view of an electrical power system 500 according to one example embodiment of the present disclosure. As will be explained below, the power system 500 of FIG. 14 is arranged and configured to operate so that common mode emissions can be canceled or reduced between its two power channels. As depicted, generally, the power system 500 of FIG. 14 includes power converter system 510, electric machine 550, and one or more electrical cables 504, 506 electrically coupling the power converter system 510 and the electric machine 550. The electric cables 504, 506 can be shielded cables, for example.

For the depicted embodiment of FIG. 14, the power converter system 510 is an AC/DC power converter system. As shown in FIG. 14, the power converter system 510 has a first power converter unit 518 and a second power converter unit 528. The power converter units 518, 528 can be separate or independent units, or alternatively, can be units of a single power converter. In FIG. 14, the first power converter unit 518 and the second power converter unit 528 are independent units. In alternative embodiments, the first power converter unit 518 and the second power converter unit 528 can form a single power converter by connecting the first power converter unit 518 and the second power converter unit 528 in series or parallel. The first power converter unit 518 includes first switching elements 511 and the second power converter unit 528 includes second switching elements 512. The first power converter unit 518 is associated with a first channel 501 and the second power converter unit 528 is associated with a second channel 502. The first and second switching elements 511, 512 can be any suitable type of switching elements, such as insulated gate bipolar transistors, power MOSFETs, etc.

The first and second switching elements 511, 512 can each include switching elements for each phase of power of the power system 500. For instance, the first switching elements 511 can include switching elements associated with an A phase, switching elements associated with a B phase, and switching elements associated with a C phase of the power system 500. Likewise, the second switching elements 512 can include switching elements associated with the A phase, switching elements associated with the B phase, and switching elements associated with the C phase of the power system 500.

The first and second switching elements 511, 512 can be controlled by one or more controllable devices. For instance, the first and second switching elements 511, 512 can be controlled by one or more associated gate drivers. For the embodiment depicted in FIG. 14, one or more first gate drivers 521 are associated with the first switching elements 511 and one or more second gate drivers 522 are associated with the second switching elements 512. The one or more gate drivers 521, 522 can be controlled to drive or modulate their respective switching elements 511, 512, e.g., to control the electrical power provided to or drawn from the electric machine 550. The first and second gate drivers 521, 522 can each include one or more gate drivers.

The power converter system 510 can also include one or more processors and one or more memory devices. The one or more processors and one or more memory devices can be embodied in one or more controllers or computing devices. For instance, for this embodiment, the one or more processors and one or more memory devices are embodied in a controller 540. The controller 540 can be communicatively coupled with various devices, such as the gate drivers 521, 522, one or more sensors (e.g., current and/or voltage sensors), as well as other computing devices. The controller 540 can be communicatively coupled with such devices via a suitable wired and/or wireless connection. Generally, the controller 540 can be configured and perform operations in the manner illustrated in FIG. 30 and described in the accompanying text.

Furthermore, the power converter system 510 can include one or more EMI filters. For this embodiment, the power converter system 510 includes a DC-side EMI filter 530 and an AC-side EMI filter 532. Generally, the EMI filters 530, 532 can suppress electromagnetic noise transmitted along the first and second channels 501, 502.

The electric machine 550 defines an axial direction A (a direction into and out of the page in FIG. 14), a radial direction R, and a circumferential direction C. The electric machine 550 also defines an axis of rotation AX extending along the axial direction A. Further, as shown, the electric machine 550 has a rotor 552 and a stator 560. The rotor 552 can be mechanically coupled with a rotating component, such as a rotating component of a gas turbine engine. The rotor 552 is rotatable about the axis of rotation AX. The rotor 552 is depicted outward of the stator 560 along the radial direction R, and thus, the electric machine 550 is configured in an outer-rotor configuration. However, the inventive aspects of the present disclosure also apply to electric machines having an inner-rotor configuration, as previously noted.

The rotor 552 includes a plurality of magnets 554. The stator 560 includes a plurality of multiphase windings or coils wound therein, e.g., within slots defined between teeth of the stator 560. For the embodiment depicted, the stator 560 includes a first multiphase winding 561 and a second multiphase winding 562. The first multiphase winding 561 is associated with the first channel 501 while the second multiphase winding 562 is associated with the second channel 502. Each multiphase winding 561, 562 can include windings or coils for various power phases. For instance, the first multiphase winding 561 can include windings for the first phase A, the second phase B, and the third phase C. Likewise, the second multiphase winding 562 can include windings for the first phase A, the second phase B, and the third phase C. Moreover, as depicted schematically in FIG. 14, the first multiphase winding 561 is electrically coupled with the first switching elements 511 of the power converter system 510 and the second multiphase winding 562 is electrically coupled with the second switching elements 512.

Notably, the first multiphase winding 561 associated with the first channel 501 and the second multiphase winding 562 associated with the second channel 502 are electrically opposite in phase with respect to one another. That is, the angle of the AC voltage of the second multiphase winding 562 is electrically out of phase with respect to the angle of the AC voltage of the first multiphase winding 561 by one hundred eighty degrees (180°). For instance, for this embodiment, the first multiphase winding 561 has an AC voltage angle of zero degrees (0°) while the second multiphase winding 562 has an AC voltage angle of one hundred eighty degrees (180°). Thus, the first multiphase winding 561 and the second multiphase winding 562 are electrically opposite in phase with respect to one another. As will be explained below, the first multiphase winding 561 associated with the first channel 501 and second multiphase winding 562 associated with the second channel 502 are arranged and configured to operate in opposite angle of AC voltage with respect to one another. This arrangement, along with the PWM control scheme disclosed herein, facilitates cancelation of common mode emissions.

Further, as best shown in FIG. 14, the first and second multiphase windings 561, 562 can be strategically arranged in an interweaved contra-phase winding pair arrangement. Such an arrangement may facilitate balance of radial forces during operation of the electric machine 550, among other benefits. As shown, the first multiphase winding 561 is arranged in a first set 565 and a second set 566. The first set 565 and the second set 566 of the first multiphase winding 561 are positioned opposite one another along the radial direction R. In this regard, when the first channel 501 is in operation, the first set 565 and the second set 566 of the first multiphase winding 561 balance out the radial forces therebetween. Such a balanced arrangement of the first multiphase winding 561 allows for the first channel 501 to continue operating at its full power even in the event of non-use or failure of the second channel 502. The first set 565 and the second set 566 can be electrically connected to one another in series or parallel.

The second multiphase winding 562 is also arranged in a first set 567 and a second set 568. The first set 567 and the second set 568 of the second multiphase winding 562 are positioned opposite one another along the radial direction R. The first set 567 and the second set 568 can be electrically connected to one another in series or parallel. As depicted, the first set 565 of the first multiphase winding 561 is positioned between the first set 567 and the second set 568 of the second multiphase winding 562 along the circumferential direction C and the second set 566 of the first multiphase winding 561 is positioned between the first set 567 and the second set 568 of the second multiphase winding 562 along the circumferential direction C. In this way, when the second channel 502 is in operation, the first set 567 and the second set 568 of the second multiphase winding 562 balance out the radial forces therebetween. Such a balanced arrangement of the second multiphase winding 562 allows for the second channel 502 to continue operating at its full power even in the event of non-use or failure of the first channel 501.

Moreover, the stator 560 of the electric machine 550 defines a plurality of sectors or sections. Particularly, for this embodiment, the stator 560 defines four sectors, including a first sector 571, a second sector 572, a third sector 573, and a fourth sector 574. The sectors 571, 572, 573, 574 are or about of equal size. As shown, the first and second sets 565, 566 of the first multiphase winding 561 and the first and second sets 567, 568 of the second multiphase winding 562 are each wound within a respective one of the sectors 571, 572, 573, 574 of the stator 560. More specifically, the first set 565 of the first multiphase winding 561 is wound within the first sector 571, the second set 566 of the first multiphase winding 561 is wound within the second sector 572, the first set 567 of the second multiphase winding 562 is wound within the third sector 573, and the second set 568 of the second multiphase winding 562 is wound within the fourth sector 574.

Figure 15:
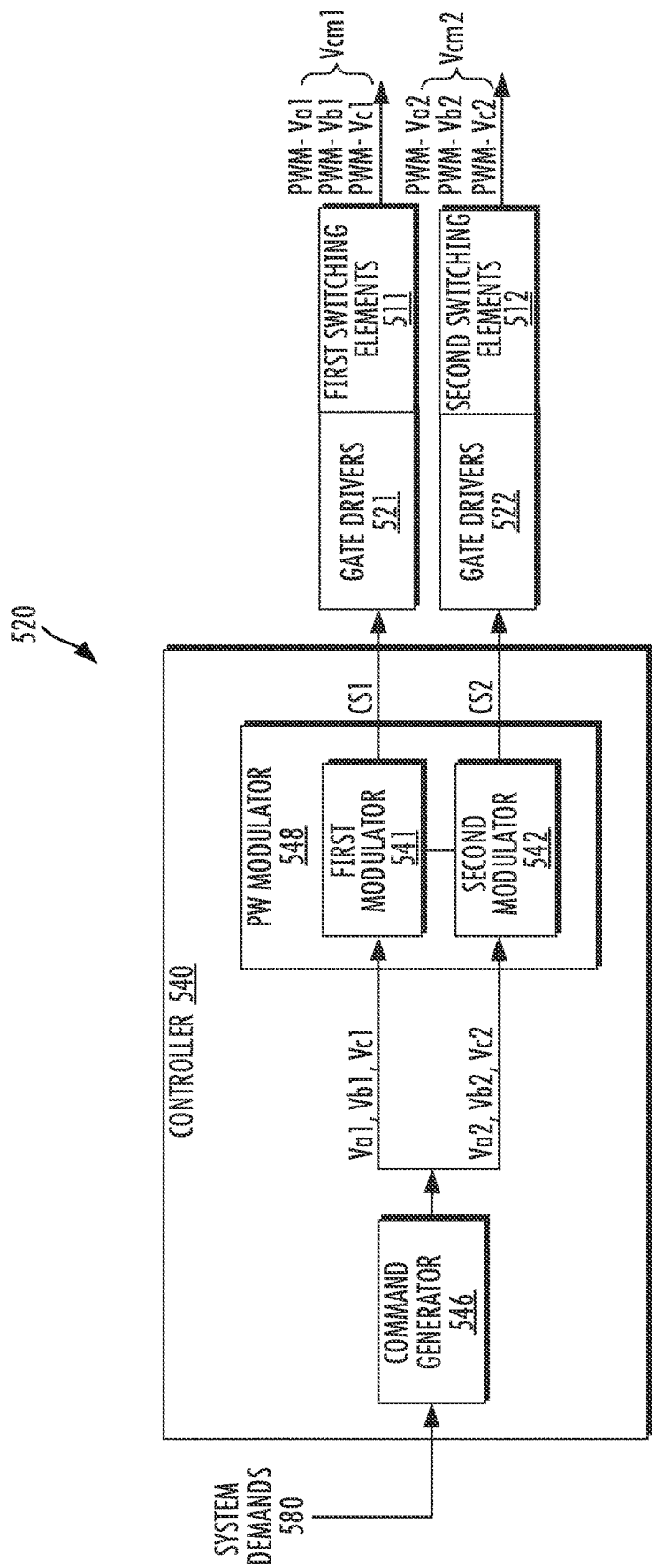
FIG. 15 provides a topology of a control system of the power system of FIG. 14.

With reference now to FIG. 15 in addition to FIG. 14, an example control scheme in which common mode emissions associated with the power system 500 can be canceled or reduced will now be provided. FIG. 15 provides a topology of a control system 520 of the power system 500. It will be appreciated that the topology of the control system 520 is intended to be a non-limiting example. For instance, in other embodiments, the control system 520 can include a plurality of controllers, e.g., one for controlling the first switching elements 511 and one for controlling the second switching elements 512.

As shown in FIG. 15, the controller 540, or more specifically one or more processors thereof, receive one or more system demands 580. The system demands 580 can be received from a system-level controller or computing device, such as controller 182 (FIG. 1). The system demands 580 can indicate what is required of the power system 500, such as a demanded electrical power output or thrust output of the propulsor to which the electric machine 550 is mechanically coupled.

A command generator 546, which can be a set of computer-executable instructions or logic, can be executed by the one or more processors of the controller 540 to generate one or more commands based at least in part on the system demands 580. For example, the one or more processors of the controller 540 can execute the command generator 546 to generate voltage, electric current, torque, and/or other demands based at least in part on the system demands 580.

Particularly, as shown in FIG. 15, the one or more processors of the controller 540 can execute the command generator 546 to generate voltage commands for each multiphase winding 561, 562. For instance, voltage commands Va1, Vb1, Vc1 can be generated for the first, second, and third phases A, B, C of the first multiphase winding 561. Similarly, voltage commands Va2, Vb2, Vc2 can be generated for the first, second, and third phases A, B, C of the second multiphase winding 562.

The voltage commands generated for each of the multiphase windings 561, 562 can be received by the one or more processors of the controller 540 and can be input into a pulse width modulator 548. The pulse width modulator 548, which can be a set of computer-executable instructions or logic, can be executed by the one or more processors of the controller 540 to generate control signals. The one or more processors of the controller 440 can control the switching elements 511, 512, of the power converter system 510 to generate PWM signals based at least in part on the one or more control signals.

Particularly, as shown, the pulse width modulator 548 can include a first modulator 541 for generating first control signals CS1 associated with the first multiphase winding 561 and a second modulator 542 for generating second control signals CS2 associated with the second multiphase winding 562. The generated control signals CS1 and CS2 can be routed to their respective gate drivers 521, 522 as shown in FIG. 15. Based on the received control signals CS1, the gate drivers 521 can drive the first switching elements 511 to generate first PWM signals so as to render a first common mode signal Vcm1. Based on the received control signals CS2, the gate drivers 522 can drive the second switching elements 512 to generate second PWM signals so as to render a second common mode signal Vcm2.

The first control signals CS1 can be generated based at least in part on their associated voltage commands. Particularly, upon executing the first modulator 541 of the pulse width modulator 548, the one or more processors of the controller 540 can generate first control signals CS1. For instance, a first control signal CS1 associated with the A phase of the power system 500 can be generated based at least in part on the voltage command Va1, a first control signal CS1 associated with the B phase of the power system 500 can be generated based at least in part on the voltage command Vb1, and a first control signal CS1 associated with the C phase of the power system 500 can be generated based at least in part on the voltage command Vc1. The first switching elements 511 can be controlled based on the first control signal CS1 associated with the A phase to generate a first PWM signal PWM-Va1 associated with the A phase of the power system 500. Similarly, the first switching elements 511 can be controlled based on the first control signal CS1 associated with the B phase to generate a first PWM signal PWM-Vb1 associated with the B phase of the power system 500. Likewise, the first switching elements 511 can be controlled based on the first control signal CS1 associated with the C phase to generate a first PWM signal PWM-Vc1 associated with the C phase of the power system 500. The first PWM signals PWM-Va1, PWM-Vb1, PWM-Vc1 can be generated using any suitable technique, such as the carrier signal comparison technique disclosed above.

Based on the received control signals CS1, the gate drivers 521 can drive the first switching elements 511 to generate first PWM signals PWM-Va1, PWM-Vb1, PWM-Vc1 so as to render a first common mode signal Vcm1. The pattern or waveform of the first common mode voltage signal Vcm1 takes into account the first PWM signal PWM-Va1 generated based on voltage command Va1, the first PWM signal PWM-Vb1 generated based on voltage command Vb1, and the PWM signal PWM-Vc1 generated based on voltage command Vc1. Particularly, for a given instance, the amplitude of the first common mode voltage signal Vcm1 can be an average amplitude of the three generated PWM signals PWM-Va1, PWM-Vb1, PWM-Vc1 associated with the first multiphase winding 561.

The second control signals CS2 can be generated based at least in part on their associated voltage commands. Particularly, upon executing the second modulator 542 of the pulse width modulator 548, the one or more processors of the controller 540 can generate second control signals CS2. For instance, a second control signal CS2 associated with the A phase of the power system 500 can be generated based at least in part on the voltage command Va2, a second control signal CS2 associated with the B phase of the power system 500 can be generated based at least in part on the voltage command Vb2, and a second control signal CS2 associated with the C phase of the power system 500 can be generated based at least in part on the voltage command Vc2.

The second switching elements 512 can be controlled based on the second control signal CS2 associated with the A phase to generate a second PWM signal PWM-Va2 associated with the A phase of the power system 500. Similarly, the second switching elements 512 can be controlled based on the second control signal CS2 associated with the B phase to generate a second PWM signal PWM-Vb2 associated with the B phase of the power system 500. Likewise, the second switching elements 512 can be controlled based on the second control signal CS2 associated with the C phase to generate a second PWM signal PWM-Vc2 associated with the C phase of the power system 500.

Based on the received control signals CS2, the gate drivers 422 can drive the second switching elements 412 to generate the second PWM signals PWM-Va2, PWM-Vb2, PWM-Vc2 so as to render the second common mode signal Vcm2. The pattern or waveform of the second common mode voltage signal Vcm2 takes into account the second PWM signal PWM-Va2 generated based on voltage command Va2, the second PWM signal PWM-Vb2 generated based on voltage command Vb2, and the second PWM signal PWM-Vc2 generated based on voltage command Vc2. Particularly, for a given instance, the amplitude of the second common mode voltage signal Vcm2 can be an average amplitude of the three generated PWM signals PWM-Va2, PWM-Vb2, PWM-Vc2 associated with the second multiphase winding 562.

The second PWM signals PWM-Va2, PWM-Vb2, PWM-Vc2 can be generated using any suitable technique, such as the carrier signal comparison technique disclosed above. Notably, the one or more processors of the controller 540 can shift the polarity of a second carrier signal against which the voltage commands Va2, Vb2, Vc2 are compared (e.g., by one hundred eighty degrees (180°) with respect to a first carrier signal against which the voltage commands Va1, Vb1, Vc1 are compared) so that the rendered second common mode signal Vcm2 is ultimately opposite in polarity with respect to the rendered first common mode signal Vcm1.

Notably, the rendered second common mode signal Vcm2 has the same or nearly the same waveform as the rendered first common mode signal Vcm1 since the first multiphase winding 561 and the second multiphase winding 562 are arranged and configured to operate electrically opposite in phase with respect to one another. Moreover, shifting the second carrier signal associated with the second multiphase winding 562 by one hundred eighty degrees (180°) with respect to first carrier signal associated with the first multiphase winding 561 effectively shifts the polarity of the second common mode voltage signal Vcm2 with respect to the first common mode voltage signal Vcm1.

Accordingly, when the first switching elements 511 are modulated by their associated gate drivers 521 based at least in part on the first control signals CS1, the first PWM signals PWM-Va1, PWM-Vb1, PWM-Vc1 are generated so as to render the first common mode signal Vcm1. Likewise, when the second switching elements 512 are modulated by their associated gate drivers 522 based at least in part on the second control signals CS2, the second PWM signals PWM-Va2, PWM-Vb2, PWM-Vc2 are generated so as to render the second common mode signal Vcm2. As the second common mode signal Vcm2 has the same or nearly the same waveform as the first common mode signal Vcm1 but with opposite polarity, common mode emissions between the first channel 501 and the second channel 502 can be canceled or reduced as the first common mode voltage signal Vcm1 and the second common mode voltage signal Vcm2 have the same or nearly the same waveform with opposite polarity. Thus, a number of benefits may be realized. For instance, the need for EMI filters can be eliminated or at least one or more of the EMI filters can be reduced in size. Moreover, cancelation or reduction of the common mode emissions can reduce shaft voltage and bearing currents, thereby potentially: reducing bearing stress, eliminating the need for a shaft grounding brush, eliminating the need of a bearing insulation sleeve or ceramic bearing, and/or reducing leakage current through shaft loads, such as gears or sensors. Other benefits and advantages may be realized as well.

In some embodiments, the first channel 501 and the second channel 502 are paired with the same electrical load. Doing so may keep the operating conditions and load level the same or nearly the same. Advantageously, this may enhance the ability of the system 500 to cancel or reduce common mode emissions. In yet other embodiments, the first channel 501 and the second channel 502 are paired with separate but identical or nearly identical electrical loads (i.e., within five percent (5%) of one another). Doing so may keep the operating conditions and load level the same or nearly the same. As noted, this may enhance the ability of the system 500 to cancel or reduce common mode emissions.

The inventive aspects of the present disclosure may apply to single-channel electrical power systems as well. In this regard, common mode emissions can be canceled or reduced within a single power channel in a similar manner as disclosed above.

Figure 16:
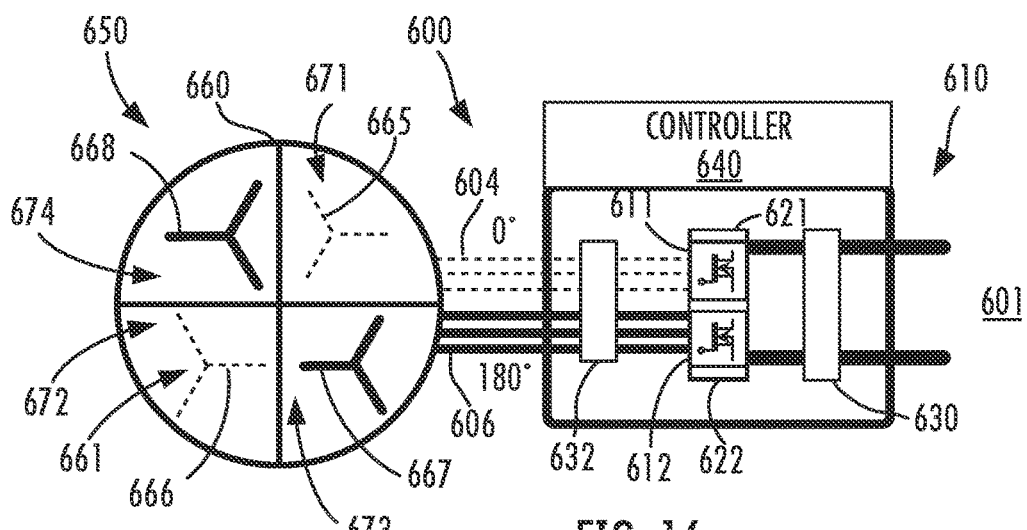
FIG. 16 provides a schematic view of an electrical power system according to one example embodiment of the present disclosure.

By way of example, FIG. 16 provides a schematic view of an electrical power system 600 according to one example embodiment of the present disclosure. As depicted, the power system 600 of FIG. 16 is a single-channel power system. The power system 600 of FIG. 16 is arranged and configured to operate so that common mode emissions can be canceled or reduced within channel 601. Generally, the power system 600 of FIG. 16 includes a power converter system 610, an electric machine 650, and one or more electrical cables 604, 606 electrically coupling the power converter system 610 and the electric machine 650. The electric cables 604, 606 can be shielded cables, for example.

As shown, the power converter system 610 includes first switching elements 611 and second switching elements 612. The power converter system 610 also includes one or more first gate drivers 621 for driving the first switching elements 611 and one or more second gate drivers 622 for driving the second switching elements 621. Further, the power converter system 610 includes a DC-side EMI filter 630 and an AC-side EMI filter 632 for suppressing electromagnetic noise transmitted along the channel 601. The power converter system 610 also includes controller 640. The controller 640 can be communicatively coupled with various components, such as the gate drivers 621, 622. Generally, the controller 640 can be configured and perform operations in the manner illustrated in FIG. 30 and described in the accompanying text.

The electric machine 650 has a rotor (not depicted in FIG. 16) and a stator 660. The rotor can be mechanically coupled with a rotating component, such as a rotating component of a gas turbine engine. The rotor is rotatable about an axis of rotation and can include a plurality of magnets. The stator 660 includes a plurality of multiphase windings or coils wound therein, e.g., within slots defined between teeth of the stator 660. For the embodiment depicted, the stator 660 includes a first multiphase winding 661 and a second multiphase winding 662. The first multiphase winding 661 and the second multiphase winding 662 are both associated with channel 601. Each multiphase winding 661, 662 can include windings or coils for various power phases. Moreover, as depicted schematically in FIG. 16, the first multiphase winding 661 is electrically coupled with the first switching elements 611 of the power converter system 610 and the second multiphase winding 662 is electrically coupled with the second switching elements 612.

Notably, the first multiphase winding 661 and the second multiphase winding 662 are electrically opposite in phase with respect to one another. That is, the angle of the AC voltage of the second multiphase winding 662 is electrically out of phase with respect to the angle of the AC voltage of the first multiphase winding 661 by one hundred eighty degrees (180°). For instance, for this embodiment, the first multiphase winding 661 has an AC voltage angle of zero degrees (0°) while the second multiphase winding 662 has an AC voltage angle of one hundred eighty degrees (180°).

Moreover, for this embodiment, the first and second multiphase windings 661, 662 can be strategically arranged in an interweaved contra-phase winding pair arrangement. Such an arrangement may facilitate balance of radial forces during operation of the electric machine 650, among other benefits. As shown, the first multiphase winding 661 is arranged in a first set 665 and a second set 666. The first set 665 and the second set 666 of the first multiphase winding 661 are positioned opposite one another along the radial direction R. The first set 665 and the second set 666 can be electrically connected to one another in series or parallel.

The second multiphase winding 662 is also arranged in a first set 667 and a second set 668. The first set 667 and the second set 668 of the second multiphase winding 662 are positioned opposite one another along the radial direction R. The first set 667 and the second set 668 can be electrically connected to one another in series or parallel. As depicted, the first set 665 of the first multiphase winding 661 is positioned between the first set 667 and the second set 668 of the second multiphase winding 662 along the circumferential direction and the second set 666 of the first multiphase winding 661 is positioned between the first set 667 and the second set 668 of the second multiphase winding 662 along the circumferential direction.

Moreover, the stator 660 of the electric machine 650 defines a plurality of sectors or sections. Particularly, for this embodiment, the stator 660 defines four sectors, including a first sector 671, a second sector 672, a third sector 673, and a fourth sector 674. The sectors 671, 672, 673, 674 are or about of equal size. As shown, the first and second sets 665, 666 of the first multiphase winding 661 and the first and second sets 667, 668 of the second multiphase winding 662 are each wound within a respective one of the sectors 671, 672, 673, 674 of the stator 660. More specifically, the first set 665 of the first multiphase winding 661 is wound within the first sector 671, the second set 666 of the first multiphase winding 661 is wound within the second sector 672, the first set 667 of the second multiphase winding 662 is wound within the third sector 673, and the second set 668 of the second multiphase winding 662 is wound within the fourth sector 674.

Common mode emissions can be canceled and/or reduced within channel 601 in a similar manner as disclosed above with respect to the first channel 401 or the second channel 402 of the multichannel power system 400 of FIG. 6. Accordingly, for the sake of brevity, the control scheme in which common mode emissions associated with the power system 600 can be canceled or reduced will not be repeated.

However, to summarize, one or more processors of the controller 640 can receive voltage commands associated with the first multiphase winding 661 and voltage commands associated with the second multiphase winding 662. The one or more processors of the controller 640 can then generate first control signals based at least in part on the voltage commands associated with the first multiphase winding 661 and second control signals based at least in part on the voltage commands associated with the second multiphase winding 662. The one or more processors of the controller 640 can control the first switching device 611 based on the first control signals to generate first PWM signals, which renders a first common mode signal. Similarly, the one or more processors of the controller 640 can control the second switching device 612 based on the second control signals to generate second PWM signals, which renders a second common mode signal.

Notably, the rendered second common mode signal can have a same or similar waveform with opposite polarity with respect to the rendered first common mode signal. The common mode signals have the same waveform because the first and second multiphase windings 661, 662 are electrically opposite in phase with respect to one another and the polarity of the common mode signals are opposite one another due to the one or more processors changing the polarity of the generated second PWM signals, such as by shifting the second carrier signal by one hundred eighty degrees (180°). A number of benefits and advantages associated with such a cancelation technique are possible.

Figure 17:
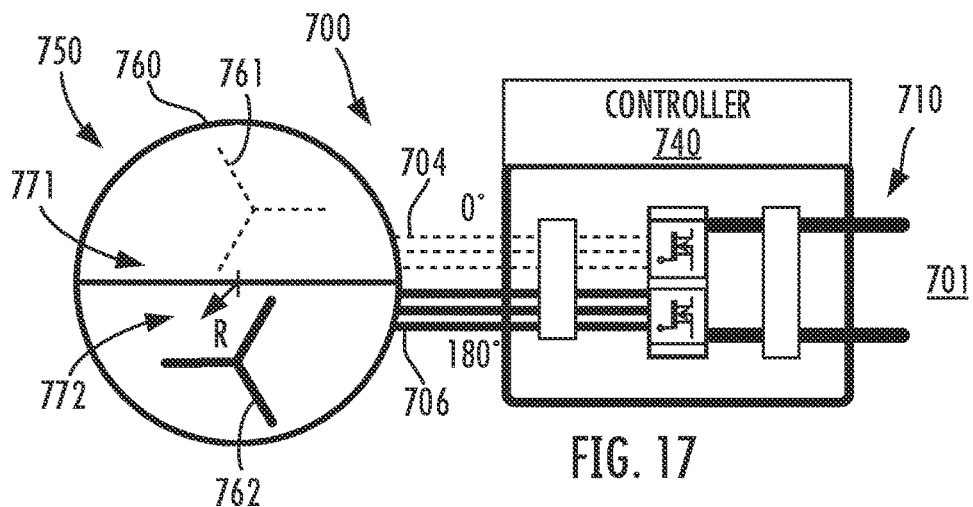
FIG. 17 provides a schematic view of an electrical power system according to one example embodiment of the present disclosure.

The inventive aspects of the present disclosure may apply to other single-channel electrical power systems as well. By way of example, FIG. 17 provides a schematic view of an electrical power system 700 according to one example embodiment of the present disclosure. As depicted, the power system 700 of FIG. 17 is a single-channel power system. Generally, the power system 700 of FIG. 17 includes a power converter system 710, an electric machine 750, and one or more electrical cables 704, 706 electrically coupling the power converter system 710 and the electric machine 750. The electric cables 704, 706 can be shielded cables, for example. For the depicted embodiment of FIG. 17, the power converter system 710 is configured in the same manner as the power converter system 610 of the power system 600 depicted in FIG. 16, and thus, the power converter system 710 will not be described in detail.

The electric machine 750 includes a first multiphase winding 761 and a second multiphase windings 762. The first multiphase winding 761 and the second multiphase winding 762 are arranged and configured to operate electrically opposite in phase with respect to one another. For this embodiment, the first and second multiphase windings 761, 762 are strategically arranged in a separated contra-phase winding pair arrangement. Such an arrangement may facilitate balance of radial forces during operation of the electric machine 750, among other benefits. As shown, the first multiphase winding 761 and the second multiphase winding 762 are positioned opposite one another along the radial direction R defined by the electric machine 750. Particularly, for this embodiment, a stator 760 of the electric machine 750 defines a first half sector 771 and a second half sector 772. As depicted, the first multiphase winding 761 is wound within the first half sector 771 (e.g., within slots defined by teeth of the stator 760) and the second the second multiphase winding 762 is wound within the second half sector 772 (e.g., within slots defined by teeth of the stator 760).

Common mode emissions can be canceled and/or reduced within channel 701 in a similar manner as disclosed above with respect to the first channel 401 or the second channel 402 of the multichannel power system 400 of FIG. 6. Accordingly, for the sake of brevity, the control scheme in which common mode emissions associated with the power system 700 can be canceled or reduced will not be repeated here.

Figure 18:
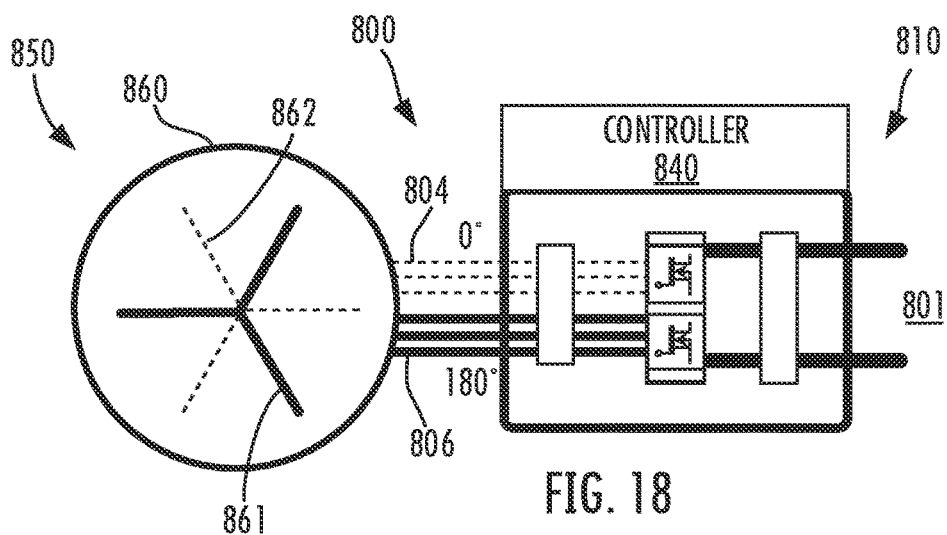
FIG. 18 provides a schematic view of an electrical power system according to one example embodiment of the present disclosure.

FIG. 18 provides a schematic view of another single-channel electrical power system 800 according to one example embodiment of the present disclosure. Generally, the power system 800 of FIG. 18 includes a power converter system 810, an electric machine 850, and one or more electrical cables 804, 806 electrically coupling the power converter system 810 and the electric machine 850. The electric cables 804, 806 can be shielded cables, for example. For the depicted embodiment of FIG. 18, the power converter system 810 is configured in the same manner as the power converter system 610 of the power system 600 depicted in FIG. 16, and thus, the power converter system 810 will not be described in detail.

A first multiphase winding 861 and a second multiphase windings 862 are wound within a stator 860 of the electric machine 850. The first multiphase winding 861 and the second multiphase winding 862 are arranged and configured to operate electrically opposite in phase with respect to one another. For this embodiment, the first and second multiphase windings 861, 862 are strategically wound or arranged in a collocated contra-phase arrangement. In some example embodiments, to form the collocated contra-phase arrangement, the first and second multiphase windings 861, 862 can terminate on opposite ends. In some embodiments, a coil in a slot can be separated into two coils, one for each of the first and second multiphase windings 861, 862. In yet other embodiments, the coils in same pole groups can be divided into the two separate first and second multiphase windings 861, 862. Such an arrangement may facilitate balance of radial forces during operation of the electric machine 850, among other benefits.

Common mode emissions can be canceled and/or reduced within channel 801 in a similar manner as disclosed above with respect to the first channel 401 or the second channel 402 of the multichannel power system 400 of FIG. 6. Accordingly, for the sake of brevity, the control scheme in which common mode emissions associated with the power system 800 can be canceled or reduced will not be repeated here.

Figure 19:
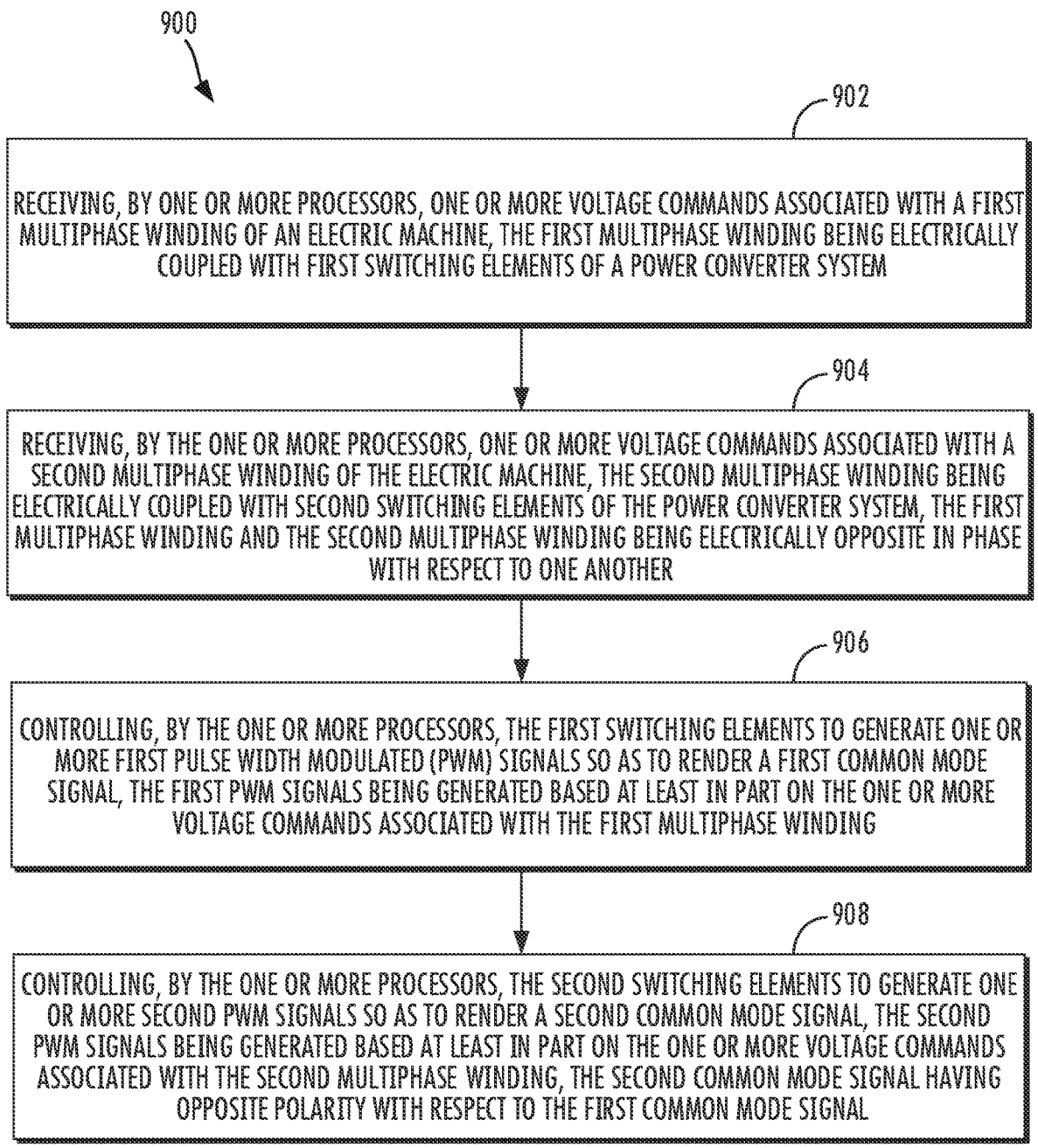
FIG. 19 provides a flow diagram for a method of operating an electrical power system according to one example embodiment.

FIG. 19 provides a flow diagram for a method (900) of operating an electrical power system according to one example embodiment. The method (900) can be utilized to operate any of the example power systems provided herein, for example.

At (902), the method (900) includes receiving, by one or more processors, one or more voltage commands associated with a first multiphase winding of an electric machine, the first multiphase winding being electrically coupled with first switching elements of a power converter system.

At (904), the method (900) includes receiving, by the one or more processors, one or more voltage commands associated with a second multiphase winding of the electric machine, the second multiphase winding being electrically coupled with second switching elements of the power converter system. In such implementations, the first multiphase winding and the second multiphase winding are electrically opposite in phase with respect to one another.

At (906), the method (900) includes controlling, by the one or more processors, the first switching elements to generate one or more first pulse width modulated (PWM) signals so as to render a first common mode signal, the first PWM signals being generated based at least in part on the one or more voltage commands associated with the first multiphase winding. The first PWM signals can include a first PWM signal associated with each phase of the power system, for example.

The first PWM signals can include a first PWM signal associated with each phase of the power system, for example. In controlling the first switching elements to generate the first PWM signals to render the first common mode signal at (906), the one or more processors can compare the received voltage commands associated with the first multiphase winding to a first carrier signal. In comparing one of the voltage commands associated with the first multiphase winding to the first carrier signal, in instances in which the voltage command is above the first carrier signal, the first switching elements are controlled so that the generated first PWM signal has a maximum amplitude at that instance. In contrast, in instances in which the voltage command is below the first carrier signal, the first switching elements are controlled so that the generated first PWM signal has a minimum amplitude at that instance. In this manner, the first PWM signals can be generated based at least in part on their associated voltage commands.

At (908), the method (900) includes controlling, by the one or more processors, the second switching elements to generate one or more second PWM signals so as to render a second common mode signal, the second PWM signals being generated based at least in part on the one or more voltage commands associated with the second multiphase winding, the second common mode signal having opposite polarity with respect to the first common mode signal.

The second PWM signals can include a second PWM signal associated with each phase of the power system. In controlling the second switching elements to generate the second PWM signals to render the second common mode signal at (908), the one or more processors can compare the received voltage commands associated with the second multiphase winding to a second carrier signal. Notably, prior to comparing the received voltage commands associated with the second multiphase winding to the second carrier signal, the one or more processors can shift the second carrier signal by one hundred eighty degrees (180°) with respect to the first carrier signal. In this way, the second carrier signal is the inverse of the first carrier signal. In comparing one of the voltage commands associated with the second multiphase winding to the second carrier signal, in instances in which the voltage command is above the second carrier signal, the second switching elements are controlled so that the generated second PWM signal has a maximum amplitude at that instance. In contrast, in instances in which the voltage command is below the second carrier signal, the second switching elements are controlled so that the generated second PWM signal has a minimum amplitude at that instance. In this manner, the second PWM signals can be generated based at least in part on their associated voltage commands.

The pattern or waveform of the first common mode voltage signal is rendered based on the first PWM signals associated with the first multiphase winding. Particularly, for a given instance, the amplitude of the first common mode voltage signal can be an average amplitude of the generated first PWM signals associated with the first multiphase winding. Similarly, the pattern or waveform of the second common mode voltage signal is rendered based on the second PWM signals associated with the second multiphase winding. Particularly, for a given instance, the amplitude of the second common mode voltage signal can be an average amplitude of the generated PWM signals associated with the second multiphase winding.

In some implementations, the second common mode signal has a same waveform with opposite polarity with respect to the first common mode signal. In this regard, the second common mode signal and the first common mode signal can "mirror" one another. In such implementations, the first and second common mode signals have the same waveform because the first and second multiphase windings are electrically opposite in phase with respect to one another. The polarity of the common mode signals are made opposite one another due to the one or more processors shifting the second carrier signal by one hundred eighty degrees (180°) with respect to the first carrier signal as noted above. As the first and second common mode signals have a same or similar waveform and opposite polarity, common mode emissions can be canceled or reduced.

In some implementations, the first multiphase winding and the second multiphase winding are associated with a same channel of the power system. In other implementations, the first multiphase winding is associated with a first channel of the power system and the second multiphase winding is associated with a second channel of the power system.

In some further implementations, the electric machine defines a radial direction, and wherein the first multiphase winding is arranged in a first set and a second set positioned opposite one another along the radial direction, and wherein the second multiphase winding is arranged in a first set and a second set positioned opposite one another along the radial direction. In such implementations, optionally, the electric machine has a stator defining sectors, and wherein the first and second sets of the first multiphase winding and the first and second sets of the second multiphase winding are each wound within a respective one of the sectors of the stator.

In yet other implementations, the power converter system has third switching elements and fourth switching elements. In such implementations, the electric machine further includes a third multiphase winding electrically coupled with the third switching elements and a fourth multiphase winding electrically coupled with the fourth switching elements, the fourth multiphase winding being electrically opposite in phase with respect to the third multiphase winding. In such implementations, optionally, the electric machine defines a radial direction, and wherein the first multiphase winding is arranged opposite the second multiphase winding along the radial direction and the third multiphase winding is arranged opposite the fourth multiphase winding along the radial direction. In some further implementations, the electric machine has a stator defining sectors, and wherein the first, second, third, and fourth multiphase windings are wound within a respective one of the sectors of the stator.

In some implementations, the electric machine has a stator defining a first half sector and a second half sector, and wherein the first multiphase winding is wound within the first half sector and the second the second multiphase winding is wound within the second half sector.

In some implementations, the first multiphase winding and the second multiphase winding are wound in a collocated contra-phase arrangement.

In some implementations, in response to a detected failure condition associated with the second multiphase winding, the one or more processors are configured to control the second switching elements to synthesize the second common mode signal, e.g., as will be described further below.

In yet other implementations, in response to a detected failure condition associated with the power converter system, the one or more processors are configured to control the second switching elements in one of a single-leg operation mode or a reduced leg operation mode to render the second common mode signal, e.g., as will be described further below.

Notably, the architectures and control schemes disclosed herein can provide a useful degree of common mode cancellation even when complementary excitation is not possible due to certain conditions, such as load/power unbalance, power-limiting, or failure at the converter or windings of the electric machine.

Figure 20:
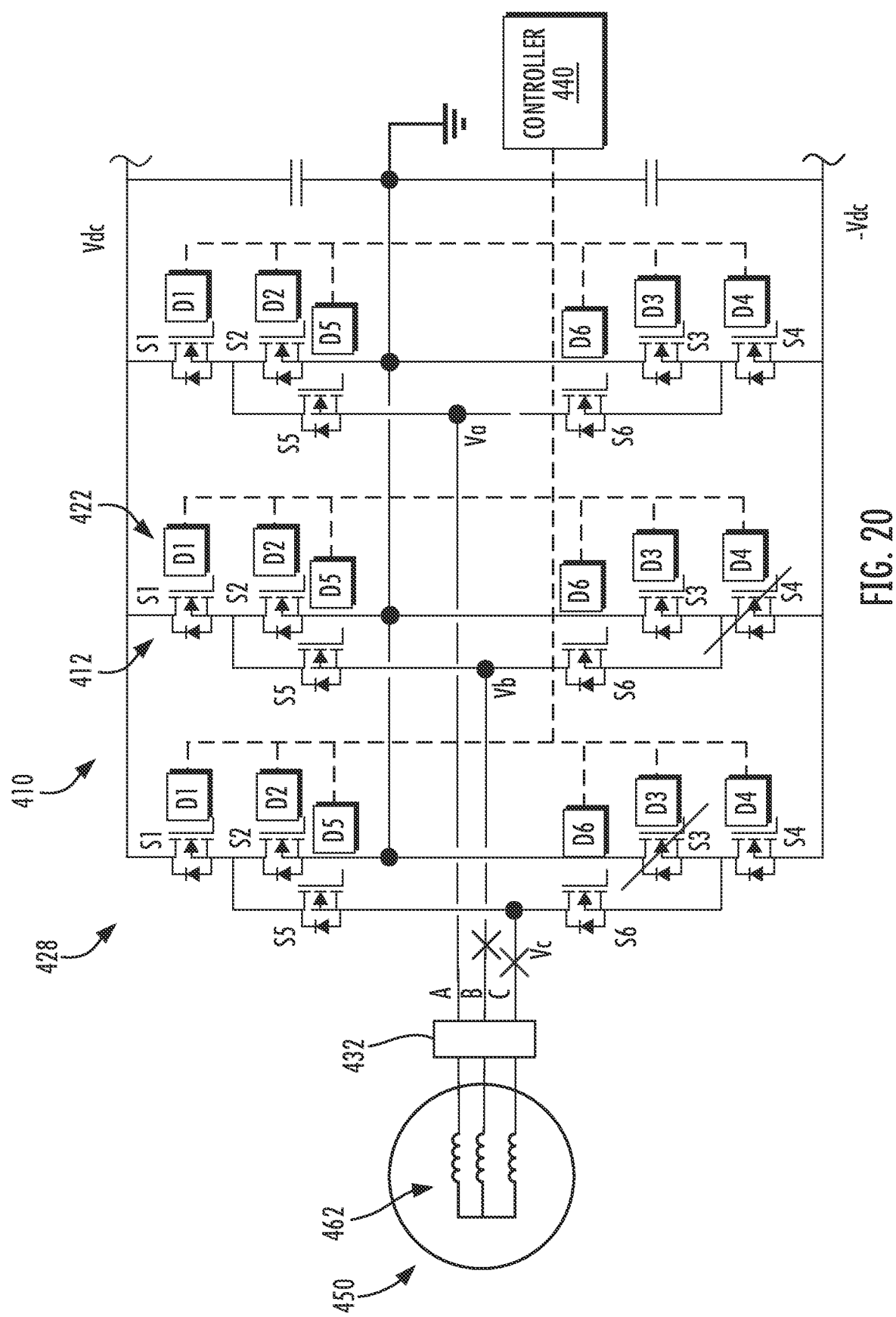
FIG. 20 provides a schematic view of second switching elements of the power converter system electrically coupled with a second multiphase winding of the power system of FIG. 6, wherein some of the second switching elements have experienced a failure condition.

By way of example and with reference now to FIGS. 20 and 21, in some instances the power converter system 410 may experience a failure condition. Example failure conditions include, without limitation, open wires or open circuits, line-to-line shorts or circuit shorts, and switching element failures, among other possible failures. For this example, as shown in FIG. 20, two of the second switching elements 412 electrically coupled with the second multiphase winding 462 of the electric machine 450 have failed (all other multiphase windings 461, 463, 464 and their associated switching elements 411, 413, 414 are not depicted in FIG. 20). Particularly, the fourth switching element S4 associated with the B-leg of the power converter system 410 is faulty and the third switching element S3 associated with the C-leg of the power converter system 410 is faulty as well. All switching elements of the A-leg of the power converter system 410 remain operational.

Figure 21A:
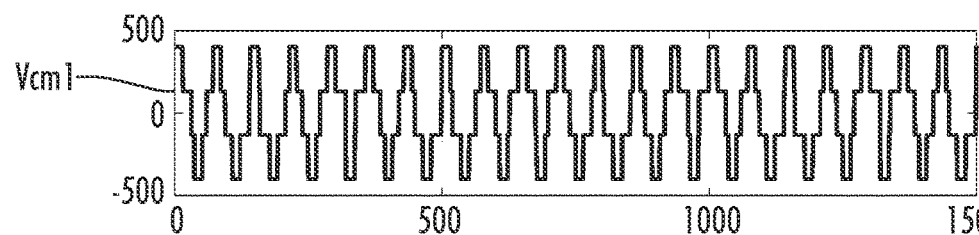
FIGS. 21A through 21C provide various graphs depicting voltage signals as a function of time.

When such a failure condition occurs, the second switching elements 412 can be controlled in a single-leg operation mode to cancel, at least in part, the common mode voltage associated with the first switching elements 411 and first multiphase winding 461 (FIG. 8). More specifically, the second switching elements 412 can be controlled to produce a common mode voltage that partially cancels the common mode voltage produced by operation of the first switching elements 411 (FIG. 8). For instance, as depicted in the graph of FIG. 21A, the first common mode signal Vcm1 associated with the first multiphase winding 461 and first switching elements 411 is depicted. The first common mode signal Vcm1 can be generated based at least in part on first PWM signals as described above.

Figure 21B:
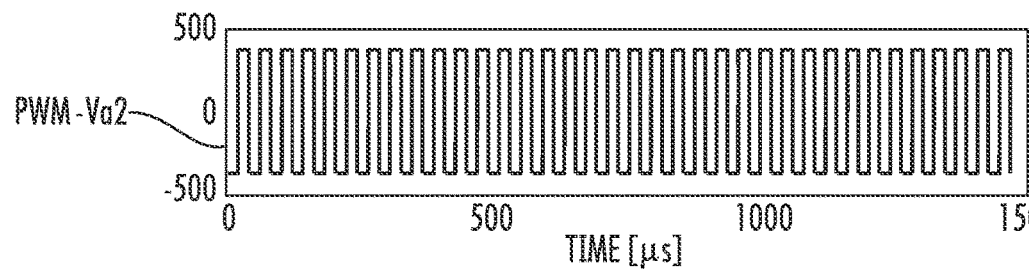
Figure 21C:
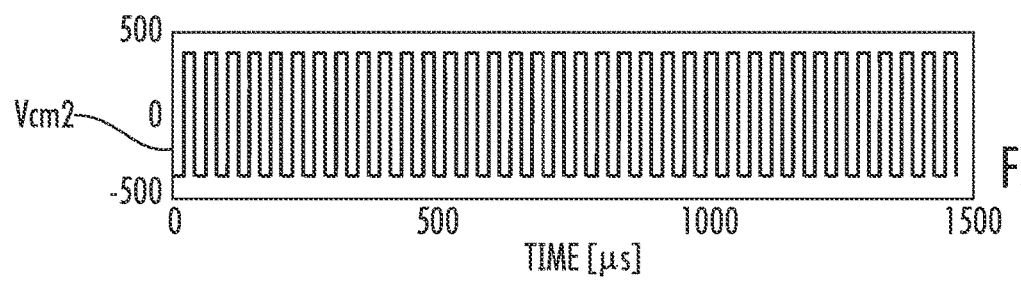

With reference also to FIG. 9 in addition to FIGS. 21A through 21C, upon executing the second modulator 442 of the pulse width modulator 448, the one or more processors of the controller 440 can generate a second PWM signal associated with the A phase of the power system 400 (FIG. 6), denoted as PWM-Va2 in the graph of FIG. 21B, e.g., based at least in part on voltage command Va2. As the B-leg and C-leg of the power converter system 410 associated with the second multiphase winding 462 and second switching elements 412 are shutdown or non-operational due to failure of the fourth switching element S4 of the B-leg and the third switching element S3 of the C-leg, no second PWM signals are generated for the B and C phases.

Accordingly, the second common mode signal Vcm2 depicted in the graph of FIG. 21C, which is rendered based at least in part on the generated second PWM signals, has the same waveform as the second PWM signal PWM-Va2. As will be appreciated by comparing the first common mode signal Vcm1 depicted in the graph of FIG. 21A with the second common mode signal Vcm2 depicted in the graph of FIG. 21C, the second common mode signal Vcm2 has opposite polarity but not the exact waveform with respect to the first common mode signal Vcm1. The waveforms of the first and second common mode signals Vcm1, Vcm2 are not exact in waveform because the failure condition has caused the B and C windings of the second multiphase winding 462 and their associated circuitry to be the same voltage as the A phase winding and circuitry. Accordingly, PWM signals associated with the B and C phases of the second multiphase winding 462 and second switching elements 412 are not generated or are not impactful in rendering the second common mode voltage signal Vcm2. The polarity of the second common mode signal Vcm2 is shifted with respect to the first common mode voltage signal Vcm1, and hence, the first common mode signal Vcm1 and the second common mode signal Vcm2 have opposite polarity. Advantageously, the common mode voltage associated with the first switching elements 411 and first multiphase winding 461 may still be canceled at least in part by the common mode voltage associated with the second switching elements 412 and second multiphase winding 462. It will be appreciated that these inventive aspects may be apply to other embodiments disclosed herein, such as the embodiments depicted in FIGS. 14 and 16-18.

Figure 22:
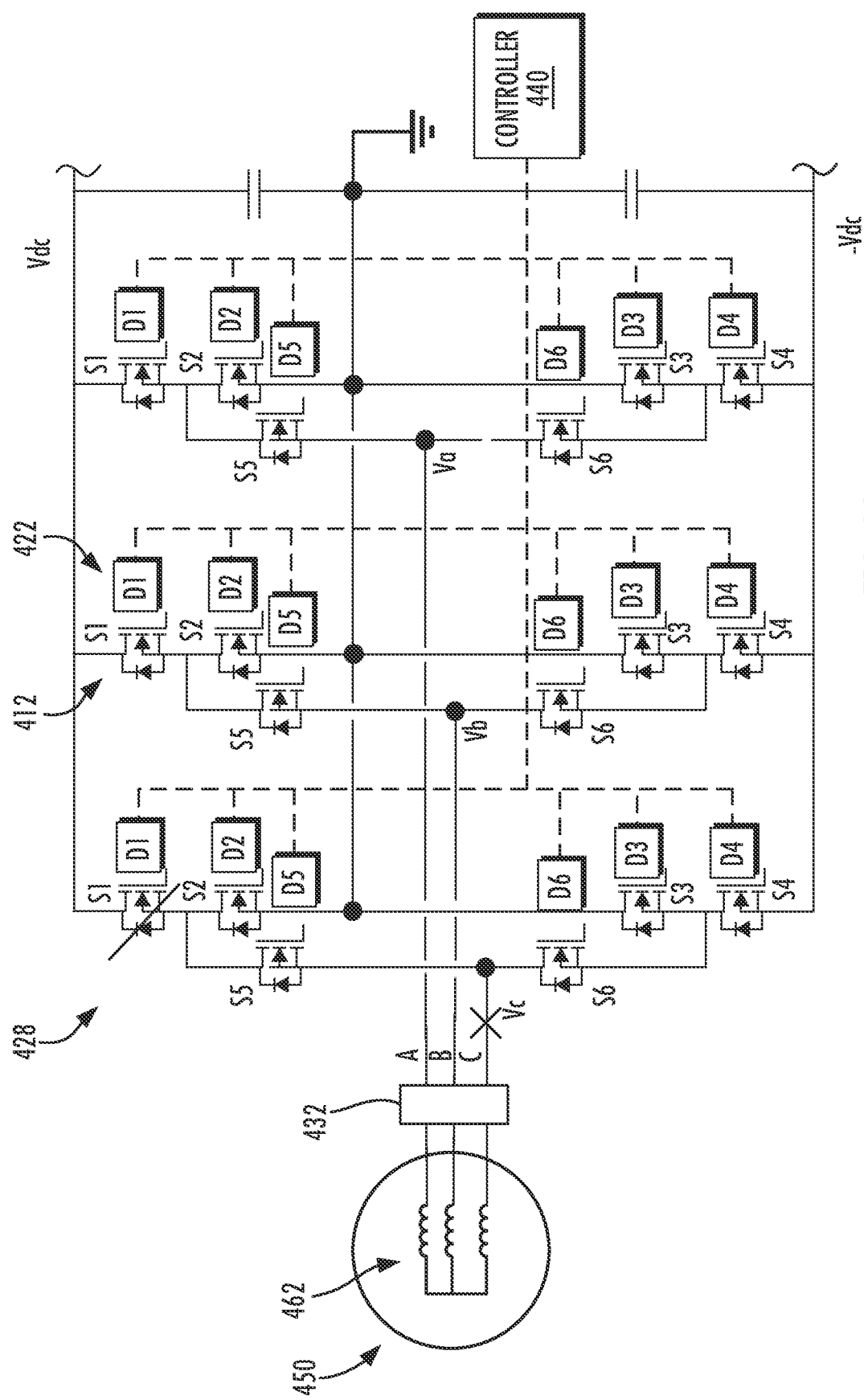
FIG. 22 provides a schematic view of second switching elements of the power converter system electrically coupled with a second multiphase winding of the power system of FIG. 6, wherein one of the second switching elements has experienced a failure condition.

As another example and with reference now to FIGS. 22 and 23, in some instances the power system 400 may experience a failure condition where at least one leg of the power converter system 410 has failed but multiple legs remain operational. For instance, as shown in FIG. 22, one of the second switching elements 412 electrically coupled with the second multiphase winding 462 of the electric machine 450 has failed (all other multiphase windings 461, 463, 464 and their associated switching elements 411, 413, 414 are not depicted in FIG. 22). Specifically, the first switching element S1 associated with the C-leg of the power converter system 410 is faulty. All switching elements of the A-leg and the B-leg of the power converter system 410 associated with the second multiphase winding 462 remain operational.

Figure 23A:
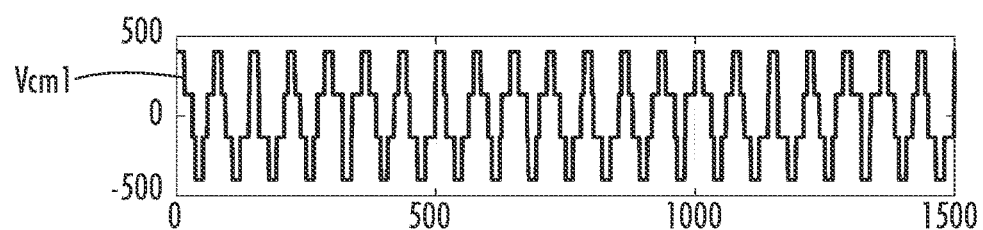
FIGS. 23A through 23D provide various graphs depicting voltage signals as a function of time.

When such a failure condition occurs, the second switching elements 412 can be controlled in a multi-leg operation mode to cancel, at least in part, the common mode voltage associated with the first switching elements 411 and first multiphase winding 461 (FIG. 8). More specifically, the second switching elements 412 can be controlled to produce a common mode voltage that partially cancels the common mode voltage produced by operation of the first switching elements 411 (FIG. 8). For instance, as depicted in the graph of FIG. 23A, the first common mode signal Vcm1 associated with the first multiphase winding 461 and first switching elements 411 is depicted. The first common mode signal Vcm1 can be generated based at least in part on first PWM signals as described previously.

Figure 23B:
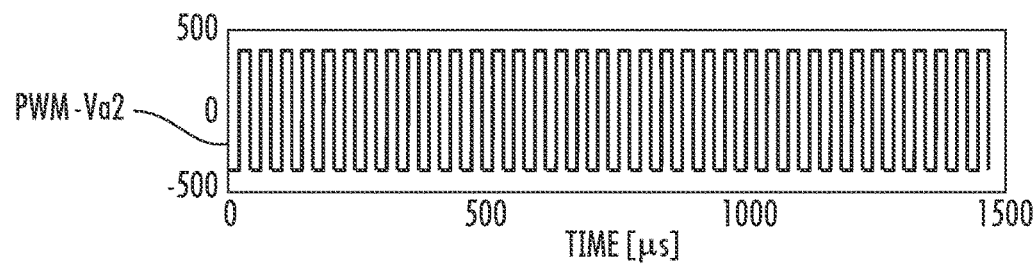
Figure 23C:
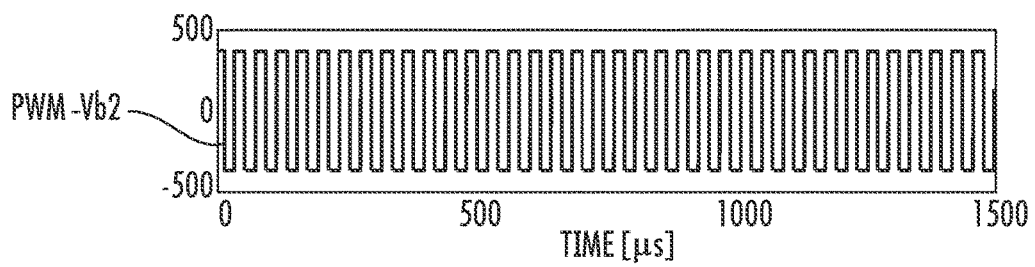

With reference also to FIG. 9 in addition to FIGS. 23A through 23D, upon executing the second modulator 442 of the pulse width modulator 448, the one or more processors of the controller 440 can generate a second PWM signal associated with an A phase of the power system 400 (FIG. 6), denoted as PWM-Va2 in the graph of FIG. 23B, e.g., based at least in part on voltage command Va2. Similarly, upon executing the second modulator 442 of the pulse width modulator 448, the one or more processors of the controller 440 can generate a second PWM signal associated with a B phase of the power system 400, denoted as PWM-Vb2 in the graph of FIG. 23C, e.g., based at least in part on voltage command Vb2. As the C-leg of the power converter system 410 associated with the second multiphase winding 462 and second switching elements 412 is shutdown or non-operational due to failure of the first switching element S1 of the B-leg, no second PWM signal is generated for the C phase.

Figure 23D:
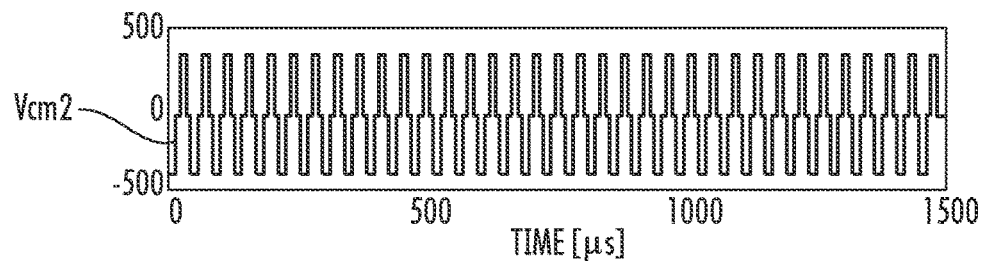

Accordingly, the second common mode signal Vcm2 depicted in the graph of FIG. 23D is rendered based at least in part on second PWM signal PWM-Va2 and second PWM signal PWM-Vb2. For a given point in time, the amplitude of the second common mode voltage signal Vcm2 is an average amplitude of the second PWM signal PWM-Va2 and the second PWM signal PWM-Vb2 associated with the second multiphase winding 462.

As will be appreciated by comparing the first common mode voltage signal Vcm1 depicted in the graph of FIG. 23A with the second common mode signal Vcm2 depicted in the graph of FIG. 23D, the second common mode signal Vcm2 has opposite polarity but with a similar but not exact waveform with respect to the first common mode signal Vcm1. The waveforms of the first and second common mode signals Vcm1, Vcm2 are similar in waveform because the first multiphase winding 461 and the second multiphase winding 462 are arranged and configured to operate electrically opposite in phase with respect to one another but not exact in waveform because of the failure condition associated with the C phase. The first common mode signal Vcm1 is a four-level waveform and the second common mode signal Vcm2 is a three-level waveform in this example. The polarity of the second common mode signal Vcm2 is shifted with respect to the first common mode voltage signal Vcm1, and hence, the first common mode signal Vcm1 and the second common mode signal Vcm2 have opposite polarity. Advantageously, the common mode voltage associated with the first switching elements 411 and first multiphase winding 461 may still be canceled at least in part by the common mode voltage associated with the second switching elements 412 and second multiphase winding 462 due to the opposite polarity and similarity in waveform of the rendered first and second common mode signals Vcm1, Vcm2. In some instances, significant cancelation is possible. It will be appreciated that these noted inventive aspects may be apply to other embodiments disclosed herein, such as the embodiments depicted in FIGS. 14 and 16-18.

In some instances, the power system may experience a failure condition where one multiphase winding fails but yet its complementary multiphase winding is still operable. By way of example and with reference to FIG. 14, the second multiphase winding 562 associated with the second channel 502 may become inoperable while the first multiphase winding 561 associated with the first channel 501 may be operable, or vice versa. In such instances, the switching elements associated with the inoperable multiphase winding can be controlled to synthesize a common mode signal that can cancel, at least in part, the common mode signal associated with the operable multiphase winding. In this regard, the common mode voltage associated with the operable multiphase winding can be canceled at least in part by the common mode voltage associated with the inoperable multiphase winding.

Particularly, suppose the power system 500 is functioning normally during operation. Then, the second multiphase winding 562 experiences a failure condition. In response to the detected failure condition associated with the second multiphase winding 562, the one or more processors of the controller 540 can control the second switching elements 512 to synthesize a second common mode signal having opposite polarity with respect to a first common mode signal associated with the first switching elements 511 and first multiphase winding 561. The failure condition associated with the second multiphase winding 562 can be detected in any suitable manner, such as by temperature sensors associated with the multiphase windings 561, 562 and/or power converter system 510, electric current and/or voltage sensors on the AC and/or DC side of the power converter system 510, speed sensors, baseline models, a combination of the foregoing, etc.

In controlling the second switching elements 512 to synthesize the second common mode signal, the one or more processors of the controller 540 are configured to control the second switching elements 512 to generate second PWM signals. Each of the second PWM signals can be associated with a respective phase of the power system 500. With reference also to FIG. 15 in addition to FIGS. 14 and 23, upon executing the second modulator 542 of the pulse width modulator 548, the one or more processors of the controller 540 can generate the second PWM signals. Specifically, the one or more processors of the controller 540 can generate a second PWM signal associated with an A-phase of the power system 500, denoted in the graph of FIG. 24B as PWM-Va2, a second PWM signal associated with a B-phase of the power system 500, denoted in the graph of FIG. 24C as PWM-Vb2, and a second PWM signal associated with a C-phase of the power system 500, denoted in the graph of FIG. 24D as PWM-Vc2.

In some example embodiments, the duty cycles of the second PWM signals PWM-Va2, PWM-Vb2, PWM-Vc2 can be selected and the second switching elements 512 can be controlled so that each one of the second PWM signals has a duty cycle of fifty percent (50%), e.g., as shown in the graphs of FIGS. 24B, 24C, 24D. At a duty cycle of fifty percent (50%), each second PWM signal is on or "high" for fifty percent of its duty cycle and is off or "low" for the remaining fifty percent of its cycle. Accordingly, the second PWM signals are generated as square waves.

Due to the selected duty cycles of the second PWM signals PWM-Va2, PWM-Vb2, PWM-Vc2, the one or more processors of the controller 540 can control the second switching elements 512 to generate the second PWM signals so that each terminal positioned between the second switching elements 512 and the second multiphase winding 562 has a voltage that averages about zero volts. An A-phase terminal TA associated with the A-phase of the power system 400, a B-phase terminal TB associated with the B-phase of the power system 400, and a C-phase terminal TC associated with the C-phase of the power system 400 are depicted in FIG. 14. By minimizing the voltage associated with the now-faulty second multiphase winding 562, e.g., to zero volts on average, the second switching elements 512 can be controlled to rapidly modulate to generate the second PWM signals to render the second common mode signal Vcm2, but notably, can do so without converting electrical power. This may, for example, cause the second multiphase winding 562 to cease producing torque, which may be beneficial due to the failure condition associated with the second multiphase winding 562.

In addition, the one or more processors can control the second switching elements 512 to generate the second PWM signals so that a polarity of each of the second PWM signals is opposite with respect to a waveform of the first common mode signal Vcm1, which is depicted in the graph of FIG. 24A. In this way, the rendered second common mode signal Vcm2, which is depicted in the graph of FIG. 24E, has opposite polarity with respect to the first common mode signal Vcm1. This facilitates cancelation of the common mode voltage.

Moreover, under a first synthesis control scheme, in controlling the second switching elements 512 to synthesize the second common mode signal Vcm2, the one or more processors of the controller 540 are configured to control the second switching elements 512 to generate the second PWM signals PWM-Va2, PWM-Vb2, PWM-Vc2 so that the second PWM signal PWM-Va2 associated with the first phase of the power system 400 (e.g., the A phase), the second PWM signal PWM-Vb2 associated with the second phase of the power system 400 (e.g., the B phase), and the second PWM signal PWM-Vc2 associated with the third phase of the power system 400 (e.g., the C phase), are offset from one another in phase.

For instance, for the second PWM signals depicted in the close-up views of the graphs of FIGS. 24B, 24C, 24D, the second PWM signals associated with the first, second, and third phases of the power system 400 are generated so that the second PWM signals are offset in phase from one another by about one hundred twenty degrees (120°). That is, the second PWM signal PWM-Va2 is offset from the second PWM signal PWM-Vb2 and the second PWM signal PWM-Vc2 by about one hundred twenty degrees (120°). Similarly, the second PWM signal PWM-Vb2 is offset from the second PWM signal PWM-Va2 and the second PWM signal PWM-Vc2 by about one hundred twenty degrees (120°). Further, as can be deduced, the second PWM signal PWM-Vc2 is offset from the second PWM signal PWM-Va2 and the second PWM signal PWM-Vb2 by about one hundred twenty degrees (120°). Offsetting the second PWM signals, e.g., by about one hundred twenty degrees (120°), produces a resultant or rendered second common mode signal Vcm2 (depicted in the graph of FIG. 24E) that has a similar waveform to the first common mode signal Vcm1 (depicted in the graph of FIG. 24A). For instance, offsetting the second PWM signals, e.g., by about one hundred twenty degrees (120°), produces a resultant or rendered second common mode signal Vcm2 that is a multilevel signal (four levels in this embodiment) that matches the number of levels of the first common mode signal Vcm1.

Further, the plurality of second PWM signals are generated so as to each have a same or about an equivalent voltage amplitude, e.g., as shown in the graphs of FIGS. 24B, 24C, 24D. In this way, the second multiphase winding 562 of the electric machine 550 may not experience significant differential voltage, and consequently, differential currents are negligible. Thus, for this embodiment, the plurality of second PWM signals are generated so as to each have a same duty cycle, about an equivalent voltage amplitude, and so as to be out-of-phase or offset in phase with respect to one another.

Under a second synthesis control scheme, in controlling the second switching elements 512 to synthesize the second common mode signal Vcm2, the one or more processors of the controller 540 are configured to control the second switching elements 512 to generate the second PWM signals PWM-Va2, PWM-Vb2, PWM-Vc2 so that the second PWM signal PWM-Va2 associated with the first phase of the power system 400 (e.g., the A phase), the second PWM signal PWM-Vb2 associated with the second phase of the power system 400 (e.g., the B phase), and the second PWM signal PWM-Vc2 associated with the third phase of the power system 400 (e.g., the C phase), are in phase with one another.

Figure 25A:
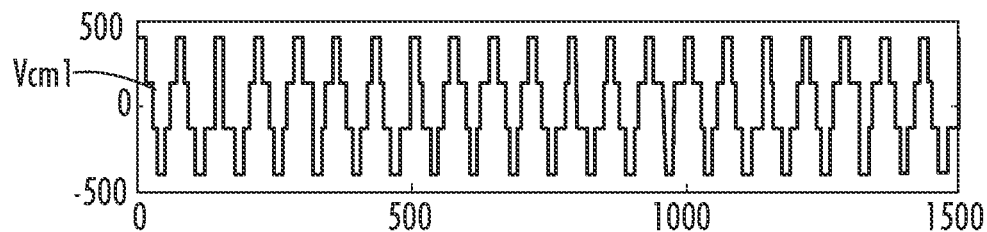
FIGS. 25A through 25E provide various graphs depicting voltage signals as a function of time.
Figure 25B:
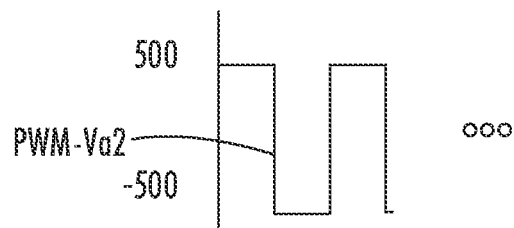
Figure 25C:
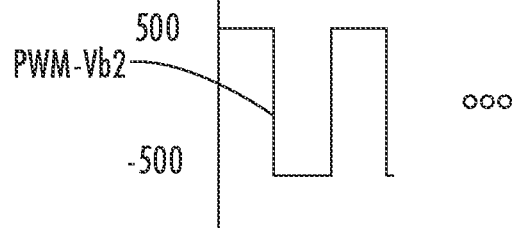
Figure 25D:
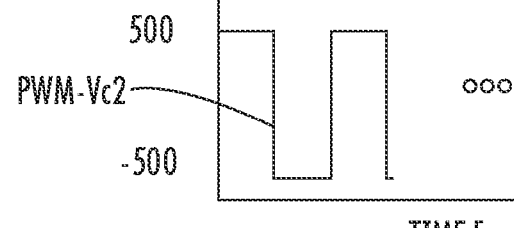

For instance, for the second PWM signals depicted in the close-up views of the graphs of FIGS. 25B, 25C, 25D, the second PWM signals associated with the first, second, and third phases of the power system 400 are generated so that the second PWM signals are in phase with one another. That is, the second PWM signal PWM-Va2, the second PWM signal PWM-Vb2, and the second PWM signal PWM-Vc2 are in phase with one another. Moreover, the generated second PWM signals PWM-Va2, PWM-Vb2, PWM-Vc2 each have the same duty cycle, which is a fifty percent (50%) duty cycle in this example embodiment. In this way, the plurality of second PWM signals PWM-Va2, PWM-Vb2, PWM-Vc2 are generated so as to each have a same duty cycle and so as to be in phase with one another. Accordingly, the second PWM signals depicted in the graphs of FIGS. 25B, 25C, 25D produce a resultant or rendered second common mode signal Vcm2 (depicted in the graph of FIG. 25E) that has a same waveform as each of the second PWM signals PWM-Va2, PWM-Vb2, PWM-Vc2 depicted in the graphs of FIGS. 25B, 25C, 25D. Further, the plurality of second PWM signals are generated so as to each have a same or about an equivalent voltage amplitude. In this way, the second multiphase winding 562 of the electric machine 550 may not experience significant differential voltage, and consequently, differential currents are negligible. Thus, for this embodiment, the plurality of second PWM signals are generated so as to each have a same duty cycle, about an equivalent voltage amplitude, and so as to be in phase with one another.

Figure 25E:
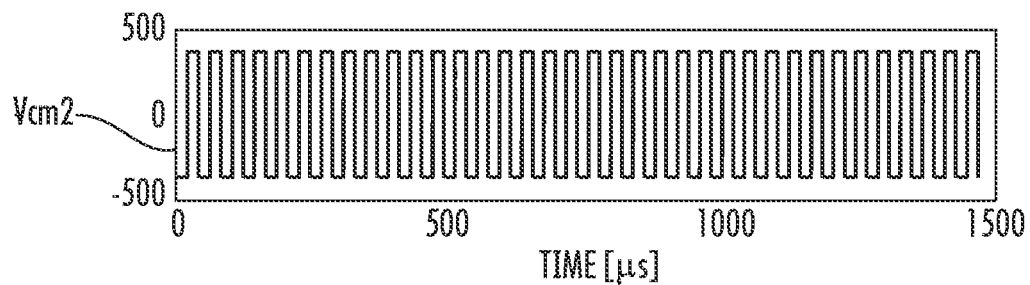

Although the second common mode signal Vcm2 depicted in the graph of FIG. 25E is somewhat different in waveform with respect to the first common mode signal Vcm1 depicted in the graph of FIG. 25A, the second common mode signal Vcm2 cancels the first common mode signal Vcm1 at least in part, thereby providing a degree of common mode cancelation.

FIGS. 26A, 26B, and 26C each show a graph depicting voltage signals as a function of time. Particularly, the graph of FIG. 26A shows the first common mode signal Vcm1 rendered as per normal operation in which the first multiphase winding 561 is operable and depicts the second common mode signal Vcm2 rendered without implementation of the first or second synthesis control scheme when the second multiphase winding 562 has experienced a failure condition. As depicted, the sum of the first common mode signal Vcm1 and the second common mode signal Vcm2 essentially matches the waveform of the first common mode signal Vcm1. Consequently, there is effectively no cancelation of common mode emissions when synthesis control techniques are not implemented.

The graph of FIG. 26B shows the first common mode signal Vcm1 rendered as per normal operation in which the first multiphase winding 561 is operable and depicts the second common mode signal Vcm2 rendered in accordance with the first synthesis control scheme in response to the failure condition associated with the second multiphase winding 562. As depicted, the generated second PWM signals PWM-Va2, PWM-Vb2, PWM-Vc2 are time-phase shifted thus rendering a four-level second common mode signal Vcm2. As illustrated, the first common mode signal Vcm1 is largely "mirrored" by the second common mode signal Vcm2, which provides significant cancelation of common mode emissions. The sum of the first common mode signal Vcm1 and the second common mode signal Vcm2 is largely a flat, constant line but does have more noise than the ideal common mode cancelation scenario depicted in FIG. 13.

The graph of FIG. 26C shows the first common mode signal Vcm1 rendered as per normal operation in which the first multiphase winding 561 is operable and depicts the second common mode signal Vcm2 rendered in accordance with the second synthesis control scheme in response to the failure condition associated with the second multiphase winding 562. As depicted, the generated second PWM signals PWM-Va2, PWM-Vb2, PWM-Vc2 are not time-phase shifted. That is, the second PWM signals are all in phase with one another. As a result, the rendered second common mode signal Vcm2 is only a two-level signal. The sum of the first common mode signal Vcm1 and the second common mode signal Vcm2 is largely a flat, constant line but does have more noise than the ideal case shown in FIG. 13 and more noise than the summation of the first common mode signal Vcm1 and the second common mode signal Vcm2 under the first synthesis control scheme depicted in FIG. 26B. However, an effective degree of common mode cancelation may be achieved as shown in FIG. 26C under the second synthesis control scheme.

While implementing the first synthesis control scheme may provide more effective common mode cancelation than implementation of the second synthesis control scheme when a multiphase winding has suffered a failure condition, implementation of the second synthesis control scheme can prevent or reduce high frequency current ripples within the power system 500. Accordingly, in some instances, the inventors of the present disclosure have discovered that it may be advantageous to switch between the first and second synthesis control schemes.

For instance, in response to a detected failure condition associated with the second multiphase winding 562, the second switching elements 512 can be controlled to synthesize the second common mode signal Vcm2 using the first synthesis control scheme as a default scheme. However, in response to determining that a high frequency ripple current within the power system 400 has reached a threshold, the one or more processors of the controller 540 can switch from implementing the first control scheme to the second control scheme at least until a target condition is met. The target condition can be, without limitation, a time period, a predetermined safety threshold at which the high frequency ripple current is deemed acceptable, etc. As one example, in response to determining that a high frequency ripple current within the power system 400 has reached a threshold, the one or more processors of the controller 540 can switch from implementing the first control scheme to the second control scheme at least until a predetermined time period (i.e., the target condition) has elapsed. As another example, in response to determining that a high frequency ripple current within the power system 400 has reached a threshold, the one or more processors of the controller 540 can switch from implementing the first control scheme to the second control scheme at least until the high frequency ripple current has reached a predetermined safety threshold (i.e., the target condition). When the target condition is met, the one or more processors of the controller 540 can resume implementing the first synthesis control scheme.

Accordingly, switching between the first and second synthesis control schemes can allow for effective cancelation of common mode emissions, and if necessary, prevention or reduction of high frequency ripple current despite the second multiphase winding 562 failure condition.

It will be appreciated that the inventive aspects relating to control schemes associated with cancelation of common mode emissions where one multiphase winding fails but yet its complementary multiphase winding is still operable may be apply to other embodiments disclosed herein, such as the embodiments depicted in FIGS. 6 and 16-18. Particularly, in the embodiment of FIG. 6, the above-noted inventive aspects can be applied within a single channel, e.g., where first multiphase winding 461 is operable and second multiphase winding 462 is inoperable or vice versa.

Figure 27:
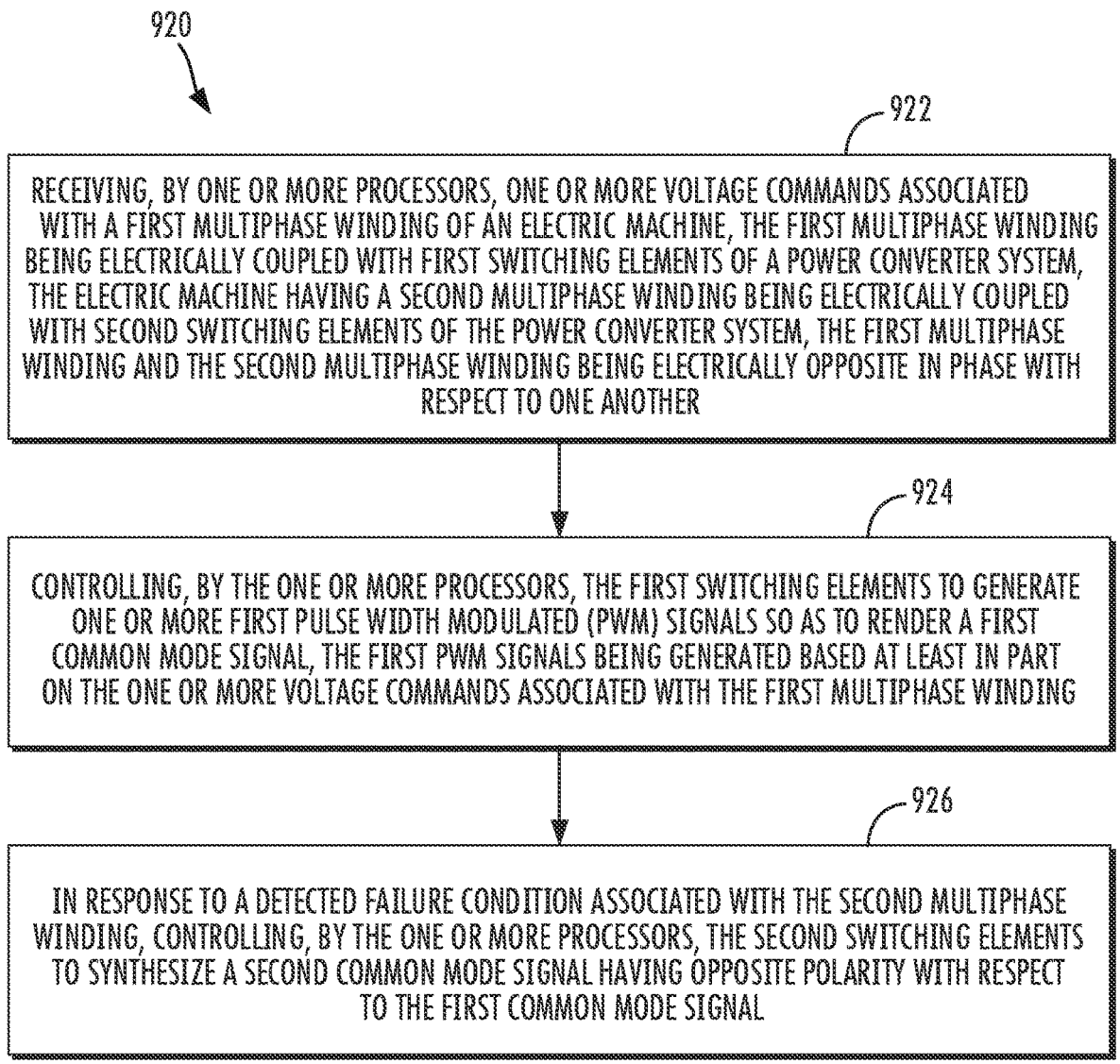
FIG. 27 provides a flow diagram for a method of operating an electrical power system according to one example embodiment.

FIG. 27 provides a flow diagram for a method (920) of operating an electrical power system according to one example embodiment. The method (920) can be utilized to operate any of the example power systems provided herein, for example.

At (922), the method (920) includes receiving, by one or more processors, one or more voltage commands associated with a first multiphase winding of an electric machine, the first multiphase winding being electrically coupled with first switching elements of a power converter system, the electric machine having a second multiphase winding being electrically coupled with second switching elements of the power converter system, the first multiphase winding and the second multiphase winding being electrically opposite in phase with respect to one another.

At (924), the method (920) includes controlling, by the one or more processors, the first switching elements to generate one or more first pulse width modulated (PWM) signals so as to render a first common mode signal, the first PWM signals being generated based at least in part on the one or more voltage commands associated with the first multiphase winding.

At (926), the method (920) includes in response to a detected failure condition associated with the second multiphase winding, controlling, by the one or more processors, the second switching elements to synthesize a second common mode signal having opposite polarity with respect to the first common mode signal.

In some implementations, controlling the second switching elements to synthesize the second common mode signal includes controlling, by the one or more processors, the second switching elements to generate second PWM signals. For instance, a second PWM signal can be generated for each phase of the power system. The second PWM signals can be generated so that a polarity of each of the second PWM signals is opposite with respect to a waveform of the first common mode signal.

In some further implementations, the second switching elements are controlled by the one or more processors to generate the second PWM signals so that each terminal positioned between the second switching elements and the second multiphase winding has a voltage that averages about zero volts. In yet other implementations, the second switching elements are controlled to generate the second PWM signals so that each one of the second PWM signals has a duty cycle of fifty percent or about 50%.

In some implementations, the one or more second PWM signals include a second PWM signal associated with a first phase of the power system, a second PWM signal associated with a second phase of the power system, and a second PWM signal associated with a third phase of the power system, and wherein, in controlling the second switching elements to generate the second PWM signals, the one or more processors implement a first synthesis control scheme. Under the first synthesis control scheme, the one or more processors shift at least two of: the second PWM signal associated with the first phase of the power system, the second PWM signal associated with the second phase of the power system, and the second PWM signal associated with the third phase of the power system so that the second PWM signals associated with the first, second, and third phases of the power system are offset from one another in phase, e.g., as shown in FIGS. 24A through 24E and FIG. 26B. In such implementations, optionally, the at least two of the second PWM signals associated with the first, second, and third phases of the power system are shifted so that the second PWM signals associated with the first, second, and third phases of the power system are offset in phase from one another by about one hundred twenty degrees.

In some implementations, the one or more second PWM signals include a plurality of second PWM signals each being associated with different phases of the power system, and wherein in controlling the second switching elements to generate the second PWM signals, the one or more processors implement a second synthesis control scheme. Under the second synthesis control scheme, the one or more processors generate the plurality of second PWM signals so as to be in phase with one another, e.g., as shown in FIGS. 25A through 25E and FIG. 26C.

In some implementations, the one or more second PWM signals include a plurality of second PWM signals each being associated with different phases of the power system, and wherein the plurality of second PWM signals are generated so as to each have a same duty cycle, about an equivalent voltage amplitude, and so as to be in phase with one another.

In some further implementations, in controlling the second switching elements to synthesize the second common mode signal in response to the detected failure condition associated with the second multiphase winding, the one or more processors are configured to, in response to determining that a high frequency ripple current within the power system has reached a threshold, switch from implementing a first synthesis control scheme to a second synthesis control scheme at least until a target condition is met. In such implementations, under the first synthesis control scheme, the second switching elements are controlled by the one or more processors to generate the second PWM signals so as to be offset in phase from one another. Under the second synthesis control scheme, the second switching elements are controlled by the one or more processors to generate the second PWM signals so as to be in phase with one another.

Although the inventive aspects have been described and illustrated herein in the context of electrical power systems having radial flux rotating electric machines, the inventive aspects also apply to electrical power systems having axial flux rotating electric machines. Examples are provided below.

Figure 28:
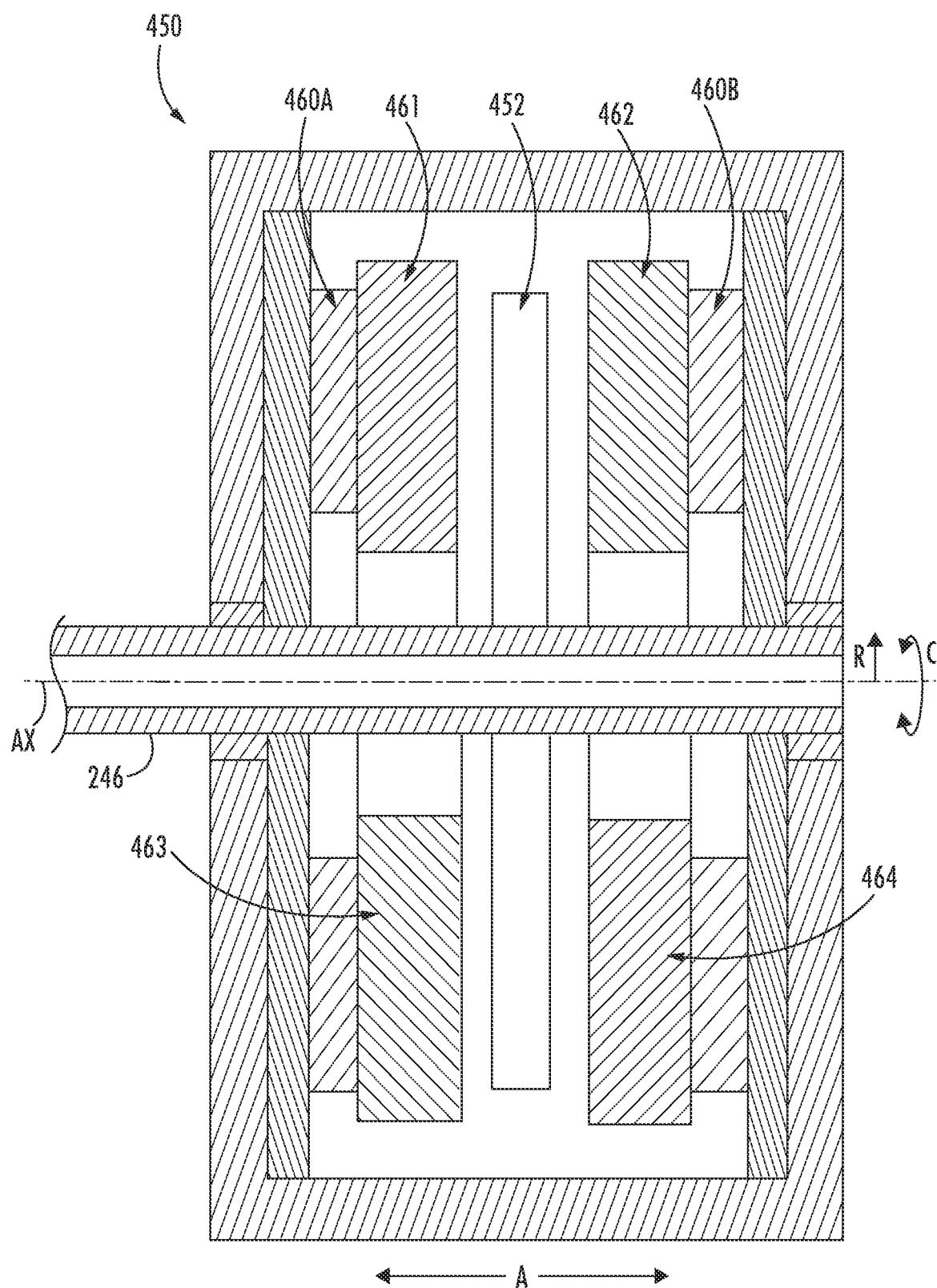
FIG. 28 provides a schematic cross-sectional view of one example axial flux rotating electric machine according to an example embodiment of the present disclosure.

FIG. 28 provides a schematic cross-sectional view of one example axial flux rotating electric machine 450 according to an example embodiment of the present disclosure. The electric machine 450 of FIG. 28 may be incorporated into the power system 400 of FIG. 6, for example. As depicted in FIG. 28, the electric machine 450 includes a rotor 452 and a stator, which includes a first stator 460A and a second stator 460B. The rotor 452 is mechanically coupled with a shaft, which is low speed shaft 246 in this example embodiment. The rotor 452 is rotatable about the axis of rotation AX in unison with the low speed shaft 246. The first stator 460A is positioned on a first side of the rotor 452 and the second stator 460B is positioned on a second side of the rotor 452 opposite the first side.

The first stator 460A has associated first and third multiphase windings 461, 463 and the second stator 460B has associated second and fourth multiphase windings 462, 464. The first and second multiphase windings 461, 462 are associated with a first channel (e.g., first channel 401 depicted in FIG. 6) and the third and fourth multiphase windings 463, 464 are associated with a second channel (e.g., second channel 402 depicted in FIG. 6). The first multiphase winding 461 and the second multiphase winding 462 are electrically opposite in phase with respect to one another. Similarly, the third multiphase winding 463 and the fourth multiphase winding 464 are electrically opposite in phase with respect to one another. Notably, the first multiphase winding 461 of the first stator 460A is positioned opposite the second multiphase winding 462 of the second stator 460B. In addition, the third multiphase winding 463 of the first stator 460A is positioned opposite the fourth multiphase winding 464 of the second stator 460B. Advantageously, the arrangement of the multiphase windings 461, 462, 463, 464 of the electric machine 450 in FIG. 28 allows for the net axial force to be equal to or about 0 during operation, even when only one of the channels is operating.

Figure 29:
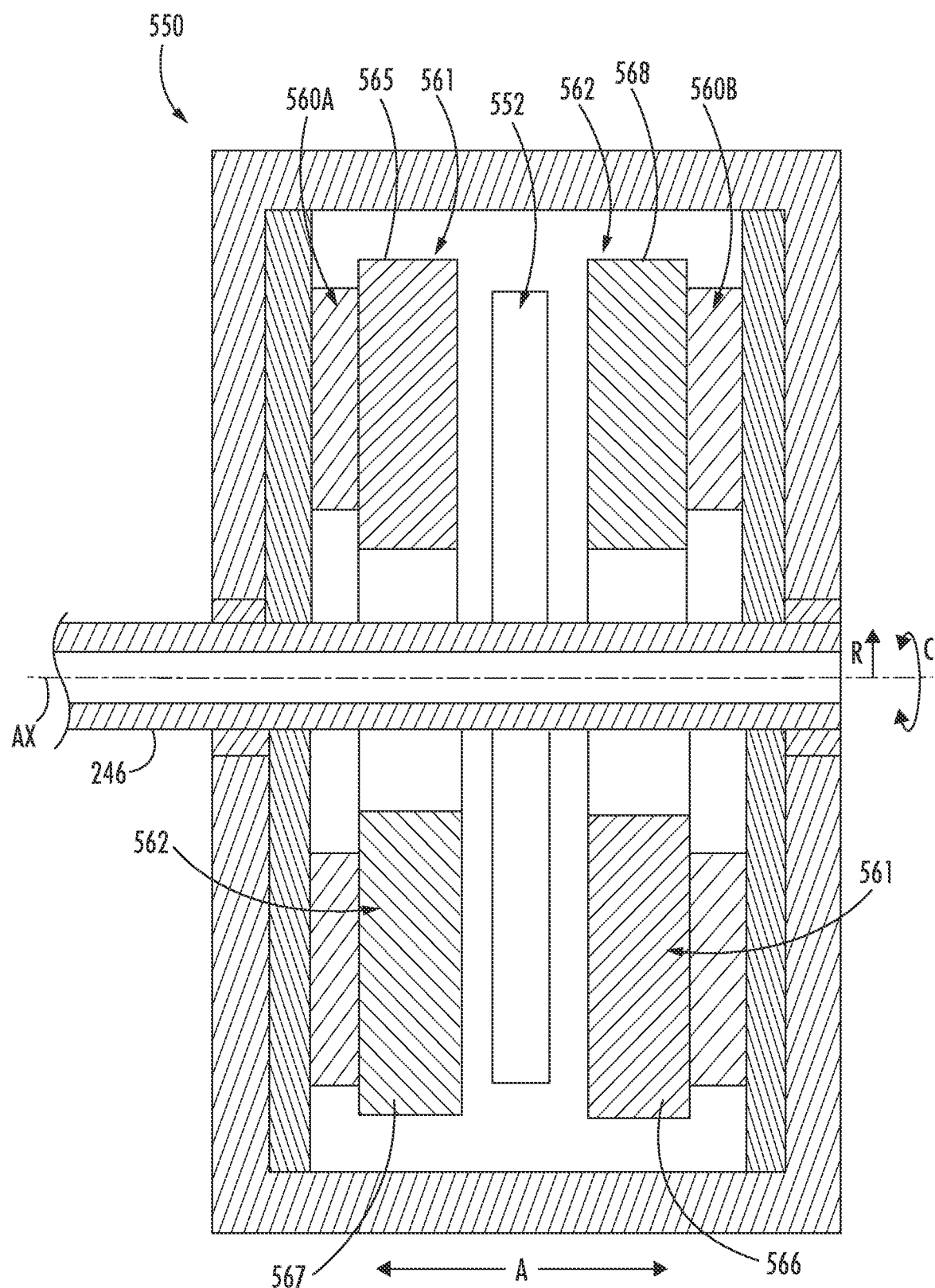
FIG. 29 provides a schematic cross-sectional view of another example axial flux rotating electric machine according to an example embodiment of the present disclosure.

FIG. 29 provides a schematic cross-sectional view of another example axial flux rotating electric machine 550 according to an example embodiment of the present disclosure. The electric machine 550 of FIG. 29 may be incorporated into the power system 500 of FIG. 14, for example. As depicted in FIG. 29, the electric machine 550 includes a rotor 552 and a stator, which includes a first stator 560A and a second stator 560B. The rotor 552 is mechanically coupled with a shaft, which is low speed shaft 246 in this example embodiment. The rotor 552 is rotatable about the axis of rotation AX in unison with the low speed shaft 246. The first stator 560A is positioned on a first side of the rotor 552 and the second stator 560B is positioned on a second side of the rotor 552 opposite the first side.

For this embodiment, the electric machine 550 includes a first multiphase winding 561 associated with a first channel (e.g., first channel 501 in FIG. 14) and a second multiphase winding 562 associated with a second channel (e.g., second channel 502 in FIG. 14). The first multiphase winding 561 and the second multiphase winding 562 are electrically opposite in phase with respect to one another. The first multiphase winding 561 is arranged in a first set 565 and a second set 566. The first set 565 and the second set 566 can be electrically connected to one another in series or parallel. Like the first multiphase winding 561, the second multiphase winding 562 is arranged in a first set 567 and a second set 568. The first set 567 and the second set 568 can be electrically connected to one another in series or parallel.

As depicted in FIG. 29, the first stator 560A includes the first set 565 of the first multiphase winding 561 and the first set 567 of the second multiphase winding 562. The second stator 560B includes the second set 566 of the first multiphase winding 561 and the second set 568 of the second multiphase winding 562. The first set 565 and the second set 566 of the first multiphase winding 561 are spaced from one another along the axial direction A and are positioned opposite one another along the radial direction R. The first set 567 and the second set 568 of the second multiphase winding 562 are spaced from one another along the axial direction A and are positioned opposite one another along the radial direction R.

Advantageously, such a balanced arrangement of the first and second multiphase windings 561, 562 allows for the net axial force associated with the electric machine 550 to be equal to or about 0 during operation. Moreover, when both channels are in operation, the first set 565 and the second set 566 of the first multiphase winding 561 balance out the radial forces therebetween and the first set 567 and the second set 568 of the second multiphase winding 562 balance out the radial forces therebetween. In addition, the balanced arrangement allows for one channel to continue operating at its full power even in the event of non-use or failure of the other channel.

Figure 30:
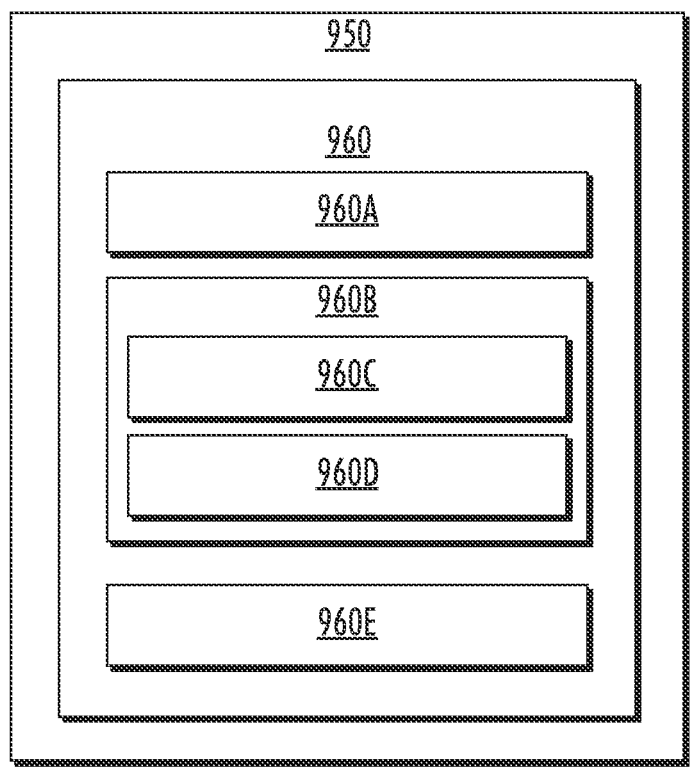
FIG. 30 provides an example computing system according to example embodiments of the present disclosure.

FIG. 30 provides an example computing system 950 according to example embodiments of the present disclosure. The computing devices or elements described herein, such as controller 440, controller 540, controller 640, controller 740, and controller 840, may include various components and perform various functions of the computing system 950 described below, for example.

As shown in FIG. 30, the computing system 950 can include one or more computing device(s) 960. The computing device(s) 960 can include one or more processor(s) 960A and one or more memory device(s) 960B. The one or more processor(s) 960A can include any suitable processing device, such as a microprocessor, microcontroller, integrated circuit, logic device, and/or other suitable processing device. The one or more memory device(s) 960B can include one or more computer-executable or computer-readable media, including, but not limited to, non-transitory computer-readable media, RAM, ROM, hard drives, flash drives, and/or other memory devices.

The one or more memory device(s) 960B can store information accessible by the one or more processor(s) 960A, including computer-readable instructions 960C that can be executed by the one or more processor(s) 960A. The instructions 960C can be any set of instructions that when executed by the one or more processor(s) 960A, cause the one or more processor(s) 960A to perform operations. In some embodiments, the instructions 960C can be executed by the one or more processor(s) 960A to cause the one or more processor(s) 960A to perform operations, such as any of the operations and functions for which the computing system 950 and/or the computing device(s) 960 are configured, such as controlling operation of electrical power systems. The instructions 960C can be software written in any suitable programming language or can be implemented in hardware. Additionally, and/or alternatively, the instructions 960C can be executed in logically and/or virtually separate threads on processor(s) 960A. The memory device(s) 960B can further store data 960D that can be accessed by the processor(s) 960A. For example, the data 960D can include models, lookup tables, databases, etc.

The computing device(s) 960 can also include a network interface 960E used to communicate, for example, with the other components of system 950 (e.g., via a communication network). The network interface 960E can include any suitable components for interfacing with one or more network(s), including for example, transmitters, receivers, ports, controllers, antennas, and/or other suitable components. One or more devices can be configured to receive one or more commands from the computing device(s) 960 or provide one or more commands to the computing device(s) 960.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A power system, comprising: a power converter system having first switching elements and second switching elements; an electric machine, comprising: a first multiphase winding electrically coupled with the first switching elements; and a second multiphase winding electrically coupled with the second switching elements, the first multiphase winding and the second multiphase winding being electrically opposite in phase with respect to one another; and one or more processors configured to: control the first switching elements to generate one or more first pulse width modulated (PWM) signals so as to render a first common mode signal, the first PWM signals being generated based at least in part on one or more voltage commands associated with the first multiphase winding; and control the second switching elements to generate one or more second PWM signals so as to render a second common mode signal, the second PWM signals being generated based at least in part on one or more voltage commands associated with the second multiphase winding, the second common mode signal having opposite polarity with respect to the first common mode signal.

2. The power system of any preceding clause, wherein the second common mode signal has a same waveform as the first common mode signal.

3. The power system of any preceding clause, wherein in generating the one or more second PWM signals, the one or more processors are configured to: shift a polarity of each one of the one or more second PWM signals.

4. The power system of any preceding clause, wherein the first multiphase winding and the second multiphase winding are associated with a same channel of the power system.

5. The power system of any preceding clause, wherein the first multiphase winding is associated with a first channel of the power system and the second multiphase winding is associated with a second channel of the power system.

6. The power system of any preceding clause, wherein the electric machine defines a radial direction, and wherein the first multiphase winding is arranged in a first set and a second set positioned opposite one another along the radial direction, and wherein the second multiphase winding is arranged in a first set and a second set positioned opposite one another along the radial direction.

7. The power system of any preceding clause, wherein the electric machine has a stator defining sectors, and wherein the first and second sets of the first multiphase winding and the first and second sets of the second multiphase winding are each wound within a respective one of the sectors of the stator.

8. The power system of any preceding clause, wherein the power converter system has third switching elements and fourth switching elements, and wherein the electric machine further comprises: a third multiphase winding electrically coupled with the third switching elements; and a fourth multiphase winding electrically coupled with the fourth switching elements, the fourth multiphase winding being electrically opposite in phase with respect to the third multiphase winding.

9. The power system of any preceding clause, wherein the electric machine defines a radial direction, and wherein the first multiphase winding is arranged opposite the second multiphase winding along the radial direction and the third multiphase winding is arranged opposite the fourth multiphase winding along the radial direction.

10. The power system of any preceding clause, wherein the electric machine has a stator defining sectors, and wherein the first, second, third, and fourth multiphase windings are wound within a respective one of the sectors of the stator.

11. The power system of any preceding clause, wherein the electric machine has a stator defining a first half sector and a second half sector, and wherein the first multiphase winding is wound within the first half sector and the second multiphase winding is wound within the second half sector.

12. The power system of any preceding clause, wherein the first multiphase winding and the second multiphase winding are wound in a collocated contra-phase arrangement.

13. The power system of any preceding clause, wherein the electric machine has a rotor and a stator, and wherein the rotor is mechanically coupled with a rotating component of a gas turbine engine.

14. The power system of any preceding clause, wherein, in response to a detected failure condition associated with the second multiphase winding, the one or more processors are configured to: control the second switching elements to synthesize the second common mode signal.

15. The power system of any preceding clause, wherein, in response to a detected failure condition associated with the power converter system, the one or more processors are configured to: control the second switching elements in one of a single-leg operation mode or a reduced leg operation mode to render the second common mode signal.

16. A method, comprising: receiving, by one or more processors, one or more voltage commands associated with a first multiphase winding of an electric machine, the first multiphase winding being electrically coupled with first switching elements of a power converter system; receiving, by the one or more processors, one or more voltage commands associated with a second multiphase winding of the electric machine, the second multiphase winding being electrically coupled with second switching elements of the power converter system, the first multiphase winding and the second multiphase winding being electrically opposite in phase with respect to one another; controlling, by the one or more processors, the first switching elements to generate one or more first pulse width modulated (PWM) signals so as to render a first common mode signal, the first PWM signals being generated based at least in part on the one or more voltage commands associated with the first multiphase winding; and controlling, by the one or more processors, the second switching elements to generate one or more second PWM signals so as to render a second common mode signal, the second PWM signals being generated based at least in part on the one or more voltage commands associated with the second multiphase winding, the second common mode signal having opposite polarity with respect to the first common mode signal.

17. A power system, comprising: a power converter system having first switching elements and second switching elements; an electric machine, comprising: a first multiphase winding electrically coupled with the first switching elements; and a second multiphase winding electrically coupled with the second switching elements, the first multiphase winding and the second multiphase winding being electrically opposite in phase with respect to one another; and one or more processors configured to: control the first switching elements to generate one or more first pulse width modulated (PWM) signals so as to render a first common mode signal, the first PWM signals being generated based at least in part on one or more voltage commands associated with the first multiphase winding; and in response to a detected failure condition associated with the second multiphase winding, control the second switching elements to synthesize a second common mode signal having opposite polarity with respect to the first common mode signal.

18. The power system of any preceding clause, wherein in controlling the second switching elements to synthesize the second common mode signal, the one or more processors are configured to control the second switching elements to generate second PWM signals.

19. The power system of any preceding clause, wherein the one or more processors control the second switching elements to generate the second PWM signals so that a polarity of each of the second PWM signals is opposite with respect to a waveform of the first common mode signal.

20. The power system of any preceding clause, wherein the one or more processors control the second switching elements to generate the second PWM signals so that each terminal positioned between the second switching elements and the second multiphase winding has a voltage that averages about zero volts.

21. The power system of any preceding clause, wherein the one or more processors control the second switching elements to generate the second PWM signals so that each one of the second PWM signals has a duty cycle of fifty percent.

22. The power system of any preceding clause, wherein the one or more second PWM signals include a second PWM signal associated with a first phase of the power system, a second PWM signal associated with a second phase of the power system, and a second PWM signal associated with a third phase of the power system, and wherein, in controlling the second switching elements to generate the second PWM signals, the one or more processors are further configured to: shift at least two of: the second PWM signal associated with the first phase of the power system, the second PWM signal associated with the second phase of the power system, and the second PWM signal associated with the third phase of the power system so that the second PWM signals associated with the first, second, and third phases of the power system are offset from one another in phase.

23. The power system of any preceding clause, wherein the at least two of the second PWM signals associated with the first, second, and third phases of the power system are shifted so that the second PWM signals associated with the first, second, and third phases of the power system are offset in phase from one another by about one hundred twenty degrees.

24. The power system of any preceding clause, wherein the one or more second PWM signals include a plurality of second PWM signals each being associated with different phases of the power system, and wherein the plurality of second PWM signals are generated so as to be in phase with one another.

25. The power system of any preceding clause, wherein the one or more second PWM signals include a plurality of second PWM signals each being associated with different phases of the power system, and wherein the plurality of second PWM signals are generated so as to each have a same duty cycle, about an equivalent voltage amplitude, and so as to be in phase with one another.

26. The power system of any preceding clause, wherein in controlling the second switching elements to synthesize the second common mode signal in response to the detected failure condition associated with the second multiphase winding, the one or more processors are configured to: in response to determining that a high frequency ripple current within the power system has reached a threshold, switch from implementing a first synthesis control scheme to a second synthesis control scheme at least until a target condition is met, wherein, under the first synthesis control scheme, the second switching elements are controlled by the one or more processors to generate the second PWM signals so as to be offset in phase from one another, and wherein, under the second synthesis control scheme, the second switching elements are controlled by the one or more processors to generate the second PWM signals so as to be in phase with one another.

27. The power system of any preceding clause, wherein the electric machine is an axial flux rotating electric machine.

28. The power system of any preceding clause, wherein the electric machine is a radial flux rotating electric machine.

29. A non-transitory computer readable medium comprising computer-executable instructions, which, when executed by one or more processors of a power system, cause the one or more processors to: control first switching elements of a power converter system to generate one or more first pulse width modulated (PWM) signals so as to render a first common mode signal, the first PWM signals being generated based at least in part on one or more voltage commands associated with a first multiphase winding of an electric machine; and control second switching elements of the power converter system to generate one or more second PWM signals so as to render a second common mode signal, the second PWM signals being generated based at least in part on one or more voltage commands associated with a second multiphase winding of the electric machine, the second common mode signal having opposite polarity with respect to the first common mode signal, the first multiphase winding and the second multiphase winding being electrically opposite in phase with respect to one another.

30. The non-transitory computer readable medium of any preceding clause, wherein the second common mode signal has a same waveform as the first common mode signal.

31. The non-transitory computer readable medium of any preceding clause, wherein in generating the one or more second PWM signals, the one or more processors are configured to: shift a polarity of each one of the one or more second PWM signals.

32. The non-transitory computer readable medium of any preceding clause, wherein the first multiphase winding and the second multiphase winding are associated with a same channel of the power system.

33. The non-transitory computer readable medium of any preceding clause, wherein the first multiphase winding is associated with a first channel of the power system and the second multiphase winding is associated with a second channel of the power system.

34. The non-transitory computer readable medium of any preceding clause, wherein the electric machine is an axial flux rotating electric machine.

35. The non-transitory computer readable medium of any preceding clause, wherein the electric machine is a radial flux rotating electric machine.

What is claimed is:

1. A power system, comprising:
a power converter system having first switching elements and second switching elements;
an electric machine, comprising:
a first multiphase winding electrically coupled with the first switching elements, the first multiphase winding comprising a first set of windings and a second set of windings connected in series; and
a second multiphase winding electrically coupled with the second switching elements, the second multiphase winding comprising a first set of windings and a second set of windings connected in series, and wherein the first multiphase winding and the second multiphase winding are electrically opposite in phase with respect to one another; and
one or more processors configured to:
control the first switching elements to generate one or more first pulse width modulated (PWM) signals so as to render a first common mode signal, the first PWM signals being generated based at least in part on one or more voltage commands associated with the first multiphase winding;
detect a failure condition associated with the second multiphase winding; and
control, in response to the detected failure condition associated with the second multiphase winding, the second switching elements to synthesize a second common mode signal and generate one or more second PWM signals so as to render the second common mode signal, the second PWM signals being generated based at least in part on one or more voltage commands associated with the second multiphase winding, the second common mode signal having opposite polarity with respect to the first common mode signal.

2. The power system of claim 1, wherein the first set of windings and the second set of windings of the first multiphase winding are arranged in an interweaved contra-phase winding pair arrangement, and wherein the first set of windings and the second set of windings of the second multiphase winding are arranged in an interweaved contra-phase winding pair arrangement.

3. The power system of claim 1, wherein the electric machine defines a radial direction, wherein the first set of windings and the second set of windings of the first multiphase winding are positioned opposite one another along the radial direction, and wherein the first set of windings and the second set of windings of the second multiphase winding are positioned opposite one another along the radial direction.

4. The power system of claim 1, wherein the electric machine defines a circumferential direction, wherein the first set of windings of the first multiphase winding is positioned between the first set of windings and the second set of windings of the second multiphase winding along the circumferential direction, and wherein the second set of windings of the first multiphase winding is positioned between the first set of windings and the second set of windings of the second multiphase winding along the circumferential direction.

5. The power system of claim 1, wherein the electric machine has a stator defining sectors, and wherein the first set of windings and the second set of windings of the first multiphase winding and the first set of windings and the second set of windings of the second multiphase winding are each wound within a respective one of the sectors of the stator.

6. The power system of claim 1, further comprising:
a first gate driver in operative communication with the first switching elements, the first gate driver being configured to drive the first switching elements to generate the one or more first PWM signals so as to render the first common mode signal; and
a second gate driver in operative communication with the second switching elements, the second gate driver being configured to drive the second switching elements to generate the one or more second PWM signals so as to render the second common mode signal.

7. The power system of claim 1, wherein the second common mode signal has a same waveform as the first common mode signal.

8. The power system of claim 1, wherein the first switching elements and the second switching elements are embodied in a single power converter.

9. The power system of claim 1, wherein the first switching elements and the second switching elements are connected in series.

10. The power system of claim 1, wherein in generating the one or more second PWM signals, the one or more processors are configured to:
shift a polarity of each one of the one or more second PWM signals.

11. The power system of claim 1, wherein the first multiphase winding and the second multiphase winding are associated with a same channel of the power system.

12. The power system of claim 1, wherein the first multiphase winding is associated with a first channel of the power system and the second multiphase winding is associated with a second channel of the power system.

13. The power system of claim 1, wherein the electric machine has a stator defining a first sector, a second sector, a third sector, and a fourth sector, and wherein the first set of windings of the first multiphase winding is wound within the first sector, the second set of windings of the first multiphase winding is wound within the second sector, the first set of windings of the second multiphase winding is wound within the third sector, and the second set of windings of the second multiphase winding is wound within the fourth sector.

14. The power system of claim 1, wherein the electric machine has a rotor and a stator, and wherein the rotor is mechanically coupled with a rotating component of a gas turbine engine.

15. The power system of claim 1, wherein, in response to a detected failure condition associated with the power converter system, the one or more processors are configured to:
control the second switching elements in one of a single-leg operation mode or a reduced leg operation mode to render the second common mode signal.

16. A method, comprising:
receiving, by one or more processors, one or more voltage commands associated with a first multiphase winding of an electric machine, the first multiphase winding comprising a first set of windings and a second set of windings connected in series and being electrically coupled with first switching elements of a power converter system;
receiving, by the one or more processors, one or more voltage commands associated with a second multiphase winding of the electric machine, the second multiphase winding comprising a first set of windings and a second set of windings connected in series and being electrically coupled with second switching elements of the power converter system, the first multiphase winding and the second multiphase winding being electrically opposite in phase with respect to one another;
controlling, by the one or more processors, the first switching elements to generate one or more first pulse width modulated (PWM) signals so as to render a first common mode signal, the first PWM signals being generated based at least in part on the one or more voltage commands associated with the first multiphase winding;
detecting a failure condition associated with the second multiphase winding; and
controlling, by the one or more processors, the second switching elements, in one of a single-leg operation mode or a reduced leg operation mode and in response to detecting the failure condition, to generate one or more second PWM signals so as to render a second common mode signal, the second PWM signals being generated based at least in part on the one or more voltage commands associated with the second multiphase winding, the second common mode signal having opposite polarity with respect to the first common mode signal.

17. The method of claim 16, further comprising:
detecting a failure condition associated with the second multiphase winding; and
controlling the second switching elements to synthesize the second common mode signal.

18. A power system, comprising:
a power converter system having first switching elements, second switching elements, third switching elements, and fourth switching elements, wherein the first switching elements and the second switching elements are connected in series, and wherein the third switching elements and the fourth switching elements are connected in series;
an electric machine, comprising:
a first multiphase winding comprising a plurality of windings and being electrically coupled with the first switching elements;
a second multiphase winding comprising a plurality of windings and being electrically coupled with the second switching elements, the first multiphase winding and the second multiphase winding being electrically opposite in phase with respect to one another;

a third multiphase winding comprising a plurality of windings and being electrically coupled with the third switching elements; and a fourth multiphase winding comprising a plurality of windings and being electrically coupled with the fourth switching elements, the fourth multiphase winding being electrically opposite in phase with respect to the third multiphase winding; and one or more processors configured to:

control the first switching elements to generate one or more first pulse width modulated (PWM) signals so as to render a first common mode signal, the first PWM signals being generated based at least in part on one or more voltage commands associated with the first multiphase winding; and control the second switching elements to generate one or more second PWM signals so as to render a second common mode signal, the second PWM signals being generated based at least in part on one or more voltage commands associated with the second multiphase winding, the second common mode signal having opposite polarity with respect to the first common mode signal.

* * * * *